United States Patent
Chen et al.

(10) Patent No.: US 12,024,665 B2
(45) Date of Patent: Jul. 2, 2024

(54) POLYMER-STABILIZED LIQUID CRYSTAL COMPOSITION AND USE THEREOF

(71) Applicant: BEIJING BAYI SPACE LCD TECHNOLOGY CO., LTD, Beijing (CN)

(72) Inventors: Maoxian Chen, Beijing (CN); Shihong Chu, Beijing (CN); Haiguang Chen, Beijing (CN); Tianmeng Jiang, Beijing (CN); Xin Wei, Beijing (CN)

(73) Assignee: BEIJING BAYI SPACE LCD TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/624,129

(22) PCT Filed: Aug. 22, 2019

(86) PCT No.: PCT/CN2019/101948
§ 371 (c)(1),
(2) Date: Dec. 30, 2021

(87) PCT Pub. No.: WO2021/003809
PCT Pub. Date: Jan. 14, 2021

(65) Prior Publication Data
US 2022/0389320 A1    Dec. 8, 2022

(30) Foreign Application Priority Data
Jul. 10, 2019 (CN) .......................... 201910618862.3

(51) Int. Cl.
| G02F 1/1333 | (2006.01) |
| C09K 19/30 | (2006.01) |
| C09K 19/44 | (2006.01) |
| C09K 19/46 | (2006.01) |
| C09K 19/12 | (2006.01) |

(52) U.S. Cl.
CPC .......... *C09K 19/46* (2013.01); *C09K 19/3003* (2013.01); *C09K 19/44* (2013.01); *C09K 2019/122* (2013.01); *C09K 2019/3004* (2013.01); *C09K 2019/3009* (2013.01); *C09K 2019/301* (2013.01); *C09K 2019/3016* (2013.01)

(58) Field of Classification Search
CPC .... C09K 19/46; C09K 19/3003; C09K 19/44; C09K 19/38; C09K 19/3804; C09K 2019/122; C09K 2019/3004; C09K 2019/3009; C09K 2019/301; C09K 2019/3016; C09K 2019/3066; C09K 2019/0448; C09K 2019/0444; C09K 2019/123; C09K 2019/3027; G02F 1/1333

See application file for complete search history.

(56) References Cited

U.S. PATENT DOCUMENTS

| 9,879,180 B2 | 1/2018 | Sudo et al. |
| 2018/0163137 A1 | 6/2018 | Ushakov et al. |
| 2019/0161679 A1 | 5/2019 | Hirschmann et al. |
| 2022/0389320 A1* | 12/2022 | Chen ...................... C09K 19/42 |

FOREIGN PATENT DOCUMENTS

| CN | 103958644 A | 7/2014 |
| CN | 108179014 A | 6/2018 |
| CN | 108350360 A | 7/2018 |

(Continued)

OTHER PUBLICATIONS

Machine translation of Chen et al. (Chinese Patent No. CN109423304) (Year: 2019).*

(Continued)

*Primary Examiner* — Geraldina Visconti
(74) *Attorney, Agent, or Firm* — HAUPTMAN HAM, LLP

(57) ABSTRACT

Disclosed are a polymer-stabilized liquid crystal composition and the use thereof. The composition comprises one or two polymerizable compounds represented by general formula I: (I), and further comprises a negative dielectric anisotropy liquid crystal composition, wherein the negative dielectric anisotropy liquid crystal composition has a dielectric anisotropy of $\Delta\varepsilon \leq -1.5$; and the added amount of the polymerizable compound(s) represented by general formula I is 0.1-0.5% of the total mass of the negative dielectric anisotropy liquid crystal composition. A polymer film formed after the polymerization of the provided liquid crystal composition containing the polymerizable compound(s) has a very good uniformity, such that the problem of liquid crystal displays having poor display can be improved. Moreover, an alignment film formed after the polymerization of the polymerizable liquid crystal composition has an excellent alignment force, and can improve residual image problems caused by an insufficient alignment force in a PSVA liquid crystal display. The provided liquid crystal composition containing the polymerizable compound(s) can realize an adjustable response speed, and can in turn meet the requirements of different technical process conditions.

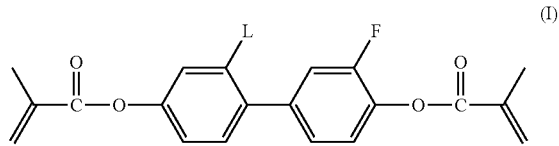

(I)

16 Claims, 1 Drawing Sheet

(56) References Cited

FOREIGN PATENT DOCUMENTS

| | | |
|---|---|---|
| CN | 109233868 A | 1/2019 |
| CN | 109423304 A | 3/2019 |
| CN | 109837096 A | 6/2019 |
| CN | 109988582 A | 7/2019 |
| CN | 110016353 A | 7/2019 |
| CN | 110484281 A | 11/2019 |

OTHER PUBLICATIONS

International Search Report (in English and Chinese) and Written Opinion of the ISA (in Chinese) issued in PCT/CN2019/101948, mailed Apr. 15, 2020; ISA/CN.

\* cited by examiner

POLYMER-STABILIZED LIQUID CRYSTAL COMPOSITION AND USE THEREOF

CROSS-REFERENCE TO RELATED APPLICATIONS

This application is a U.S. National Phase Application under 35 U.S.C. 371 of International Application No. PCT/CN2019/101948, filed on Aug. 22, 2019, which claims the priority of Chinese patent application No. 201910618862.3 titled "A Polymer Stabilized Liquid Crystal Composition and Use Thereof" filed on Jul. 10, 2019. The entire disclosures of the above applications are incorporated herein by reference.

TECHNICAL FIELD

The present invention belongs to the technical field of liquid crystal materials, and specifically relates to a mixture comprising one or more polymerizable compounds and a liquid crystal composition with negative dielectric anisotropy, and relates to its use in the field of liquid crystal display.

BACKGROUND ART

At present, liquid crystal has been widely used in the field of display. Display is the process of transforming electrical signals (data information) into visual light (visual information), and the device that completes the display is Man-Machine Interface (MMI). Liquid crystal display has gone through a long path of development since the discovery of liquid crystals. In 1888, Friedrich Reinitzer, an Austrian botanist, discovered the first liquid crystal material, i.e., cholesteryl benzoate. Manguin invented a rubbing orientation method for producing a single domain liquid crystal and studying optical anisotropy in 1917. E. Bose established the Swarm doctrine in 1909, which was supported by the experiments of L. S. Ormstein and F. Zernike et al. (1918), and was later explained as statistical fluctuations by De Gennes. In 1933, G. W. Oseen and H. Zocher founded the continuum theory which was later modified by F. C. Frank (1958). M. Born (1916) and K. Lichtennecker (1926) found and studied liquid crystal dielectric anisotropy. In 1932, W. Kast accordingly divided the nematic phase into two categories: positive and negative. In 1927, V. Freedericksz and V. Zolinao discovered that nematic liquid crystals would be deformed and present a voltage threshold (Freederichsz change) in an electric field or magnetic field. This discovery provides the basis for the fabrication of liquid crystal displays.

In 1968, R. Williams of the Radio Corporation of America (RCA) found that nematic phase liquid crystals formed stripe domains and have a light scattering phenomenon in an electric field. G. H. Heilmeir then developed this into a dynamic scattering display mode, and made the first liquid crystal display (LCD) in the world. In the early 1970s, Helfrich and Schadt invented twisted-nematic (TN) principle, and the combination of the TN photoelectric effect and an integrated circuit made a display device (TN-LCD), which opened up broad application prospects for liquid crystals. Particularly since the seventies, due to the development of large-scale integrated circuits and liquid crystal materials, the use of liquid crystals has made a breakthrough development in terms of display; and Super TwisredNematic:STN mode was proposed by T. Scheffer et al. in 1983-1985.

With the continuous improvement of people's requirements for display quality, the contrast problems of TN and STN displays have gradually become prominent, therefore VA (vertical alignment) displays came into being. VA display mode has very excellent contrast performance, but has obvious problems of viewing angle and response time. In order to solve the problem of viewing angle, display technologies such as MVA, PVA, CPA have been proposed, the essence of these technologies is to use multidomain to solve the problem of viewing angle, and has achieved good effects. However, due to the increased difficulty in the process and response time problems, the display industry was still plagued until PSVA (Polymer Stable Vertical Alignment) technology was proposed, which uses polymers to realize multidomain and pretilt angle control, so as to realize liquid-crystal displays with fast response and wide viewing angle.

For PSVA mode displays, the liquid crystal molecules are oriented by polymer films formed from the polymerization of polymerizable compounds. The uniformity of the polymer films and the alignment force of polymer films become the key factors to control the quality of PSVA displays; the liquid crystal composition proposed by the present invention aims to solve the uniformity of PSVA display polymer film and improve the alignment force of PSVA display.

SUMMARY OF THE INVENTION

The present invention relates to a polymer-stabilized liquid crystal composition, which comprises one or two polymerizable compounds represented by general formula I:

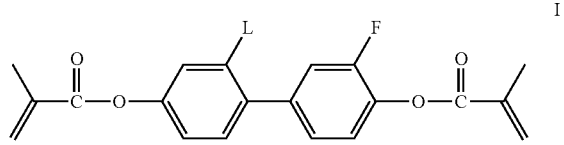

wherein L independently represents methyl or methoxy;

and further comprises a negative dielectric anisotropy liquid crystal composition, wherein the negative dielectric anisotropy liquid crystal composition has a dielectric anisotropy of $\Delta\varepsilon \leq -1.5$; and the added amount of the polymerizable compound(s) represented by general formula I is 0.1-0.5% of the total mass of the negative dielectric anisotropy liquid crystal composition.

The polymerizable compound provided by this application is used in the PSVA liquid crystal composition, has stable alignment force after polymerization, and is very effective for improving the residual image problem of liquid crystal display; the liquid crystal composition provided by the present invention can cover a wide range of reaction rates and meet the requirements of different process conditions.

Preferably, the polymerizable compound represented by general formula I is:

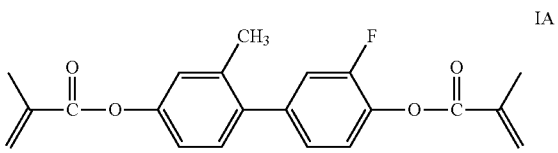

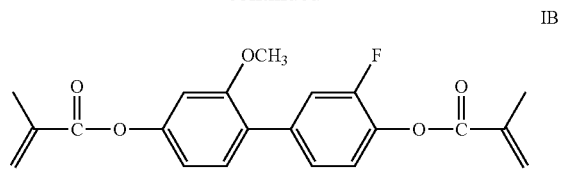

IB

Preferably, the liquid crystal composition contains a polymerizable compound provided by formula IA and/or D3 with a mass percentage of 0.2-0.4%;

more preferably, the liquid crystal composition contains a polymerizable compound of formula IA with a mass percentage of 0-0.4%, and contains a polymerizable compound of formula D3 with a mass percentage of 0-0.3%.

Preferably, the negative dielectric anisotropy liquid crystal composition comprises at least one compound represented by general formula II:

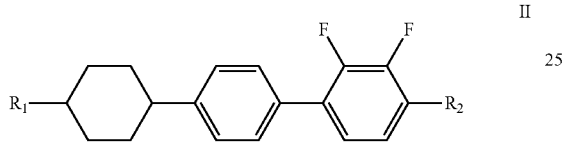

II wherein $R_1$ and $R_2$ each independently represent a $C_1$-$C_{12}$ linear alkyl or linear alkoxy;

and at least one compound represented by general formula III:

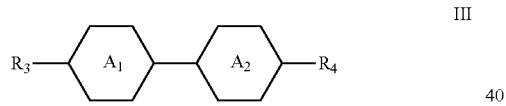

III wherein $R_3$ and $R_4$ each independently represent a $C_1$-$C_{12}$ linear alkyl or linear alkoxy; $A_1$ and $A_2$ each independently represent trans-1,4-cyclohexyl or 1,4-phenylene;

and at least one compound represented by general formula IV:

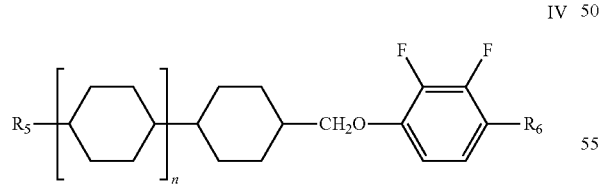

IV wherein $R_5$ and $R_6$ each independently represent a $C_1$-$C_{12}$ linear alkyl or linear alkoxy; n represents 0 or 1.

The compound represented by the general formula II provided by the present invention is a compound containing 2,3-difluorobenzene structure, which has negative dielectric anisotropy.

Preferably, the compound represented by general formula II is selected from one or more of formulas IIA1 to IIA24:

IIA1

IIA2

IIA3

IIA4

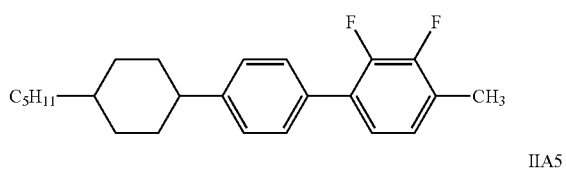

IIA5

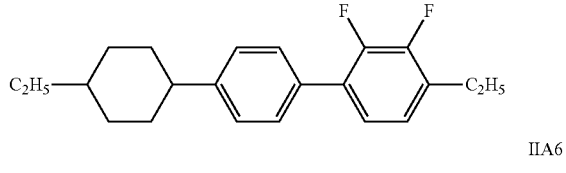

IIA6

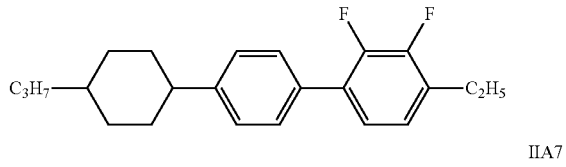

IIA7

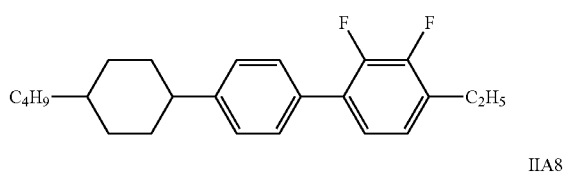

IIA8

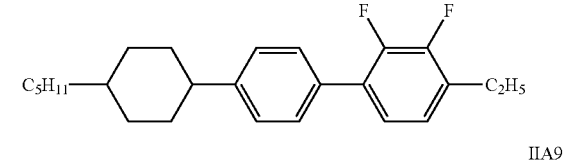

IIA9

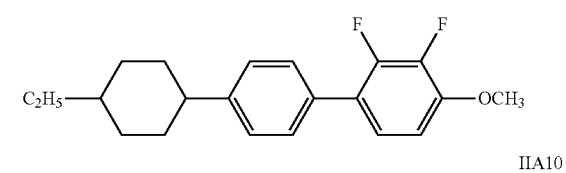

IIA10

IIA11
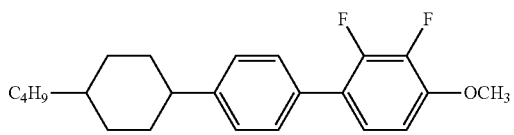

IIA12
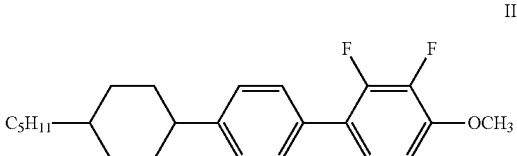

IIA13
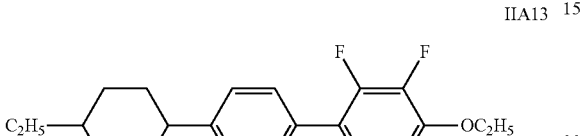

IIA14
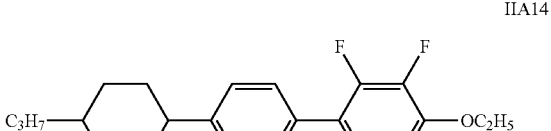

IIA15
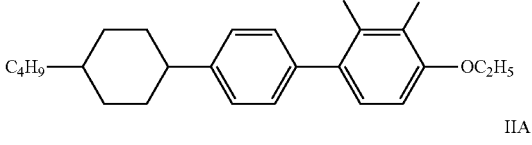

IIA16
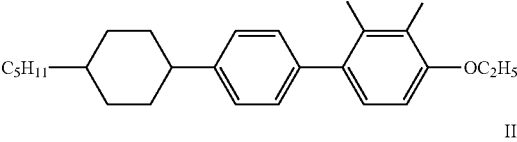

IIA17
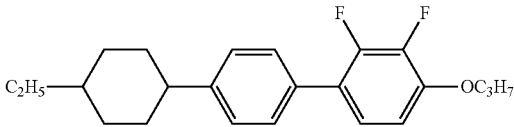

IIA18
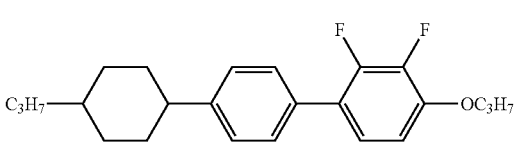

IIA19
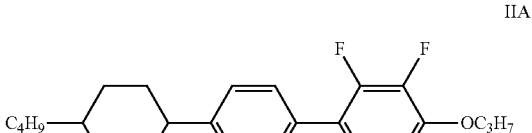

IIA20
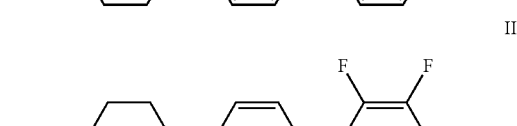

IIA21
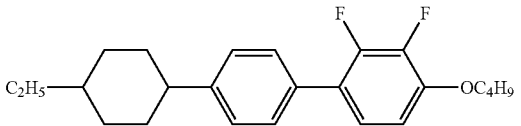

IIA22
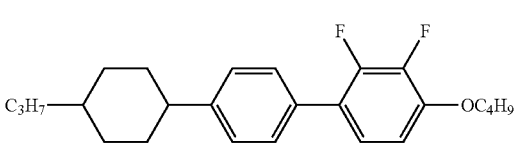

IIA23
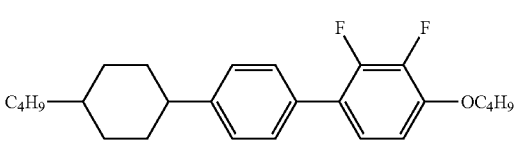

IIA24
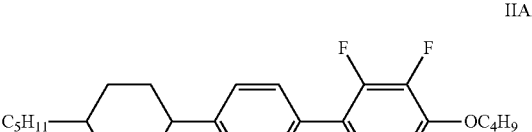

Preferably, the compound represented by general formula II is selected from one or more of IIA1, IIA2, IIA9, IIA10, IIA13, IIA14, IIA15, IIA18, and IIA22;

more preferably, the compound represented by general formula II is selected from one or more of formulas IIA1, IIA2, IIA13, IIA14, IIA15, and IIA22;

particularly preferably, the compound represented by general formula II is selected from one or more of formulas IIA13, IIA14, and IIA22;

preferably, the liquid crystal composition provided by the present invention comprises a compound represented by general formula II with a mass percentage of 5-30%, more preferably a compound represented by general formula II with a mass percentage of 10-26%, and particularly preferably a compound of IIA13 and IIA14 with a mass percentage of 10-20%.

The compound represented by general formula III provided by the present invention is a bicyclic neutral compound, and the structural compound has low rotational viscosity and excellent mutual solubility.

Preferably, the compound of general formula III is selected from one or more of formulas IIIA-IIIC:

IIIA
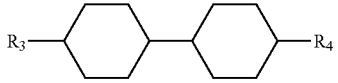

IIIB
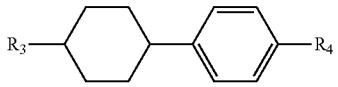

IIIC
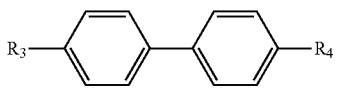

wherein $R_3$ each independently represents the a $C_1$-$C_7$ linear alkyl, and $R_4$ each independently represents a $C_1$-$C_7$ linear alkyl or linear alkoxy;

preferably, the compound represented by general formula III contains at least one compound represented by formula IIIA and at least one compound represented by formula IIIC;

preferably, the compound represented by general formula III is selected from one or more of formulas IIIA1-IIIC30:

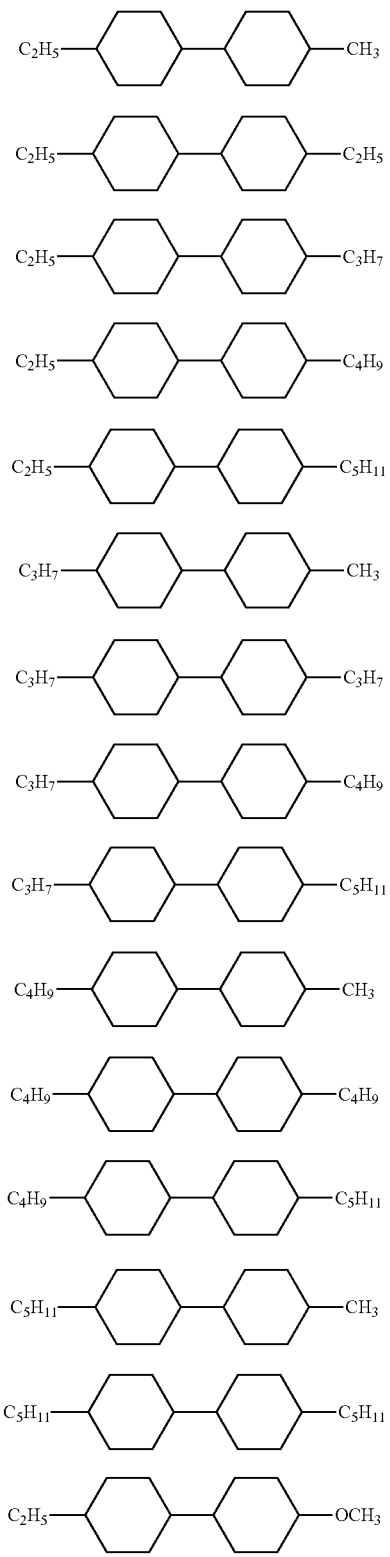

IIIA16

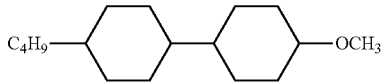
IIIA17

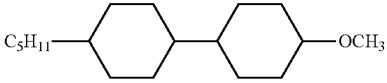
IIIA18

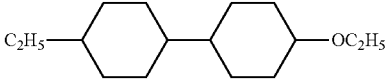
IIIA19

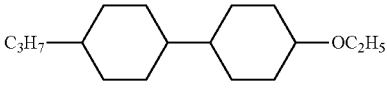
IIIA20

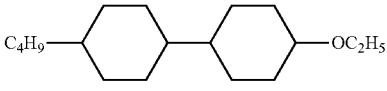
IIIA21

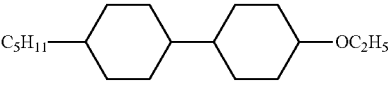
IIIA22

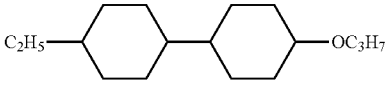
IIIA23

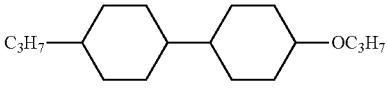
IIIA24

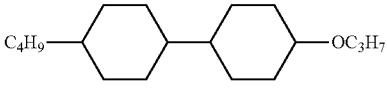
IIIA25

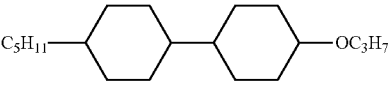
IIIA26

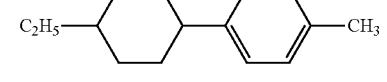
IIIB1

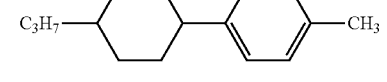
IIIB2

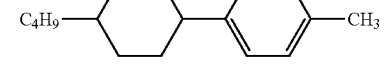
IIIB3

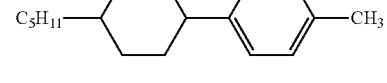
IIIB4

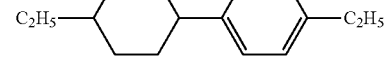
IIIB5

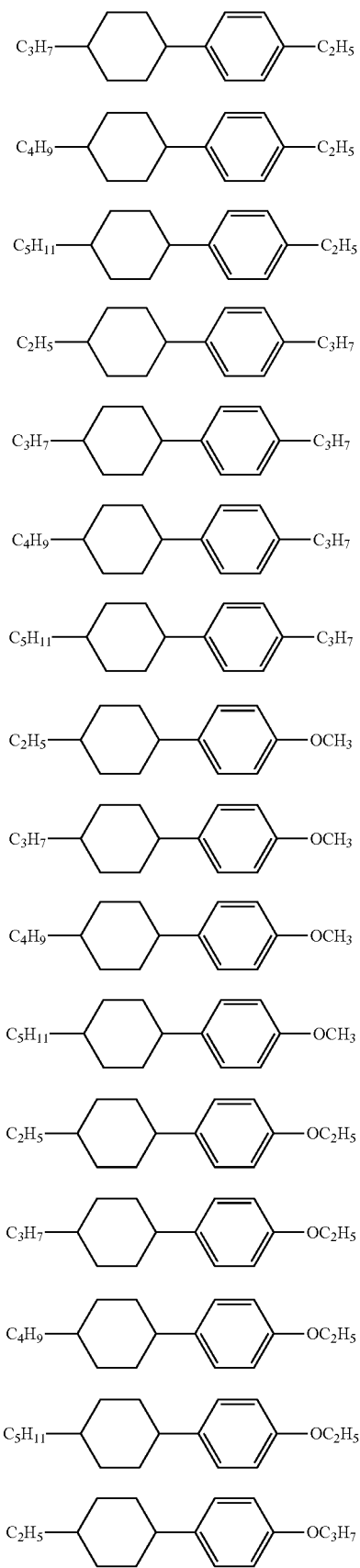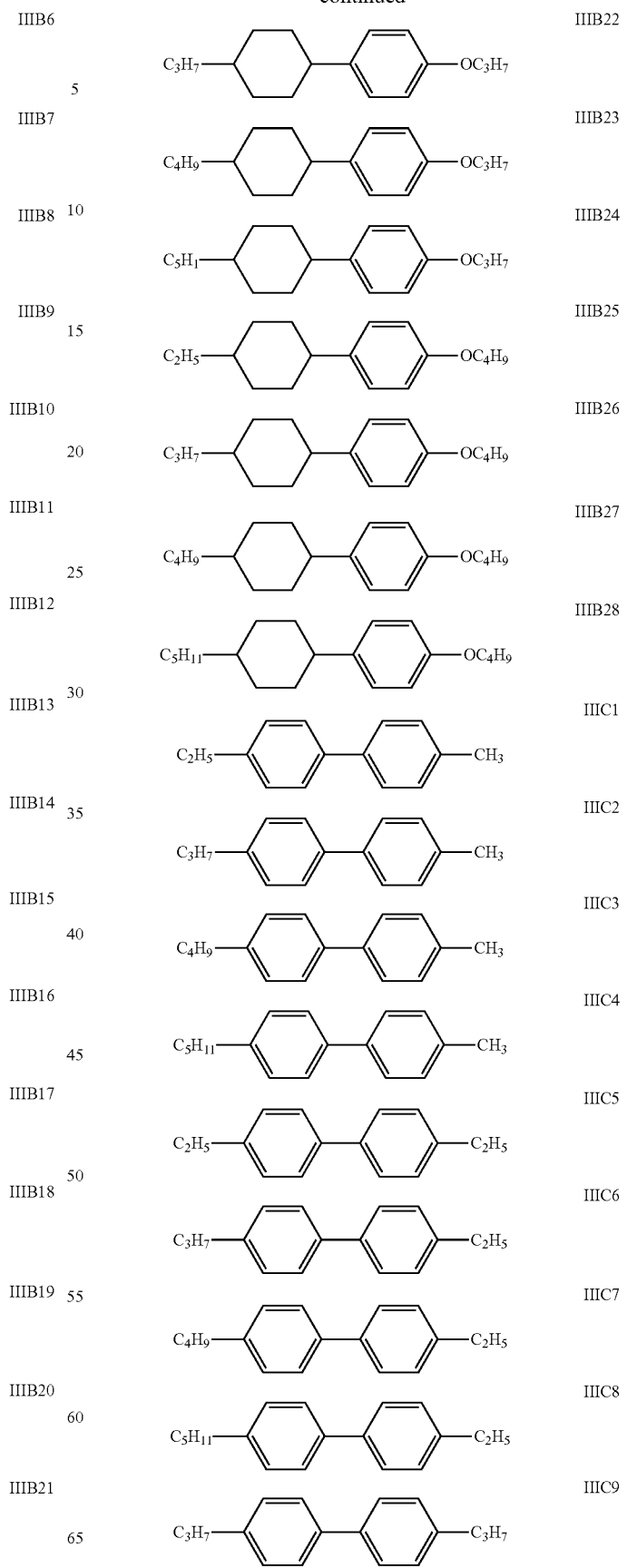

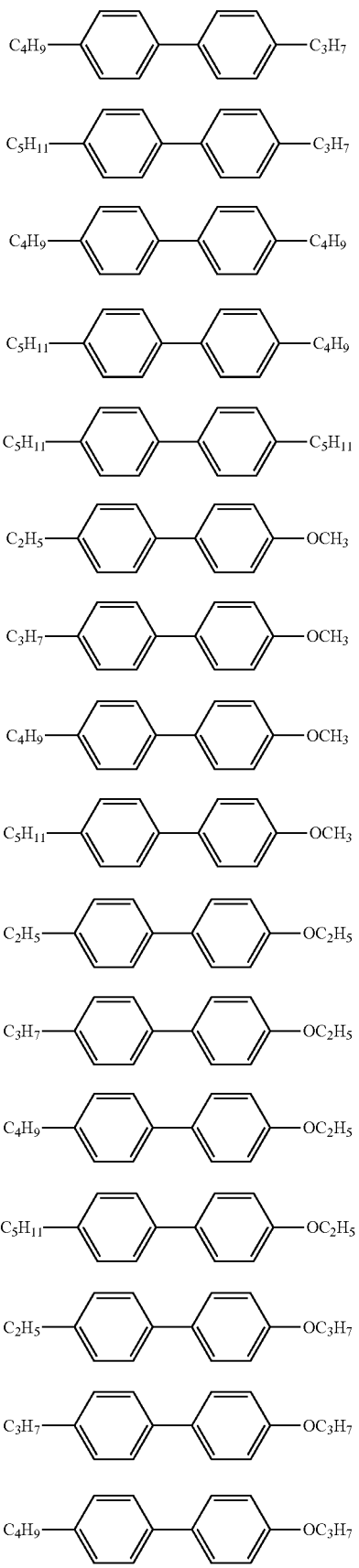

More preferably, the compound represented by general formula III is selected from one or more of IIIA3, IIIA5, IIIA6, IIIA8, IIIA9, IIIA10, IIIA13, IIIA20, IIIB12, IIIB14, IIIB18, IIIC1, IIIC2, IIIC3, IIIC4, IIIC16, IIIC18, IIIC20, and IIIC22;

particularly preferably, the compound represented by general formula III is selected from one or more of formulas IIIA3, IIIA8, IIIA9, IIIB14, IIIB18, IIIC2, IIIC4, IIIC16, and IIIC20;

preferably, the liquid crystal composition provided by the present invention comprises a compound represented by general formula III with a mass percentage of 30-60%, more preferably a compound represented by general formula III with a mass percentage of 41-50%;

preferably, the liquid crystal composition provided by the present invention comprises a compound represented by formula IIIA with a mass percentage of 20-35%;

more preferably, the liquid crystal composition provided by the present invention comprises a compound represented by formula IIIA3, IIIA5, or IIIA9 with a mass percentage of 24-31%;

preferably, the liquid crystal composition provided by the present invention comprises a compound represented by formula IIIB with a mass percentage of 0-10%;

more preferably, the liquid crystal composition provided by the present invention comprises compounds represented by formula IIIB14 or IIIB18 with a mass percentage of 0-7%; more preferably, the liquid crystal composition provided by the present invention comprises compounds represented by formula IIIB14 or IIIB18 with a mass percentage of 4-7%;

preferably, the liquid crystal composition provided by the present invention comprises a compound represented by formula IIIC with a mass percentage of 5-20%; more preferably, the liquid crystal composition provided by the present invention comprises a compound represented by formula IIIC2 IIIC4 IIIC16, or IIIC20 with a mass percentage of 7-18%; and more preferably, the liquid crystal composition provided by the present invention comprises compounds represented by formula IIIC2 or IIIC4 with a mass percentage of 7-18%.

Preferably, the compound represented by general formula IV is selected from one or more of compounds represented by IVA-IVB:

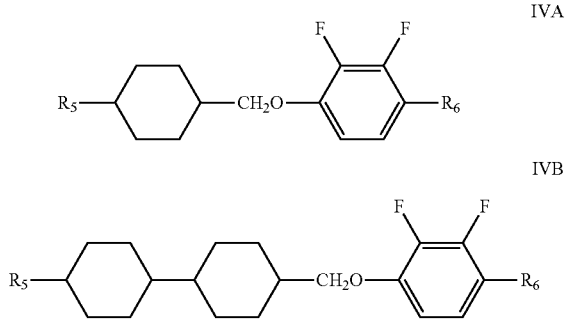

IVA

IVB wherein $R_5$ and $R_6$ each independently represent a $C_1$-$C_7$ linear alkyl or linear alkoxy;

preferably, the compound represented by general formula IV provided by the present invention contains at least one compound represented by formula IVA and at least one compound represented by formula IVB;

preferably, the compound represented by general formula IV is selected from one or more of IVA1-IVB20:

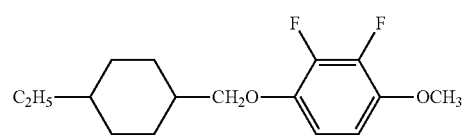

IVA1

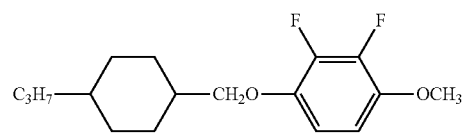

IVA2

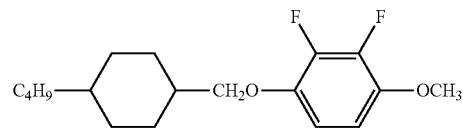

IVA3

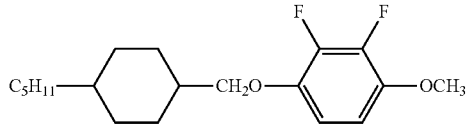

IVA4

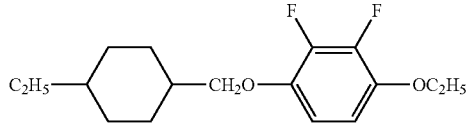

IVA5

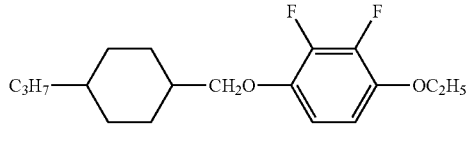

IVA6

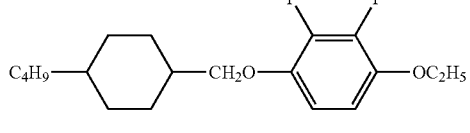

IVA7

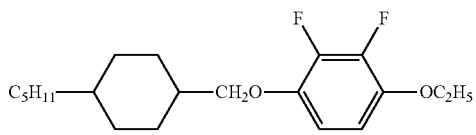

IVA8

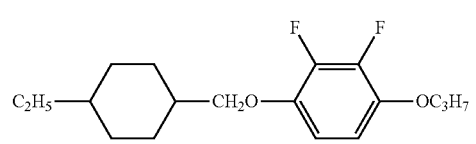

IVA9

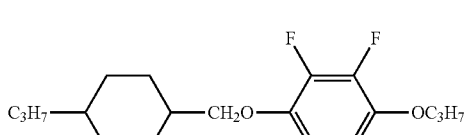

IVA10

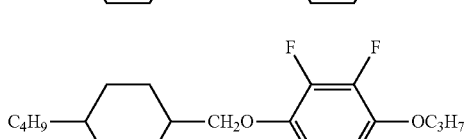

IVA11

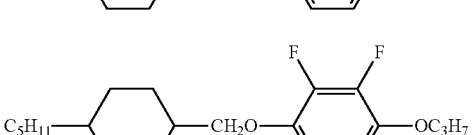

IVA12

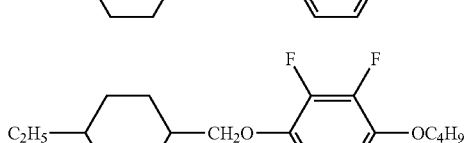

IVA13

IVA14

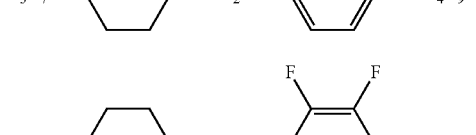

IVA15

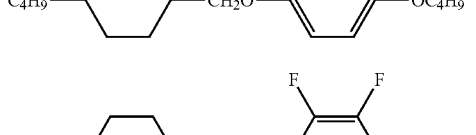

IVA16

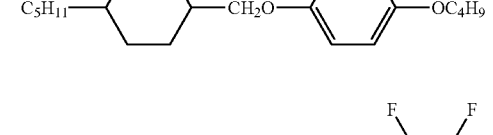

IVB1

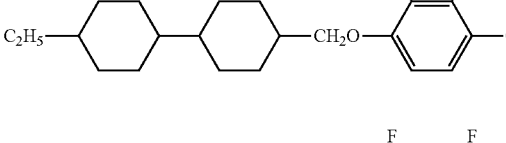

IVB2

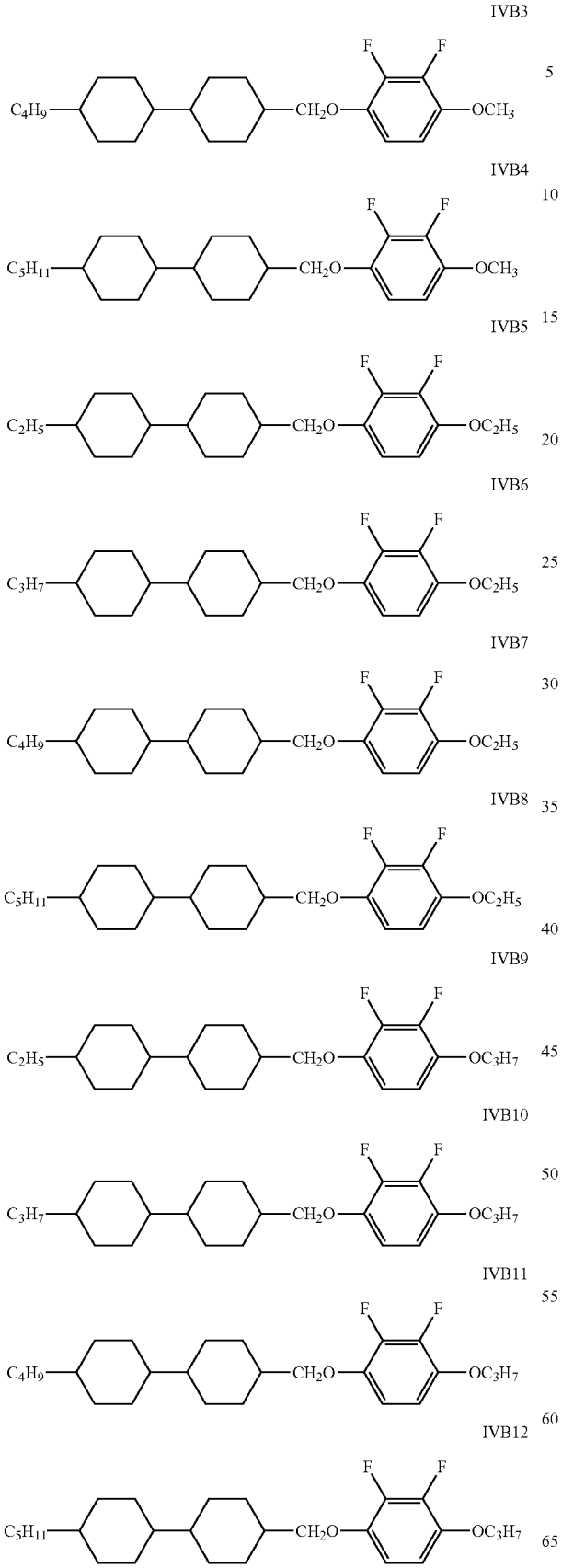

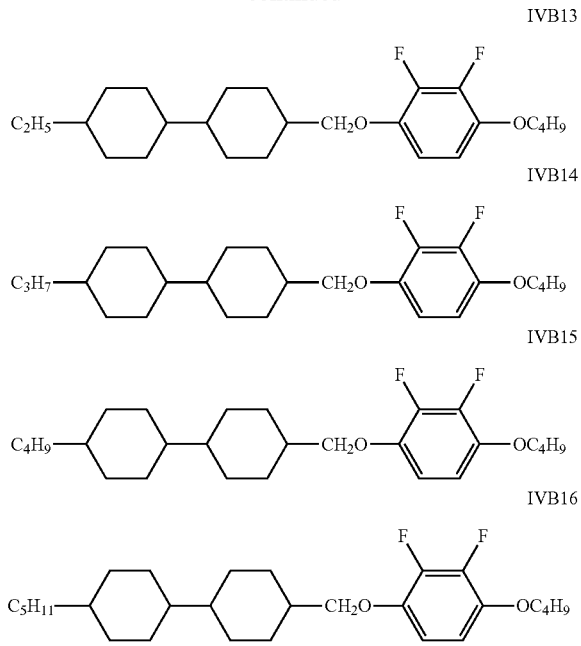

Preferably, the compound represented by general formula IV is selected from one or more of IVA2, IVA5, IVA6, IVA7, IVA8, IVA10, IVA14, IVB5, IVB6, IVB7, IVB8, IVB10, and IVB14, more preferably, the compound represented by general formula IV is selected from one or more of IVA2, IVA5, IVA6, IVA8, IVB5, IVB6, IVB7, and IVB8; particularly preferably, the compound represented by general formula IV is selected from one or more of IVA6, IVB5, and IVB6;

preferably, the liquid crystal composition provided by the present invention comprises a compound represented by general formula IV with a mass percentage of 20-40%; preferably, the liquid crystal composition provided by the present invention comprises a compound represented by general formula IV with a mass percentage of 25-34%;

preferably, the liquid crystal composition provided by the present invention comprises a compound represented by IVA with a mass percentage of 5-16%; more preferably, a compound represented by IVA6 with a mass percentage of 9-14%;

preferably, the liquid crystal composition provided by the present invention comprises a compound represented by IVB with a mass percentage of 10-26%; more preferably, a compound represented by IVB5 and IVB6 with a mass percentage of 14-23%.

Preferably, the liquid crystal composition provided by the present invention can further comprise one or more of compounds represented by general formula V:

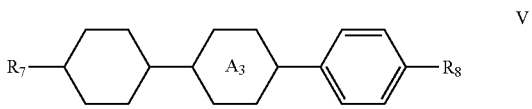

wherein $R_7$ and $R_8$ each independently represent a $C_1$-$C_{12}$ linear alkyl, and $A_3$ each independently represents trans-1, 4-cyclohexyl or 1,4-phenylene;

preferably, the compound represented by general formula V is selected from one or more of formulas VA-VB:

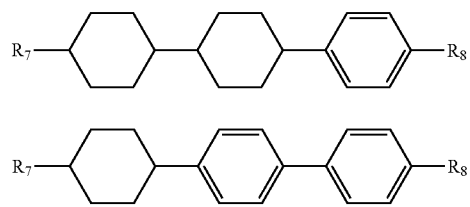
VA
VB
wherein $R_7$ and $R_8$ each independently represent a $C_1$-$C_7$ linear alkyl;
preferably, the compound represented by general formula V is selected from one or more of formulas VA1-VB16:
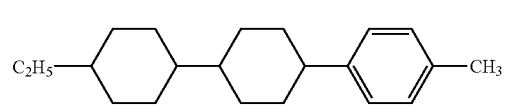
VA1
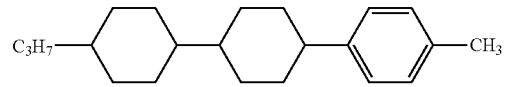
VA2
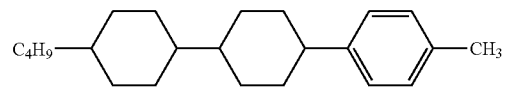
VA3
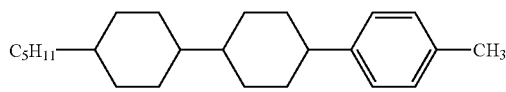
VA4
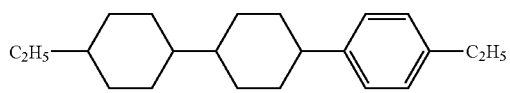
VA5
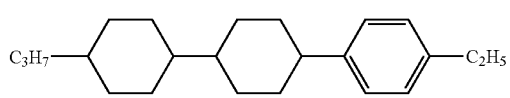
VA6
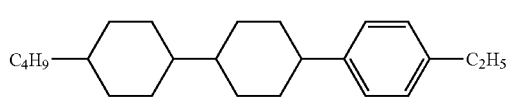
VA7
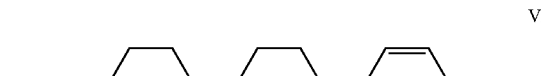
VA8
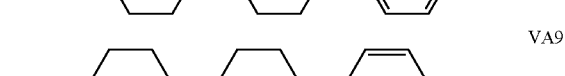
VA9
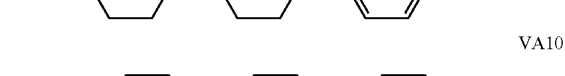
VA10
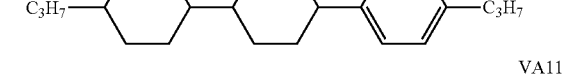
VA11
-continued
VA12
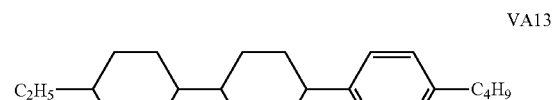
VA13
VA14
VA15
VA16
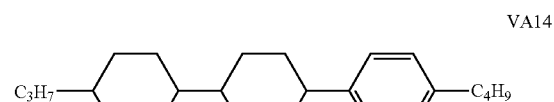
VB1
VB2
VB3
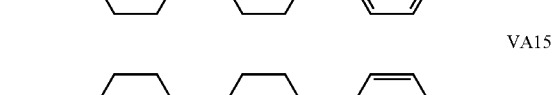
VB4
VB5
VB6
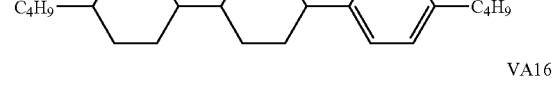
VB7
VB8
VB9

-continued

VB10

VB11

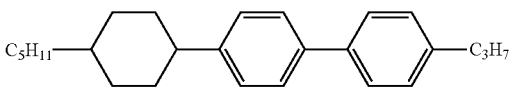
VB12

VB13

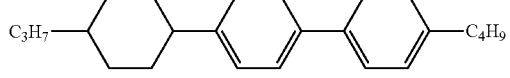
VB14

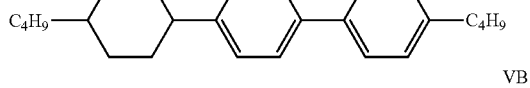
VB15

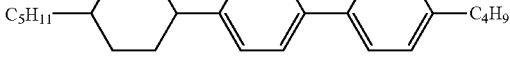
VB16 more preferably, the compound represented by general formula V is selected from one or more of VA1, VA2, VA6, VA10, VB1, VB2, VB4, VB6, and VB8, particularly preferably, the compound represented by general formula V is selected from one or more of VA2, VA10, VB1, VB2, VB4, and VB6;

preferably, the liquid crystal composition comprises a compound represented by general formula V with a mass percentage of 1-15%; more preferably, the liquid crystal composition comprises a compound represented by general formula V with a mass percentage of 3-13%; particularly preferably, the liquid crystal composition comprises a compound represented by formula VA2, VB2, and VB6 with a mass percentage of 3-13%;

as a preferred solution, the liquid crystal composition can also contain one or more compounds represented by general formula VI. The compound represented by general formula VI has a flexible function: when its addition amount is greater than 1%, it acts as a negative liquid crystal compound, and when its addition amount is less than 1%, it acts as an additive.

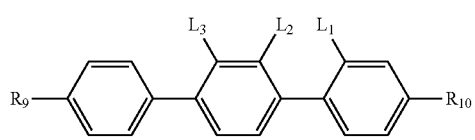
VI wherein $R_9$ each independently represents a $C_1$-$C_{12}$ linear alkyl, and $R_{10}$ each independently represents F, or a $C_1$-$C_{12}$ linear alkyl; $L_1$, $L_2$, and $L_3$ each independently represent H or F;

preferably, the compound represented by general formula VI is selected from one or more of formulas VIA-VIC:

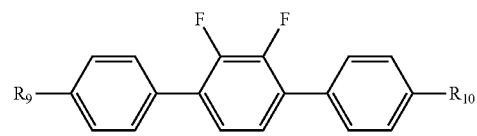
VIA

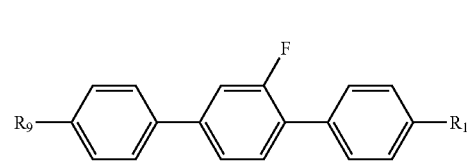
VIB

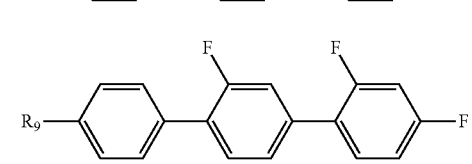
VIC wherein $R_9$ and $R_{10}$ each independently represent a $C_1$-$C_7$ linear alkyl;

preferably, the compound represented by general formula VI is selected from one or more of formulas VIA1-VIC4:

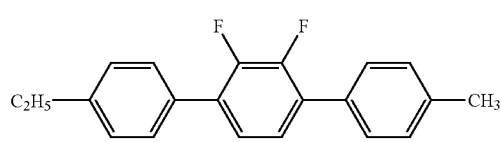
VIA1

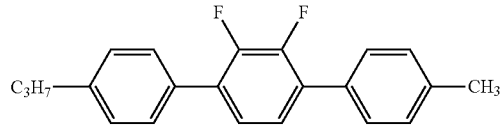
VIA2

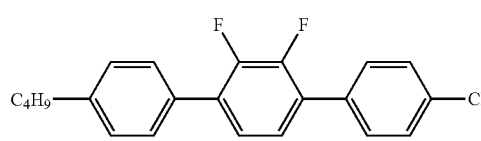
VIA3

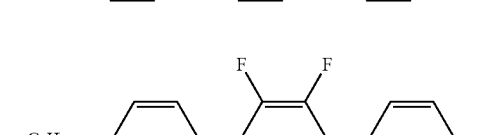
VIA4

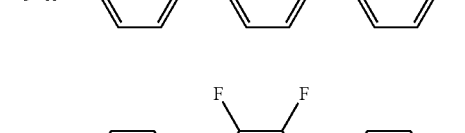
VIA5

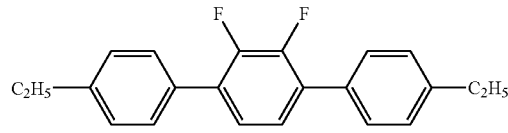

VIA6
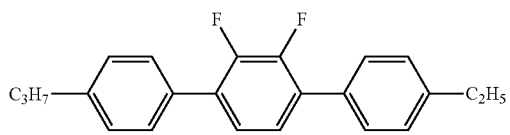
VIA7
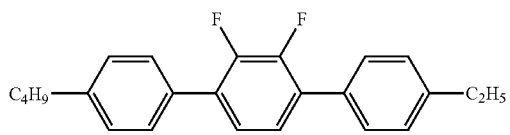
VIA8
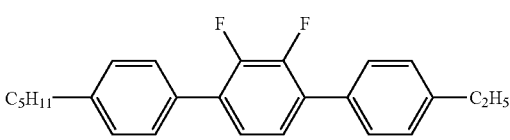
VIA9
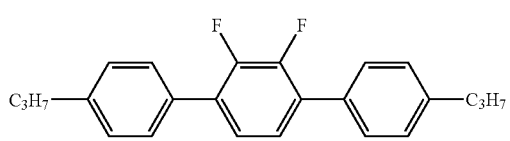
VIA10
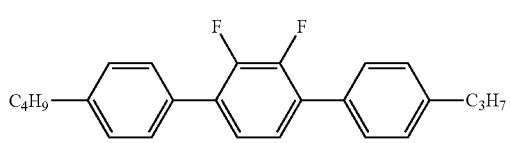
VIA11
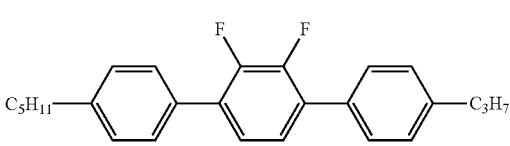
VIA12
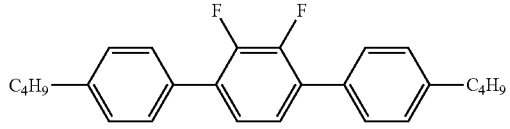
VIA13
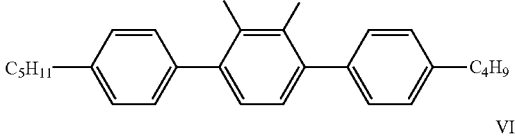
VIA14
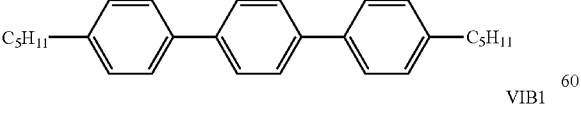
VIB1
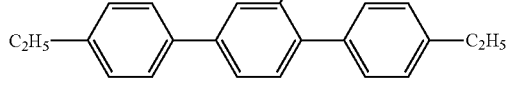
VIB2
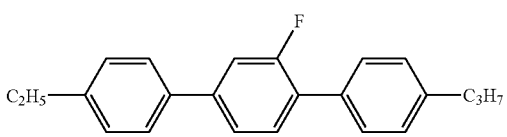
VIB3
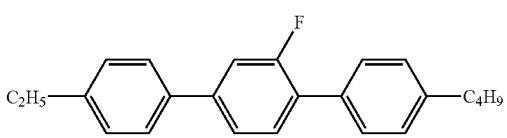
VIB4
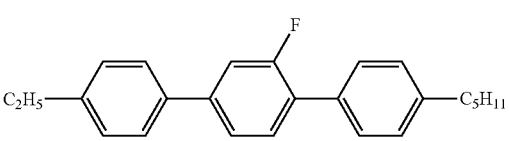
VIB5
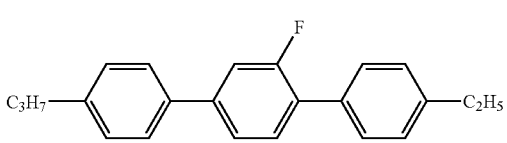
VIB6
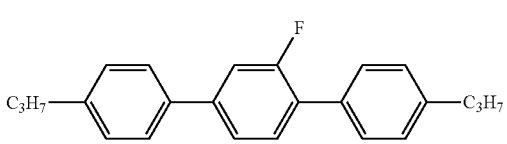
VIB7
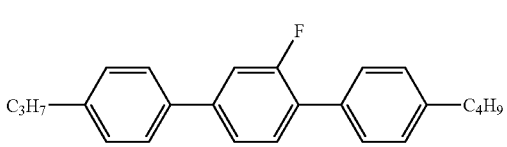
VIB8
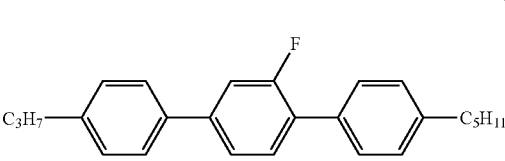
VIB9
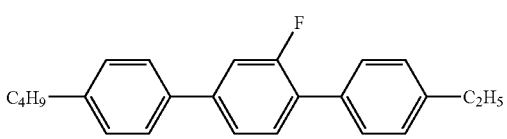
VIB10
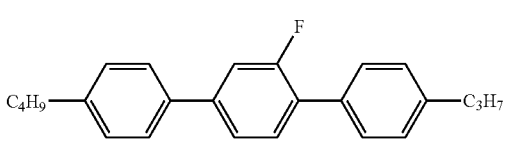
VIB11
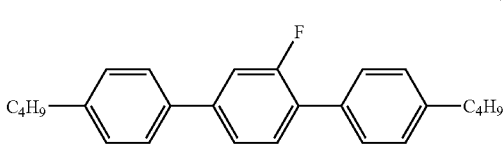

VIB12
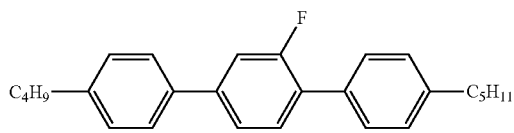

VIB13
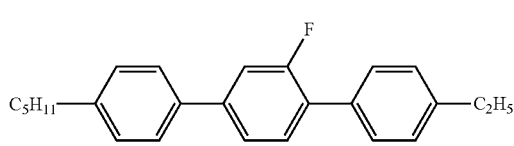

VIB14
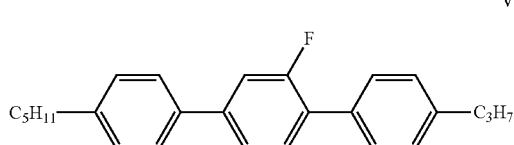

VIB15
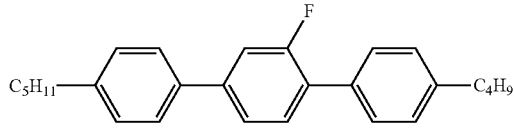

VIB16
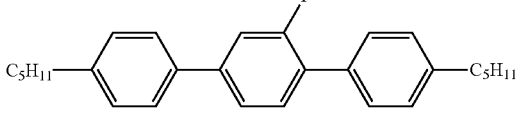

VIC1
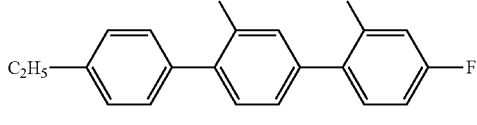

VIC2
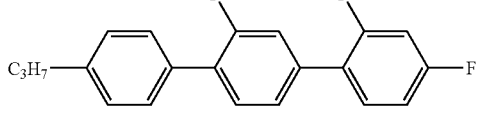

VIC3
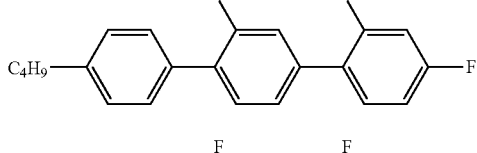

VIC4
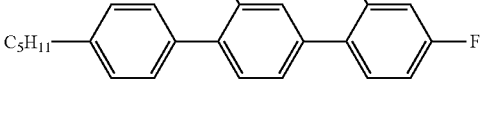

More preferably, the compound represented by general formula VI is selected from one or more of VIA6, VIA7, VIB2, VIB3, VIB4, VIB8, VIC1, VIC2, and VIC4; particularly preferably, the compound represented by general formula VI is selected from one or more of VIA6, VIA7, VIB2, VIB3, and VIC2.

Preferably, the liquid crystal composition also comprises one or more stabilizers with the following structures:

VII
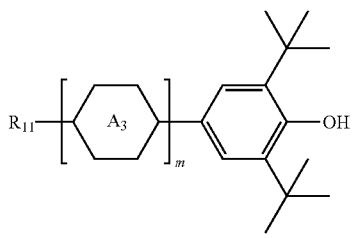

$R_{11}$ each independently represents $C_1$-$C_{12}$ linear alkyl, $A_3$ each independently represents 1,4-phenylene, trans-1,4-cyclohexyl, or 1,3-dioxane-2,5-diyl;

the polymerizable compound provided by the present invention is preferably polymerized by means of photopolymerization reaction under UV light irradiation.

The compound represented by the general formula II provided by the present invention is 2,3-difluorobenzene compound, which has high negative dielectric anisotropy, and the liquid crystal composition provided by the present invention produces a low threshold voltage;

the compound represented by the general formula III provided by the present invention is a bicyclic structure compound, which has low rotational viscosity and excellent mutual solubility, can effectively reduce the rotational viscosity of the liquid crystal composition and improve the response time.

The compound represented by general formula IV provided by the present invention is a compound containing methoxy bridge bond and 2,3-difluorobenzene, which has high negative dielectric anisotropy and reduces the driving voltage of the liquid crystal composition;

the compound represented by general formula V provided by the present invention is a tricyclic neutral compound, which has a high elastic constant and a high clearing point;

the compound represented by general formula VI provided by the present invention is a terphenyl compound, which has high optical anisotropy, can effectively improve the optical anisotropy of the liquid crystal composition, and can also quickly absorb UV light and promote the rapid polymerization of polymer monomers.

Preferably, the stabilizer represented by general formula VII contained in the liquid crystal composition is selected from one or more of the following structures:

VII
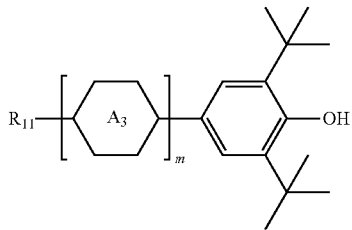

wherein $R_{11}$ each independently represents $C_1$-$C_{12}$ linear alkyl, $A_3$ each independently represents 1,4-phenylene, trans-1,4-cyclohexyl, or 1,3-dioxane-2,5-diyl.

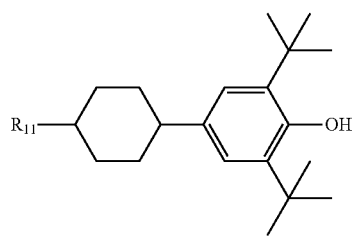
VIIA
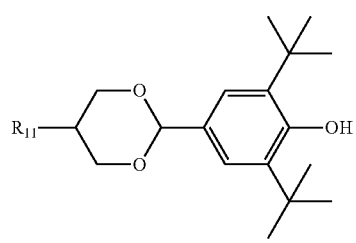
VIIB
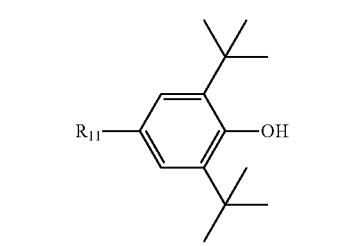
VIIC
$R_{11}$ each independently represents a $C_1$-$C_7$ linear alkyl; preferably, the compound represented by general formula VII is selected from one or more of VIIA1-VIIC7:
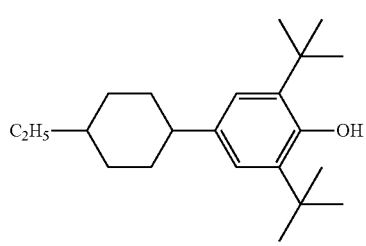
VIIA1
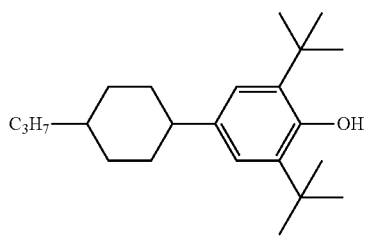
VIIA2
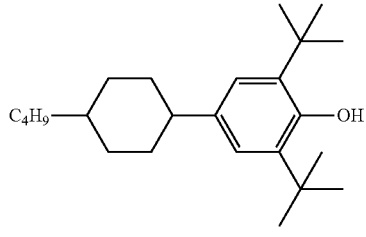
VIIA3
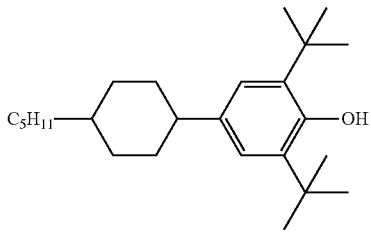
VIIA4
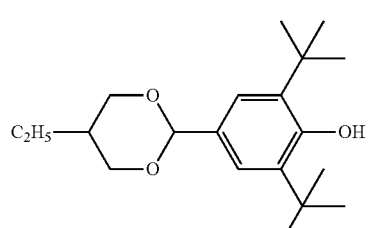
VIIB1
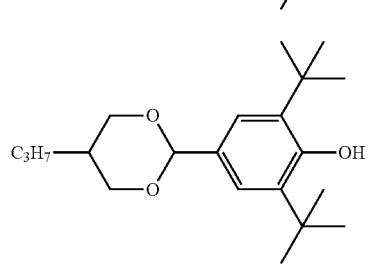
VIIB2
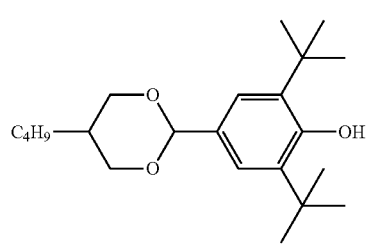
VIIB3
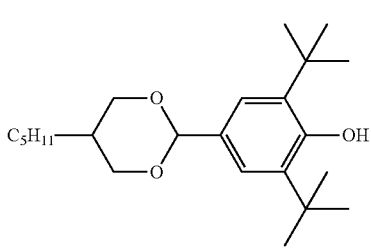
VIIB4
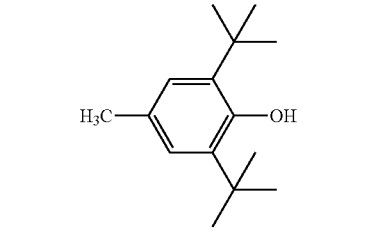
VIIC1

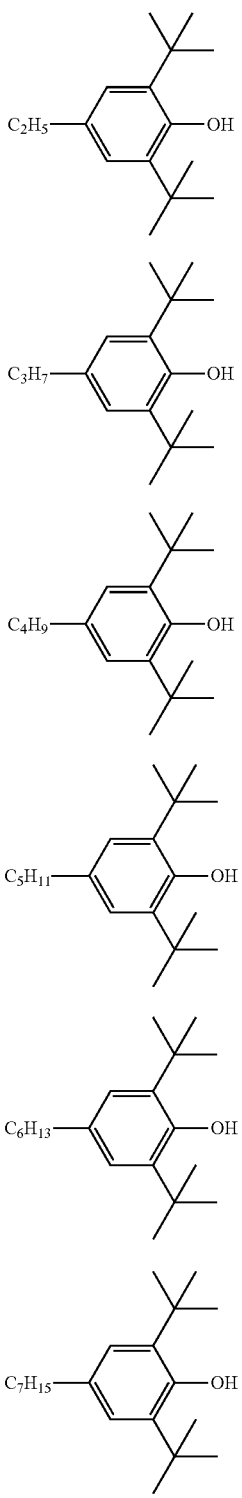

More preferably, the stabilizer of general formula VII provided by the present invention is selected from one or more of VIIA2, VIIB2, VIIC1, and VIIC7;

more preferably, the liquid crystal composition provided by the present invention contains one or more compounds selected from formulas VIIA2, VIIB2, VIIC1, and VIIC7 with a mass percentage of 0-0.05%; and particularly pref- erably, one or more compounds selected from formulas VIIA2, VIIB2, and VIIC7 with a mass percentage of 0.005-0.04%.

The liquid crystal composition provided by the present invention is used in PSVA mode liquid crystal display. After polymerization, an uniform polymer film is formed to improve the uneven display of liquid crystal display. In addition, the polymer film has stable alignment force and improve the residual image performance of the liquid crystal display; the liquid crystal composition provided by the present invention is used in PSVA mode liquid crystal display, which can realize adjustable polymerization reaction speed and meet the requirements of different process conditions.

In order to make the liquid crystal composition meet different needs, the liquid crystal composition provided by the present invention includes the following components by weight percentage:

the liquid crystal composition includes the following components by weight percentage:

the negative dielectric anisotropy liquid crystal composition:
(1) 5-30% of the compound represented by general formula II;
(2) 30-60% of the compound represented by general formula III;
(3) 15-40% of the compound represented by general formula IV;
(4) 1-20% of the compound represented by general formula V;
(5) 0-15% of the compound represented by general formula VI;
0.1-0.5% of the polymerizable compound represented by general formula I and 0-0.05% of the stabilizer represented by general formula VII are also added per 100 parts by weight of the negative dielectric anisotropy liquid crystal composition;

preferably, the nematic liquid crystal composition provided by the present invention includes the following components by weight percentage:

the negative dielectric anisotropy liquid crystal composition:
(1) 8-28% of the compound represented by general formula II;
(2) 35-55% of the compound represented by general formula III;
(3) 20-36% of the compound represented by general formula IV;
(4) 2-15% of the compound represented by general formula V;
(5) 0-10% of the compound represented by general formula VI;
0.2-0.4% of the polymerizable compound represented by general formula I and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
(1) 10-26% of the compound represented by general formula II;
(2) 41-50% of the compound represented by general formula III;

(3) 25-34% of the compound represented by general formula IV;
(4) 3-13% of the compound represented by general formula V;
(5) 0-5% of the compound represented by general formula VI; 0.2-0.4% of the polymerizable compound represented by general formula IA and/or IB and 0-0.04% of the stabilizer represented by general formula VIIA2, VIIIB2 or VIIC7 are also added per 100 parts by weight of the negative dielectric anisotropy liquid crystal composition;

preferably, the nematic liquid crystal composition provided by the present invention includes the following components by weight percentage:

the negative dielectric anisotropy liquid crystal composition:
(1) 8-28% of the compound represented by general formula II;
(2) 20-35% of the compound represented by formula IIIA;
(3) 0-10% of the compound represented by formula IIIB;
(4) 5-20% of the compound represented by formula IIIC;
(5) 5-16% of the compound represented by formula IVA;
(6) 10-26% of the compound represented by formula IVB;
(7) 2-15% of the compound represented by general formula V;
(8) 0-10% of the compound represented by general formula VI; 0.2-0.4% of the polymerizable compound represented by general formula I and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
(1) 10-26% of the compound represented by general formula II;
(2) 24-31% of the compound represented by formula IIIA;
(3) 0-7% of the compound represented by formula IIIB;
(4) 7-18% of the compound represented by formula IIIC;
(5) 9-14% of the compound represented by formula IVA;
(6) 14-23% of the compound represented by formula IVB;
(7) 3-13% of the compound represented by general formula V;
(8) 0-5% of the compound represented by general formula VI;
0.2-0.4% of the polymerizable compound represented by general formula IA and/or IB and 0-0.04% of the stabilizer represented by general formula VIIA2, VIIIB2 or VIIC7 are also added per 100 parts by weight of the negative dielectric anisotropy liquid crystal composition;

particularly preferably, the nematic liquid crystal composition provided by the present invention includes the following components by weight percentage:

the negative dielectric anisotropy liquid crystal composition:
(1) 10-20% of the compound of general formulas IIA13 and IIA14;
(2) 24-31% of the compound of formulas IIIA3, IIIA8 and IIIA9;
(3) 4-7% of the compound of formulas IIIB14 and IIIB18;
(4) 7-18% of the compound of formulas IIIC2 and IIIC4;
(5) 9-14% of the compound of formula IVA6;
(6) 14-23% of the compound of formulas IVB5 and IVB6;
(7) 3-13% of the compound of general formulas VA2, VB2 and VB6;
(8) 0-5% of the compound of general formula VIC2;
0.2-0.4% of the polymerizable compound represented by general formula IA and/or IB and 0-0.04% of the stabilizer represented by general formula VIIA2, VIIIB2 or VIIC7 are also added per 100 parts by weight of the negative dielectric anisotropy liquid crystal composition;

preferably, the nematic liquid crystal composition provided by the present invention includes the following components by weight percentage:

the negative dielectric anisotropy liquid crystal composition:
(1) 8-28% of the compound represented by general formula II;
(2) 35-55% of the compound represented by general formula III;
(3) 20-36% of the compound represented by general formula IV;
(4) 2-15% of the compound represented by general formula V; 0.2-0.4% of the polymerizable compound represented by general formula I and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
(1) 10-26% of the compound represented by general formula II;
(2) 41-50% of the compound represented by general formula III;
(3) 25-34% of the compound represented by general formula IV;
(4) 3-13% of the compound represented by general formula V;
and 0.2-0.4% of the polymerizable compound represented by general formula IA and/or IB and 0-0.04% of the stabilizer represented by general formula VIIA2, VIIIB2 or VIIC7;

preferably, the nematic liquid crystal composition provided by the present invention includes the following components by weight percentage:

the negative dielectric anisotropy liquid crystal composition:
(1) 8-28% of the compound represented by general formula II;
(2) 20-35% of the compound represented by formula IIIA;
(3) 0-10% of the compound represented by formula IIIB;
(4) 8-20% of the compound represented by formula IIIC;
(5) 8-16% of the compound represented by formula IVA;
(6) 10-26% of the compound represented by formula IVB;
(7) 2-15% of the compound represented by general formula V;
0.2-0.4% of the polymerizable compound represented by general formula I and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
- (1) 10-26% of the compound represented by general formula II;
- (2) 24-31% of the compound represented by formula IIIA;
- (3) 0-7% of the compound represented by formula IIIB;
- (4) 11-18% of the compound represented by formula IIIC;
- (5) 9-14% of the compound represented by formula IVA;
- (6) 14-23% of the compound represented by formula IVB;
- (7) 3-13% of the compound represented by general formula V;
- 0.2-0.4% of the polymerizable compound represented by general formula IA and/or IB and 0-0.04% of the stabilizer represented by general formula VIIA2, VIIB2 or VIIC7 are also added per 100 parts by weight of the negative dielectric anisotropy liquid crystal composition;

particularly preferably, the nematic liquid crystal composition provided by the present invention includes the following components by weight percentage: the negative dielectric anisotropy liquid crystal composition:
- (1) 10-20% of the compound of general formulas IIA13 and IIA14;
- (2) 24-31% of the compound of formulas IIIA3, IIIA8 and IIIA9;
- (3) 4-7% of the compound of formulas IIIB14 and IIIB18;
- (4) 7-18% of the compound of formulas IIIC2 and IIIC4;
- (5) 9-14% of the compound of formula IVA6;
- (6) 14-23% of the compound of formulas IVB5 and IVB6;
- (7) 3-13% of the compound of general formulas VA2, VB2 and VB6;
- 0.2-0.4% of the polymerizable compound represented by general formula IA and/or IB and 0-0.04% of the stabilizer represented by general formula VIIA2, VIIIB2 or VIIC7 are also added per 100 parts by weight of the negative dielectric anisotropy liquid crystal composition;

preferably, the nematic liquid crystal composition provided by the present invention includes the following components by weight percentage:
the negative dielectric anisotropy liquid crystal composition:
- (1) 8-28% of the compound represented by general formula II;
- (2) 35-55% of the compound represented by general formula III;
- (3) 20-36% of the compound represented by general formula IV;
- (4) 2-15% of the compound represented by general formula V;
- 0.2-0.4% of the polymerizable compound represented by general formula I, 0.1-1% of the compound represented by general formula VI and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:
the negative dielectric anisotropy liquid crystal composition:
- (1) 10-26% of the compound represented by general formula II;
- (2) 41-50% of the compound represented by general formula III;
- (3) 25-34% of the compound represented by general formula IV;
- (4) 3-13% of the compound represented by general formula V;
- 0.2-0.4% of the polymerizable compound represented by general formula IA and/or IB, 0.2-0.6% of the compound represented by general formula VI and 0-0.04% of the stabilizer represented by general formula VIIA2, VIIB2 or VIIC7 are also added per 100 parts by weight of the negative dielectric anisotropy liquid crystal composition;

preferably, the nematic liquid crystal composition provided by the present invention includes the following components by weight percentage:
the negative dielectric anisotropy liquid crystal composition:
- (1) 8-28% of the compound represented by general formula II;
- (2) 20-35% of the compound represented by formula IIIA;
- (3) 0-10% of the compound represented by formula IIIB;
- (4) 8-20% of the compound represented by formula IIIC;
- (5) 8-16% of the compound represented by formula IVA;
- (6) 10-26% of the compound represented by formula IVB;
- (7) 2-15% of the compound represented by general formula V;
- 0.2-0.4% of the polymerizable compound represented by general formula I, 0.1-1% of the compound represented by general formula VI and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:
the negative dielectric anisotropy liquid crystal composition:
- (1) 10-26% of the compound represented by general formula II;
- (2) 24-31% of the compound represented by formula IIIA;
- (3) 0-7% of the compound represented by formula IIIB;
- (4) 11-18% of the compound represented by formula IIIC;
- (5) 9-14% of the compound represented by formula IVA;
- (6) 14-23% of the compound represented by formula IVB;
- (7) 3-13% of the compound represented by general formula V;
- 0.2-0.4% of the polymerizable compound represented by general formula IA and/or IB, 0.2-0.6% of the compound represented by general formula VI and 0-0.04% of the stabilizer represented by general formula VIIA2, VIIB2 or VIIC7 are also added per 100 parts by weight of the negative dielectric anisotropy liquid crystal composition;

particularly preferably, the nematic liquid crystal composition provided by the present invention includes the following components by weight percentage:
the negative dielectric anisotropy liquid crystal composition:
- (1) 10-20% of the compound of general formulas IIA13 and IIA14;
- (2) 24-31% of the compound of formulas IIIA3, IIIA8 and IIIA9;
- (3) 4-7% of the compound of formulas IIIB14 and IIIB18;
- (4) 7-18% of the compound of formulas IIIC2 and IIIC4;
- (5) 9-14% of the compound of formula IVA6;
- (6) 14-23% of the compound of formulas IVB5 and IVB6;
- (7) 3-13% of the compound of general formulas VA2, VB2 and VB6;
- 0.2-0.4% of the polymerizable compound represented by general formula IA and/or IB, 0.2-0.5% of the compound represented by general formula VIC2 and 0-0.04% of the stabilizer represented by general formula VIIA2, VIIB2 or VIIC7 are also added per 100 parts by weight of the negative dielectric anisotropy liquid crystal composition;

preferably, the nematic liquid crystal composition provided by the present invention includes the following components by weight percentage:

the negative dielectric anisotropy liquid crystal composition:
(1) 10-18% of the compound represented by general formula II;
(2) 40-50% of the compound represented by general formula III;
(3) 28-38% of the compound represented by general formula IV;
(4) 2-10% of the compound represented by general formula V;
(5) 1-10% of the compound represented by general formula VI;
0.2-0.4% of the polymerizable compound represented by general formula I and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
(1) 13-14% of the compound represented by general formula II;
(2) 44-47% of the compound represented by general formula III;
(3) 31-34% of the compound represented by general formula IV;
(4) 4-6% of the compound represented by general formula V;
(5) 1-5% of the compound represented by general formula VI;
0.2-0.4% of the polymerizable compound represented by general formula IA and/or IB and 0-0.04% of the stabilizer represented by general formula VIIA2, VIIB2 or VIIC7 are also added per 100 parts by weight of the negative dielectric anisotropy liquid crystal composition;

preferably, the nematic liquid crystal composition provided by the present invention includes the following components by weight percentage:

the negative dielectric anisotropy liquid crystal composition:
(1) 8-28% of the compound represented by general formula II;
(2) 35-55% of the compound represented by general formula III;
(3) 20-36% of the compound represented by general formula IV;
(4) 2-15% of the compound represented by general formula V; 0.2-0.4% of the polymerizable compound of IA, 0.1-1% of the compound represented by general formula VI and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
(1) 10-26% of the compound represented by general formula II;
(2) 41-50% of the compound represented by general formula III;
(3) 25-34% of the compound represented by general formula IV;
(4) 3-13% of the compound represented by general formula V;
0.2-0.4% of the polymerizable compound represented by formula IA, 0.2-0.6% of the compound represented by general formula VI and 0-0.04% of the stabilizer represented by general formula VIIA2, VIIB2 or VIIC7 are also added per 100 parts by weight of the negative dielectric anisotropy liquid crystal composition;

preferably, the nematic liquid crystal composition provided by the present invention includes the following components by weight percentage:

the negative dielectric anisotropy liquid crystal composition:
(1) 8-28% of the compound represented by general formula II;
(2) 20-35% of the compound represented by formula IIIA;
(3) 0-10% of the compound represented by formula IIIB;
(4) 8-20% of the compound represented by formula IIIC;
(5) 8-16% of the compound represented by formula IVA;
(6) 10-26% of the compound represented by formula IVB;
(7) 2-15% of the compound represented by general formula V;
0.2-0.4% of the polymerizable compound represented by formula IA, 0.1-1% of the compound represented by general formula VI and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
(1) 10-26% of the compound represented by general formula II;
(2) 24-31% of the compound represented by formula IIIA;
(3) 0-7% of the compound represented by formula IIIB;
(4) 11-18% of the compound represented by formula IIIC;
(5) 9-14% of the compound represented by formula IVA;
(6) 14-23% of the compound represented by formula IVB;
(7) 3-13% of the compound represented by general formula V;
0.2-0.4% of the polymerizable compound represented by formula IA, 0.2-0.6% of the compound represented by general formula VI and 0-0.04% of the stabilizer represented by general formula VIIA2, VIIB2 or VIIC7 are also added per 100 parts by weight of the negative dielectric anisotropy liquid crystal composition;

particularly preferably, the nematic liquid crystal composition provided by the present invention includes the following components by weight percentage:

the negative dielectric anisotropy liquid crystal composition:
(1) 10-20% of the compound of general formulas IIA13 and IIA14;
(2) 24-31% of the compound of formulas IIIA3, IIIA8 and IIIA9;
(3) 4-7% of the compound of formulas IIIB14 and IIIB18;
(4) 7-18% of the compound of formulas IIIC2 and IIIC4;

(5) 9-14% of the compound of formula IVA6;
(6) 14-23% of the compound of formulas IVB5 and IVB6;
(7) 3-13% of the compound of general formulas VA2, VB2 and VB6;
0.2-0.4% of the polymerizable compound represented by formula IA, 0.2-0.5% of the compound represented by general formula VIC2 and 0-0.04% of the stabilizer represented by general formula VIIA2, VIIB2 or VIIC7 are also added per 100 parts by weight of the negative dielectric anisotropy liquid crystal composition;

preferably, the nematic liquid crystal composition provided by the present invention includes the following components by weight percentage:
the negative dielectric anisotropy liquid crystal composition:
(1) 8-28% of the compound represented by general formula II;
(2) 35-55% of the compound represented by general formula III;
(3) 20-36% of the compound represented by general formula IV;
(4) 2-15% of the compound represented by general formula V;
0.2-0.4% of the polymerizable compound of IB, 0.05-1% of the compound represented by general formula VI and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:
the negative dielectric anisotropy liquid crystal composition:
(1) 10-26% of the compound represented by general formula II;
(2) 41-50% of the compound represented by general formula III;
(3) 25-34% of the compound represented by general formula IV;
(4) 3-13% of the compound represented by general formula V;
0.25-0.40% of the polymerizable compound represented by formula IB, 0.1-0.4% of the compound represented by general formula VI and 0-0.04% of the stabilizer represented by general formula VIIB2, VIIB2 or VIIC7 are also added per 100 parts by weight of the negative dielectric anisotropy liquid crystal composition;

preferably, the nematic liquid crystal composition provided by the present invention includes the following components by weight percentage:
the negative dielectric anisotropy liquid crystal composition:
(1) 8-28% of the compound represented by general formula II;
(2) 20-35% of the compound represented by formula IIIB;
(3) 0-10% of the compound represented by formula IIIB;
(4) 8-20% of the compound represented by formula IIIC;
(5) 8-16% of the compound represented by formula IVA;
(6) 10-26% of the compound represented by formula IVB;
(7) 2-15% of the compound represented by general formula V;
0.2-0.4% of the polymerizable compound represented by formula IB, 0.05-1% of the compound represented by general formula VI and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:
the negative dielectric anisotropy liquid crystal composition:
(1) 10-26% of the compound represented by general formula II;
(2) 24-31% of the compound represented by formula IIIB;
(3) 0-7% of the compound represented by formula IIIB;
(4) 11-18% of the compound represented by formula IIIC;
(5) 9-14% of the compound represented by formula IVA;
(6) 14-23% of the compound represented by formula IVB;
(7) 3-13% of the compound represented by general formula V;
0.25-0.40% of the polymerizable compound represented by formula IB, 0.1-0.4% of the compound represented by general formula VI and 0-0.04% of the stabilizer represented by general formula VIIB2, VIIB2 or VIIC7 are also added per 100 parts by weight of the negative dielectric anisotropy liquid crystal composition;

particularly preferably, the nematic liquid crystal composition provided by the present invention includes the following components by weight percentage:
the negative dielectric anisotropy liquid crystal composition:
(1) 10-20% of the compound of general formulas IIB13 and IIB14;
(2) 24-31% of the compound of formulas IIIB3, IIIB8 and IIIB9;
(3) 4-7% of the compound of formulas IIIB14 and IIIB18;
(4) 7-18% of the compound of formulas IIIC2 and IIIC4;
(5) 9-14% of the compound of formula IVA6;
(6) 14-23% of the compound of formulas IVB5 and IVB6;
(7) 3-13% of the compound of general formulas VA2, VB2 and VB6;
0.25-0.40% of the polymerizable compound represented by formula IB, 0.1-0.4% of the compound of general formula VIC2 and 0-0.04% of the stabilizer represented by general formula VIIB2, VIIB2 or VIIC7 are also added per 100 parts by weight of the negative dielectric anisotropy liquid crystal composition;

preferably, the nematic liquid crystal composition provided by the present invention includes the following components by weight percentage:
the negative dielectric anisotropy liquid crystal composition:
(1) 8-28% of the compound represented by general formula II;
(2) 35-55% of the compound represented by general formula III;
(3) 20-36% of the compound represented by general formula IV;
(4) 2-15% of the compound represented by general formula V;
0.05-0.25% of the polymerizable compound represented by formula IA, 0.05-0.25% of the polymerizable compound represented by formula IB and 0-0.04% of the stabilizer represented by general formula VII is also included per 100 parts by weight of the negative dielectric anisotropy liquid crystal composition;

more preferably, the nematic liquid crystal composition provided by the present invention includes the following components by weight percentage:

the negative dielectric anisotropy liquid crystal composition:
(1) 10-26% of the compound represented by general formula II;
(2) 41-50% of the compound represented by general formula III;
(3) 25-34% of the compound represented by general formula IV;
(4) 3-13% of the compound represented by general formula V;
0.05-0.25% of the polymerizable compound represented by formula IA, 0.05-0.25% of the polymerizable compound represented by formula D3 and 0.25-0.35% by mass percentage of the polymerizable compound represented by general formula I and 0-0.04% of the stabilizer represented by general formula VIIB2, VIIB2 or VIIC7 are also added per 100 parts by weight of the negative dielectric anisotropy liquid crystal composition;

preferably, the nematic liquid crystal composition provided by the present invention includes the following components by weight percentage:
the negative dielectric anisotropy liquid crystal composition:
(1) 8-28% of the compound represented by general formula II;
(2) 20-35% of the compound represented by formula IIIB;
(3) 0-10% of the compound represented by formula IIIB;
(4) 8-20% of the compound represented by formula IIIC;
(5) 8-16% of the compound represented by formula IVA;
(6) 10-26% of the compound represented by formula IVB;
(7) 2-15% of the compound represented by general formula V;
0.05-0.25% of the polymerizable compound represented by formula IA, 0.05-0.25% of the polymerizable compound represented by formula IB and 0-0.04% of the stabilizer represented by general formula VII are also added per 100 parts by weight of the negative dielectric anisotropy liquid crystal composition;

more preferably, the nematic liquid crystal composition provided by the present invention includes the following components by weight percentage:
the negative dielectric anisotropy liquid crystal composition:
(1) 10-26% of the compound represented by general formula II;
(2) 24-31% of the compound represented by formula IIIB;
(3) 0-7% of the compound represented by formula IIIB;
(4) 11-18% of the compound represented by formula IIIC;
(5) 9-14% of the compound represented by formula IVA;
(6) 14-23% of the compound represented by formula IVB;
(7) 3-13% of the compound represented by general formula V;
0.05-0.25% of the polymerizable compound represented by formula IA, 0.05-0.25% of the polymerizable compound represented by formula D3 and 0.25-0.35% by mass percentage of the polymerizable compound represented by general formula I and 0-0.04% of the stabilizer represented by general formula VIIB2, VIIB2 or VIIC7 are also added per 100 parts by weight of the negative dielectric anisotropy liquid crystal composition;

particularly preferably, the nematic liquid crystal composition provided by the present invention includes the following components by weight percentage:
the negative dielectric anisotropy liquid crystal composition:
(1) 10-20% of the compound of general formulas IIB13 and IIB14;
(2) 24-31% of the compound of formulas IIIB3, IIIB8 and IIIB9;
(3) 4-7% of the compound of formulas IIIB14 and IIIB18;
(4) 7-18% of the compound of formulas IIIC2 and IIIC4;
(5) 9-14% of the compound of formula IVA6;
(6) 14-23% of the compound of formulas IVB5 and IVB6;
(7) 3-13% of the compound of general formulas VA2, VB2 and VB6;
0.05-0.25% of the polymerizable compound represented by formula IA, 0.05-0.25% of the polymerizable compound represented by formula D3 and 0.25-0.35% by mass percentage of the polymerizable compound represented by general formula I and 0-0.04% of the stabilizer represented by general formula VIIB2, VIIB2 or VIIC7 are also added per 100 parts by weight of the negative dielectric anisotropy liquid crystal composition.

The method for producing the nematic liquid crystal composition of the present invention is not particularly limited, and the liquid crystal composition may be produced by mixing two or more compounds using a conventional method, e.g., being prepared by a method of mixing and dissolving various components at a high temperature, wherein the liquid crystal composition is dissolved in a solvent used for the compounds and mixed, and then the solvent is distilled off under a reduced pressure; or the liquid crystal composition of the present invention may be prepared according to a conventional method, e.g., being obtained by dissolving components with lower contents therein into main components with higher contents at a higher temperature, or dissolving the various components in an organic solvent, such as acetone, chloroform or methanol, and then mixing the solution, followed by the removal of the solvent.

Another object of the present invention is to claim the use of the liquid crystal composition of the present invention in PSVA mode displays.

The present invention has the following beneficial effects: the liquid crystal composition provided by the present invention is used in PSVA liquid crystal display, has high reliability and stable alignment force after polymerization, is very effective for improving the residual image problem of liquid crystal display, and can also meet the requirements of different process conditions through the adjustment of polymer monomers.

DETAILED DESCRIPTION OF EMBODIMENTS

Figure 1:
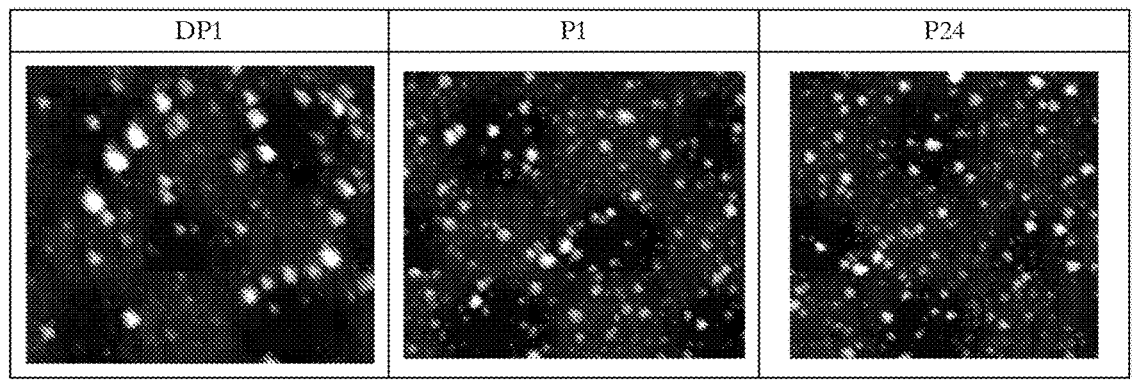
FIG. 1 is an AFM image (atomic force microscope) of the polymer film formed by polymerizing DP1, P1, and P24.

The following embodiments are intended to illustrate the present invention, but not to limit the scope of the present invention.

Unless otherwise indicated, the percentage in the present invention is weight percentage; the temperature unit is degrees Celsius; $\Delta n$ represents optical anisotropy (25° C.); $\Delta\varepsilon$ represents dielectric anisotropy (25° C., 1000 Hz); $\gamma 1$ represents rotational viscosity (mPa·s, 25° C.); Cp represents the clearing point (° C.) of the liquid crystal composition;

and $K_{11}$, $K_{22}$ and $K_{33}$ represent the splaying, twisting and bending elastic constants (pN, 25° C.), respectively; $V_{10}$ represents the threshold voltage of the liquid crystal display (V, 25° C., 64 Hz); T represents the response time (ms, 25° C.); and the pretilt angle (°) is the angle between the liquid crystal molecule and the glass substrate.

In each of the following examples, the group structures in the liquid crystal compound are represented by the codes shown in Table 1.

TABLE 1

Group structure code of the liquid crystal compound

| Group | Code | Group name |
|---|---|---|
|  | C | 1,4-cyclohexyl |
|  | P | 1,4-phenylene |
|  | S | 1,4-cyclohexene |
| 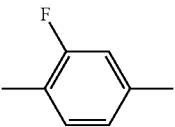 | GI | 2-fluoro-1,4-phenylene |
| 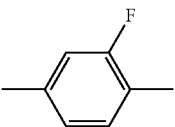 | G | 2-fluoro-1,4-phenylene |
| 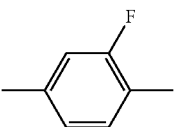 | U | 2,6-difluoro-1,4-phenylene |
| 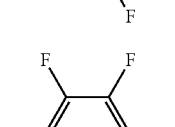 | W | 2,3-difluoro-1,4-phenylene |
| 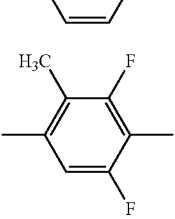 | K | 2-methyl-3,5-difluoro-1,4-phenylene |
| -O- | O | Oxygen substituent |
| -F | F | Fluorine substituent |
| -CF$_3$ | CF$_3$ | Trifluoromethyl |
| C$_n$H$_{2n+1}$ or C$_m$H$_{2m+1}$ | n or m | Alkyl |
| -CF$_2$O- | Q | Difluoromethoxy bridge bond |
| -OCF$_2$H | OCF$_2$H | Difluoromethoxy |

TABLE 1-continued

Group structure code of the liquid crystal compound

| Group | Code | Group name |
|---|---|---|
| 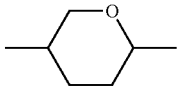 | A | 2,5-tetrahydropyran |
| 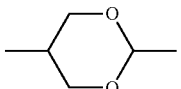 | D | 2,6-dioxo-1,4-dioxane |
| -(CH$_2$)$_n$- | n | Alkylene |
| —C≡C— | T | Acetylenic bond |
| —HC=CH— | V | Alkenyl |

Taking the following compound structures as an example:

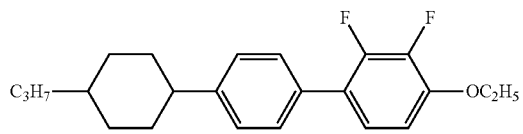

Represented as: 3CPWO2

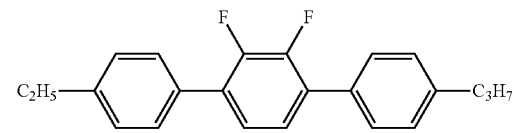

Represented as: 2PWP3

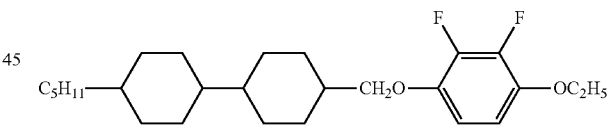

Represented as: 5CC1OWO2

In each of the following examples, the liquid crystal compositions are all prepared by a thermal dissolution method, comprising the following steps of: weighing liquid crystal compounds in percentage by weight using a balance, wherein the order of weighing and addition is not particularly specified; heating and stirring same at 60-100° C. so that each component is melted uniformly; then subjecting same to filtration and rotary evaporation; and finally performing encapsulation to obtain a target sample.

In each of the following examples, the weight percentage of each component in the liquid crystal composition and the performance parameters of the liquid crystal composition are shown in the following tables. All the compounds involved are known compounds, all of which are commercially available or provided by BaYi Space Liquid Crystal Technology Co., Ltd.

Example 1

The nematic liquid crystal composition N1 is prepared as follows:

| Category | Compound code | Percentage by weight (%) | Performance parameter | Parameter value |
|---|---|---|---|---|
| II | 2CPWO2 | 4 | Cp | 76 |
| II | 3CPWO2 | 10 | Δn | 0.109 |
| III | 3PP1 | 15 | Δε | −3.3 |
| III | 3CC2 | 18.5 | $K_{11}$ | 15.0 |
| III | 3CC4 | 6 | $K_{33}$ | 15.4 |
| III | 3CPO2 | 4 | γ1 | 99.0 |
| IV | 3C1OWO2 | 11 | | |
| IV | 2CC1OWO2 | 8 | | |
| IV | 3CC1OWO2 | 15 | | |
| V | 3CPP1 | 8.5 | | |

On the basis of the nematic liquid crystal N1, 0.20% of a polymerizable compound of IA, 0.10% of a polymerizable compound of D3 and 0.017% of a stabilizer of VIIA2, by mass percentage of the total amount of N1 are added, and mixed uniformly to obtain a liquid crystal composition P1 for PSVA;

on the basis of the nematic liquid crystal N1, 0.15% of a polymerizable compound of IA, 0.15% of a polymerizable compound of D3 and 0.017% of a stabilizer of VIIA2, by mass percentage of the total amount of N1 are added, and mixed uniformly to obtain a liquid crystal composition P2 for PSVA;

on the basis of the nematic liquid crystal N1, 0.20% of a polymerizable compound of IA, 0.10% of a polymerizable compound of D3 and 0.017% of a stabilizer of VIIC7, by mass percentage of the total amount of N1 are added, and mixed uniformly to obtain a liquid crystal composition P3 for PSVA;

on the basis of the nematic liquid crystal N1, 0.20% of a polymerizable compound of IA, 0.10% of a polymerizable compound of D3 and 0.017% of a stabilizer of VIIB2, by mass percentage of the total amount of N1 are added, and mixed uniformly to obtain a liquid crystal composition P4 for PSVA;

on the basis of the nematic liquid crystal N1, 0.15% of a polymerizable compound of IA, 0.15% of a polymerizable compound of D3 and 0.017% of a stabilizer of VIIC7, by mass percentage of the total amount of N1 are added, and mixed uniformly to obtain a liquid crystal composition P5 for PSVA;

on the basis of the nematic liquid crystal N1, 0.30% of a polymerizable compound of IA, 0.25% of a compound of VIC2 and 0.017% of a stabilizer of VIIA2, by mass percentage of the total amount of N1 are added, and mixed uniformly to obtain a liquid crystal composition P6 for PSVA;

on the basis of the nematic liquid crystal N1, 0.30% of a polymerizable compound of IA, 0.30% of a compound of VIC2 and 0.020% of a stabilizer of VIIA2, by mass percentage of the total amount of N1 are added, and mixed uniformly to obtain a liquid crystal composition P7 for PSVA;

on the basis of the nematic liquid crystal N1, 0.30% of a polymerizable compound of IA, 0.50% of a compound of VIC2 and 0.030% of a stabilizer of VIIA2, by mass percentage of the total amount of N1 are added, and mixed uniformly to obtain a liquid crystal composition P8 for PSVA;

P1, P2, P3, P4, P5, P6, P7 and P8 are filled into a standard VA testing cassete to test the pretilt angle, and then same is irradiated with UV light having an intensity of 5.5 mw/cm² (313 nm) for 90 s under the application of 10 V voltage to promote the polymerization of the polymerizable compound represented by general formula I, and the liquid crystal is aligned by using the film formed after polymerization, and finally the pretilt angle after the UV irradiation is tested:

| | P1 | P2 | P3 | P4 | P5 | P6 | P7 | P8 |
|---|---|---|---|---|---|---|---|---|
| Before irradiation | 89.7 | 89.7 | 89.7 | 89.7 | 89.7 | 89.7 | 89.7 | 89.7 |
| After irradiation | 88.5 | 88.2 | 88.4 | 88.5 | 88.2 | 88.6 | 88.5 | 88.4 |

After polymerization, a stable pretilt angle is formed;

then the above liquid crystal testing cassete is irradiated with 6 mw/cm² (365 nm) UV light for 100 min to promote the polymerization of the residual general formula I. After irradiation, the participation content of general formula I is tested, and the test results are shown in the table below:

| General formula I | P1 | P2 | P3 | P4 | P5 | P6 | P7 | P8 |
|---|---|---|---|---|---|---|---|---|
| Residual amount IA | 30 ppm | 18 ppm | 20 ppm | 43 ppm | 14 ppm | 43 ppm | 36 ppm | 28 ppm |
| IB | 12 ppm | 14 ppm | 12 ppm | 15 ppm | 18 ppm | — | — | — |

After the polymerization is completed, there are few residual polymerizable monomers, and the liquid crystal display made of the composition has good residual image performance and improves the display effect of the liquid crystal display.

The testing cassetes of P1, P2, P3, P4, P5, P6, P7 and P8 after polymerization are applied with a voltage of 10V under the backlight irradiation with a light intensity of 4000 nit or more at 60° C. for 10 days, and then the pretilt angle is tested. The test values are as follows:

| | P1 | P2 | P3 | P4 | P5 | P6 | P7 | P8 |
|---|---|---|---|---|---|---|---|---|
| Initial | 88.5 | 88.3 | 88.4 | 88.5 | 88.2 | 88.6 | 88.5 | 88.4 |
| After 10 days | 88.4 | 88.2 | 88.3 | 88.3 | 88.2 | 88.5 | 88.4 | 88.3 |
| Difference value | 0.1 | 0.1 | 0.1 | 0.2 | 0.0 | 0.1 | 0.1 | 0.1 |

The liquid crystal composition provided by the present invention has good pretilt angle stability after polymerization, which is very effective for improving the residual image of PSVA liquid crystal display.

Example 2

The nematic liquid crystal composition N2 is prepared as follows:

| Category | Compound code | Percentage by weight (%) | Performance parameter | Parameter value |
|---|---|---|---|---|
| II | 2CPWO2 | 6 | Cp | 76 |
| II | 3CPWO2 | 10.5 | Δn | 0.110 |
| III | 5PP1 | 15 | Δε | −3.3 |
| III | 3CPO2 | 4 | $K_{11}$ | 15.2 |
| III | 3CC2 | 18.5 | $K_{33}$ | 15.6 |
| III | 3CC4 | 6 | γ1 | 101 |
| IV | 3C1OWO2 | 11 | | |
| IV | 2CC1OWO2 | 6 | | |
| IV | 3CC1OWO2 | 15 | | |
| V | 3CPP1 | 8 | | |

On the basis of the nematic liquid crystal N2, 0.18% of a polymerizable compound of IA, 0.12% of a polymerizable compound of D3 and 0.015% of a stabilizer of VIIA2, by mass percentage of the total amount of N2 are added, and mixed uniformly to obtain a liquid crystal composition P9 for PSVA;

on the basis of the nematic liquid crystal N2, 0.18% of a polymerizable compound of IA, 0.12% of a polymerizable compound of D3 and 0.015% of a stabilizer of VIIC7, by mass percentage of the total amount of N2 are added, and mixed uniformly to obtain a liquid crystal composition P10 for PSVA;

P9 and P10 are filled into a standard VA testing cassete to test the pretilt angle, and then same is irradiated with UV light having an intensity of 5.5 mw/cm2 (313 nm) for 90 s under the application of 10 V voltage to promote the polymerization of the polymerizable compound represented by general formula I, and the liquid crystal is aligned by using the film formed after polymerization, and finally the pretilt angle after the UV irradiation is tested:

| | P9 | P10 |
|---|---|---|
| Before irradiation | 89.7 | 89.7 |
| After irradiation | 88.5 | 88.4 |

After polymerization, a stable pretilt angle is formed;

then the above liquid crystal testing cassete is irradiated with 6 mw/cm² (365 nm) UV light for 100 min to promote the polymerization of the residual general formula I. After irradiation, the participation content of general formula I is tested, and the test results are shown in the table below:

| | General formula 1 | P9 | P10 |
|---|---|---|---|
| Residual amount | IA | 25 ppm | 23 ppm |
| | IB | 14 ppm | 16 ppm |

After the polymerization is completed, there are few residual polymerizable monomers, and the liquid crystal display made of the composition has good residual image performance and improves the display effect of the liquid crystal display.

The testing cassetes of P9 and P10 after polymerization are applied with a voltage of 10V under the backlight irradiation with a light intensity of 4000 nit or more at 60° C. for 240 h, and then the pretilt angle is tested. The test values are as follows:

| | P9 | P10 |
|---|---|---|
| Initial | 88.5 | 88.4 |
| After 240 h | 88.4 | 88.2 |
| Difference value | 0.1 | 0.2 |

The liquid crystal composition provided by the present invention has good pretilt angle stability after polymerization, which is very effective for improving the residual image of PSVA liquid crystal display.

Example 3

The nematic liquid crystal composition N3 is prepared as follows:

| Category | Compound code | Percentage by weight (%) | Performance parameter | Parameter value |
|---|---|---|---|---|
| II | 2CPWO2 | 8 | Cp | 75 |
| II | 3CPWO2 | 9 | Δn | 0.110 |
| II | 3CPWO4 | 9 | Δε | −3.4 |
| III | 3PP1 | 13 | $K_{11}$ | 14.4 |
| III | 3CC2 | 20 | $K_{33}$ | 14.8 |
| III | 3CC4 | 5 | γ1 | 90 |
| III | 3CC5 | 3 | | |
| IV | 3C1OWO1 | 3 | | |
| IV | 3C1OWO2 | 11 | | |
| IV | 3CC1OWO2 | 15 | | |
| V | 3CPP1 | 4 | | |

On the basis of the nematic liquid crystal N3, 0.18% of a polymerizable compound of IA, 0.12% of a polymerizable compound of D3 and 0.01% of a stabilizer of VIIA2, by mass percentage of the total amount of N3 are added, and mixed uniformly to obtain a liquid crystal composition P11 for PSVA;

on the basis of the nematic liquid crystal N3, 0.18% of a polymerizable compound of IA, 0.12% of a polymerizable compound of IB and 0.01% of a stabilizer of VIIC7, by mass percentage of the total amount of N3 are added, and mixed uniformly to obtain a liquid crystal composition P12 for PSVA;

on the basis of the nematic liquid crystal N3, 0.19% of a polymerizable compound of IA, and 0.11% of a polymerizable compound of IB by mass percentage of the total amount of N3 are added, and mixed uniformly to obtain a liquid crystal composition P13 for PSVA;

P11, P12 and P13 are filled into a standard VA testing cassete to test the pretilt angle, and then same is irradiated with UV light having an intensity of 5.5 mw/cm² (313 nm) for 90 s under the application of 10 V voltage to promote the polymerization of the polymerizable compound represented by general formula I, and the liquid crystal is aligned by using the film formed after polymerization, and finally the pretilt angle after the UV irradiation is tested:

| | P11 | P12 | P13 |
|---|---|---|---|
| Before irradiation | 89.7 | 89.7 | 89.7 |
| After irradiation | 88.5 | 88.4 | 88.4 |

After polymerization, a stable pretilt angle is formed;

then the above liquid crystal testing cassete is irradiated with 6 mw/cm² (365 nm) UV light for 100 min to promote the polymerization of the residual general formula I. After irradiation, the participation content of general formula I is tested, and the test results are shown in the table below:

|  | General formula 1 | P11 | P12 | P13 |
|---|---|---|---|---|
| Residual amount | IA | 35 ppm | 33 ppm | 28 ppm |
|  | IB | 16 ppm | 14 ppm | 12 ppm |

After the polymerization is completed, there are few residual polymerizable monomers, and the liquid crystal display made of the composition has good residual image performance and improves the display effect of the liquid crystal display.

The testing cassetes of P11, P12 and P13 after polymerization are applied with a voltage of 10V under the backlight irradiation with a light intensity of 4000 nit or more at 60° C. for 240 h, and then the pretilt angle is tested. The test values are as follows:

|  | P11 | P12 | P13 |
|---|---|---|---|
| Initial | 88.5 | 88.4 | 88.4 |
| After 240 h | 88.3 | 88.3 | 88.2 |
| Difference value | 0.1 | 0.1 | 0.2 |

The liquid crystal composition provided by the present invention has good pretilt angle stability after polymerization, which is very effective for improving the residual image of PSVA liquid crystal display.

Example 4

The nematic liquid crystal composition N4 is prepared as follows:

| Category | Compound code | Percentage by weight (%) | Performance parameter | Parameter value |
|---|---|---|---|---|
| II | 2CPWO2 | 3 | Cp | 76 |
| II | 3CPWO2 | 10 | $\Delta n$ | 0.097 |
| III | 3CC2 | 18 | $\Delta \varepsilon$ | −3.3 |
| III | 3CC4 | 6 | $K_{11}$ | 14.5 |
| III | 3CC5 | 7 | $K_{33}$ | 14.7 |
| III | 5PP1 | 7 | $\gamma 1$ | 96 |
| III | 3CPO2 | 6 |  |  |
| IV | 2CC1OWO2 | 7 |  |  |
| IV | 3CC1OWO2 | 15 |  |  |
| IV | 3C1OWO2 | 12 |  |  |
| V | 3CPP2 | 4 |  |  |
| VI | 3PGIGIF | 5 |  |  |

The nematic liquid crystal composition N5 is prepared as follows:

| Category | Compound code | Percentage by weight (%) | Performance parameter | Parameter value |
|---|---|---|---|---|
| II | 2CPWO2 | 4 | Cp | 77 |
| II | 3CPWO2 | 10 | $\Delta n$ | 0.103 |
| III | 3CC2 | 17 | $\Delta \varepsilon$ | −3.1 |
| III | 3CC4 | 9 | $K_{11}$ | 15.1 |
| III | 3CC5 | 5 | $K_{33}$ | 15.4 |
| III | 5PP1 | 9 | $\gamma 1$ | 92 |
| III | 3CPO2 | 4 |  |  |
| IV | 2CC1OWO2 | 4 |  |  |
| IV | 3CC1OWO2 | 15 |  |  |
| IV | 3C1OWO2 | 12 |  |  |
| V | 3CPP1 | 6 |  |  |
| VI | 3PGIPGIF | 5 |  |  |

On the basis of the nematic liquid crystal N4, 0.30% of a polymerizable compound of IB and 0.017% of a stabilizer of VIIA2, by mass percentage of the total amount of N4 are added, and mixed uniformly to obtain a liquid crystal composition P14 for PSVA;

on the basis of the nematic liquid crystal N5, 0.30% of a polymerizable compound of IB and 0.017% of a stabilizer of VIIA2, by mass percentage of the total amount of N5 are added, and mixed uniformly to obtain a liquid crystal composition P15 for PSVA;

P14 and P15 are filled into a standard VA testing cassete to test the pretilt angle, and then same is irradiated with UV light having an intensity of 5.5 mw/cm² (313 nm) for 35 s under the application of 10 V voltage to promote the polymerization of the polymerizable compound represented by general formula I, and the liquid crystal is aligned by using the film formed after polymerization, and finally the pretilt angle after the UV irradiation is tested:

|  | P14 | P15 |
|---|---|---|
| Before irradiation | 89.7 | 89.7 |
| After irradiation | 88.0 | 87.8 |

After polymerization, a stable pretilt angle is formed;

then the above liquid crystal testing cassete is irradiated with 6 mw/cm² (365 nm) UV light for 50 min to promote the polymerization of the residual general formula I. After irradiation, the participation content of general formula I is tested, and the test results are shown in the table below:

|  | General formula 1 | P14 | P15 |
|---|---|---|---|
| Residual amount | IB | 56 ppm | 48 ppm |

After the polymerization is completed, there are few residual polymerizable monomers, and the liquid crystal display made of the composition has good residual image performance and improves the display effect of the liquid crystal display.

On the basis of the nematic liquid crystal N4, 0.30% of a polymerizable compound of IA and 0.010% of a stabilizer of VIIA2, by mass percentage of the total amount of N4 are added, and mixed uniformly to obtain a liquid crystal composition P16 for PSVA;

on the basis of the nematic liquid crystal N5, 0.30% of a polymerizable compound of IA and 0.010% of a stabilizer of VIIA2, by mass percentage of the total amount of N5 are added, and mixed uniformly to obtain a liquid crystal composition P17 for PSVA;

P16 and P17 are filled into a standard VA testing cassete to test the pretilt angle, and then same is irradiated with UV light having an intensity of 5.5 mw/cm² (313 nm) for 70 s under the application of 10 V voltage to promote the polymerization of the polymerizable compound represented by general formula I, and the liquid crystal is aligned by using the film formed after polymerization, and finally the pretilt angle after the UV irradiation is tested:

|  | P16 | P17 |
|---|---|---|
| Before irradiation | 89.7 | 89.7 |
| After irradiation | 88.2 | 88.1 |

After polymerization, a stable pretilt angle is formed; then the above liquid crystal testing cassete is irradiated with 6 mw/cm² (365 nm) UV light for 80 min to promote the polymerization of the residual general formula I. After irradiation, the participation content of general formula I is tested, and the test results are shown in the table below:

| General formula 1 |  | P16 | P17 |
|---|---|---|---|
| Residual amount | IA | 61 ppm | 53 ppm |

After the polymerization is completed, there are few residual polymerizable monomers, and the liquid crystal display made of the composition has good residual image performance and improves the display effect of the liquid crystal display.

The testing cassetes of P14, P15, P16 and P17 after polymerization are applied with a voltage of 10 V under the backlight irradiation with a light intensity of 4000 nit or more at 60° C. for 240 h, and then the pretilt angle is tested. The test values are as follows:

|  | P14 | P15 | P16 | P17 |
|---|---|---|---|---|
| Initial | 88.0 | 87.8 | 88.2 | 88.1 |
| After 240 h | 87.8 | 87.6 | 88.1 | 88.0 |
| Difference value | 0.2 | 0.2 | 0.1 | 0.1 |

The liquid crystal composition provided by the present invention has good pretilt angle stability after polymerization, which is very effective for improving the residual image of PSVA liquid crystal display.

Example 5

The nematic liquid crystal composition N6 is prepared as follows:

| Category | Compound code | Percentage by weight (%) | Performance parameter | Parameter value |
|---|---|---|---|---|
| II | 2CPWO2 | 3 | Cp | 76 |
| II | 3CPWO2 | 10 | $\Delta n$ | 0.097 |
| III | 3CC2 | 18 | $\Delta \varepsilon$ | -3.3 |
| III | 3CC4 | 6 | $K_{11}$ | 14.3 |
| III | 3CC5 | 7 | $K_{33}$ | 14.6 |
| III | 5PP1 | 9 | $\gamma 1$ | 94 |
| III | 3CPO2 | 6 | | |
| IV | 2CC1OWO2 | 7 | | |
| IV | 3CC1OWO2 | 15 | | |
| IV | 3C1OWO2 | 12 | | |
| V | 3CPP1 | 4 | | |
| VI | 3PGIGIF | 3 | | |

The nematic liquid crystal composition N7 is prepared as follows:

| Category | Compound code | Percentage by weight (%) | Performance parameter | Parameter value |
|---|---|---|---|---|
| II | 2CPWO2 | 3 | Cp | 76 |
| II | 3CPWO2 | 10 | $\Delta n$ | 0.097 |
| III | 3CC2 | 18 | $\Delta \varepsilon$ | -3.3 |
| III | 3CC4 | 6 | $K_{11}$ | 14.4 |
| III | 3CC5 | 7 | $K_{33}$ | 14.8 |
| III | 5PP1 | 9 | $\gamma 1$ | 94 |
| III | 3CPO2 | 6 | | |
| IV | 2CC1OWO2 | 7 | | |
| IV | 3CC1OWO2 | 15 | | |
| IV | 3C1OWO2 | 12 | | |
| V | 3CPP1 | 5 | | |
| VI | 3PGIGIF | 2 | | |

The nematic liquid crystal composition N8 is prepared as follows:

| Category | Compound code | Percentage by weight (%) | Performance parameter | Parameter value |
|---|---|---|---|---|
| II | 2CPWO2 | 3 | Cp | 76 |
| II | 3CPWO2 | 10 | $\Delta n$ | 0.097 |
| III | 3CC2 | 18 | $\Delta \varepsilon$ | -3.3 |
| III | 3CC4 | 6 | $K_{11}$ | 14.3 |
| III | 3CC5 | 7 | $K_{33}$ | 14.8 |
| III | 5PP1 | 10 | $\gamma 1$ | 92 |
| III | 3CPO2 | 6 | | |
| IV | 2CC1OWO2 | 7 | | |
| IV | 3CC1OWO2 | 15 | | |
| IV | 3C1OWO2 | 12 | | |
| V | 3CPP1 | 5 | | |
| VI | 3PGIGIF | 1 | | |

On the basis of the nematic liquid crystal N6, 0.30% of a polymerizable compound of IA and 0.010% of a stabilizer of VIIA2, by mass percentage of the total amount of N6 are added, and mixed uniformly to obtain a liquid crystal composition P18 for PSVA;

on the basis of the nematic liquid crystal N7, 0.30% of a polymerizable compound of IA and 0.010% of a stabilizer of VIIA2, by mass percentage of the total amount of N7 are added, and mixed uniformly to obtain a liquid crystal composition P19 for PSVA;

on the basis of the nematic liquid crystal N8, 0.30% of a polymerizable compound of IA and 0.010% of a stabilizer of VIIA2, by mass percentage of the total amount of N8 are added, and mixed uniformly to obtain a liquid crystal composition P20 for PSVA;

P18, P19 and P20 are filled into the standard VA testing cassete to test the pretilt angle, and then same is irradiated with UV light having an intensity of 5.5 mw/cm² (313 nm) for 75 s (P18), 80 s (P19) or 85 s (P20) under the application of 10V voltage to promote the polymerization of the polymerizable compound represented by general formula I, and the liquid crystal is aligned by using the film formed after polymerization, and finally the pretilt angle after the UV irradiation is tested:

|  | P18 | P19 | P20 |
| --- | --- | --- | --- |
| Before irradiation | 89.7 | 89.7 | 89.7 |
| After irradiation | 88.2 | 88.3 | 88.2 |

After polymerization, a stable pretilt angle is formed; then the above liquid crystal testing cassete is irradiated with 6 mw/cm² (365 nm) UV light for 90 min to promote the polymerization of the residual general formula I. After irradiation, the participation content of general formula I is tested, and the test results are shown in the table below:

|  | General formula I | P18 | P19 | P20 |
| --- | --- | --- | --- | --- |
| Residual amount | IA | 23 ppm | 34 ppm | 49 ppm |

After the polymerization is completed, there are few residual polymerizable monomers, and the liquid crystal display made of the composition has good residual image performance and improves the display effect of the liquid crystal display.

On the basis of the nematic liquid crystal N6, 0.30% of a polymerizable compound of IB and 0.020% of a stabilizer of VIIA2, by mass percentage of the total amount of N6 are added, and mixed uniformly to obtain a liquid crystal composition P21 for PSVA;

on the basis of the nematic liquid crystal N7, 0.30% of a polymerizable compound of IB and 0.010% of a stabilizer of VIIA2, by mass percentage of the total amount of N7 are added, and mixed uniformly to obtain a liquid crystal composition P22 for PSVA;

on the basis of the nematic liquid crystal N8, 0.30% of a polymerizable compound of IB and 0.005% of a stabilizer of VIIA2, by mass percentage of the total amount of N8 are added, and mixed uniformly to obtain a liquid crystal composition P23 for PSVA;

P21, P22 and P23 are filled into a standard VA testing cassete to test the pretilt angle, and then same is irradiated with UV light having an intensity of 5.5 mw/cm² (313 nm) for 45 s under the application of 10 V voltage to promote the polymerization of the polymerizable compound represented by general formula I, and the liquid crystal is aligned by using the film formed after polymerization, and finally the pretilt angle after the UV irradiation is tested:

|  | P21 | P22 | P23 |
| --- | --- | --- | --- |
| Before irradiation | 89.7 | 89.7 | 89.7 |
| After irradiation | 87.9 | 88.0 | 88.0 |

After polymerization, a stable pretilt angle is formed; then the above liquid crystal testing cassete is irradiated with 6 mw/cm² (365 nm) UV light for 70 min to promote the polymerization of the residual general formula I. After irradiation, the participation content of general formula I is tested, and the test results are shown in the table below:

|  | General formula I | P21 | P22 | P23 |
| --- | --- | --- | --- | --- |
| Residual amount | IA | 34 ppm | 39 ppm | 38 ppm |

After the polymerization is completed, there are few residual polymerizable monomers, and the liquid crystal display made of the composition has good residual image performance and improves the display effect of the liquid crystal display.

Example 6

The nematic liquid crystal composition N9 is prepared as follows:

| Category | Compound code | Percentage by weight (%) | Performance parameter | Parameter value |
| --- | --- | --- | --- | --- |
| II | 2CPWO2 | 4 | Cp | 75 |
| II | 3CPWO2 | 10 | $\Delta n$ | 0.097 |
| III | 3CC2 | 18 | $\Delta \varepsilon$ | -3.2 |
| III | 3CC4 | 7 | $K_{11}$ | 14.4 |
| III | 3CC5 | 6 | $K_{33}$ | 14.3 |
| III | 5PP1 | 11 | $\gamma 1$ | 95 |
| III | 3CPO2 | 5 |  |  |
| IV | 2CC1OWO2 | 7 |  |  |
| IV | 3CC1OWO2 | 15 |  |  |
| IV | 3C1OWO2 | 12 |  |  |
| V | 3CPP2 | 5 |  |  |

The nematic liquid crystal composition N10 is prepared as follows:

| Category | Compound code | Percentage by weight (%) | Performance parameter | Parameter value |
| --- | --- | --- | --- | --- |
| II | 2CPWO2 | 4 | Cp | 75 |
| II | 3CPWO2 | 10.5 | $\Delta n$ | 0.097 |
| III | 3CC2 | 18 | $\Delta \varepsilon$ | -3.3 |
| III | 3CC4 | 7 | $K_{11}$ | 14.4 |
| III | 3CC5 | 6 | $K_{33}$ | 14.7 |
| III | 5PP1 | 11 | $\gamma 1$ | 94 |
| III | 3CPO2 | 5 |  |  |
| IV | 2CC1OWO2 | 7 |  |  |
| IV | 3CC1OWO2 | 15 |  |  |
| IV | 3C1OWO2 | 12 |  |  |
| V | 3CPP1 | 4.5 |  |  |

The nematic liquid crystal composition N11 is prepared as follows:

| Category | Compound code | Percentage by weight (%) | Performance parameter | Parameter value |
| --- | --- | --- | --- | --- |
| II | 2CPWO2 | 2 | Cp | 77 |
| II | 3CPWO2 | 11.5 | $\Delta n$ | 0.105 |
| III | 5PP1 | 13 | $\Delta \varepsilon$ | -2.4 |
| III | 3CPO1 | 5.5 | $K_{11}$ | 15.3 |
| III | 3CC2 | 15 | $K_{33}$ | 15.1 |
| III | 3CC4 | 10 | $\gamma 1$ | 83 |
| III | 3CC5 | 5 |  |  |
| III | 3C1OWO2 | 11.5 |  |  |
| IV | 3CC1OWO2 | 14 |  |  |
| IV | 3CPP1 | 8.5 |  |  |
| IV | 3CPP2 | 4 |  |  |

On the basis of the nematic liquid crystal N9, 0.30% of a polymerizable compound of IB, 0.25% of a compound of VIC2 and 0.017% of a stabilizer of VIIA2, by mass percentage of the total amount of N9 are added, and mixed uniformly to obtain a liquid crystal composition P24 for PSVA;

on the basis of the nematic liquid crystal N10, 0.30% of a polymerizable compound of IB, 0.25% of a compound of VIC2 and 0.017% of a stabilizer of VIIA2, by mass percentage of the total amount of N10 are added, and mixed uniformly to obtain a liquid crystal composition P25 for PSVA;

on the basis of the nematic liquid crystal N11, 0.30% of a polymerizable compound of IB, 0.22% of a compound of VIC2 and 0.015% of a stabilizer of VIIA2, by mass percentage of the total amount of N11 are added, and mixed uniformly to obtain a liquid crystal composition P26 for PSVA;

P24, P25 and P26 are filled into a standard VA testing cassete to test the pretilt angle, and then same is irradiated with UV light having an intensity of 5.5 mw/cm² (313 nm) for 50 s under the application of 10 V voltage to promote the polymerization of the polymerizable compound represented by general formula I, and the liquid crystal is aligned by using the film formed after polymerization, and finally the pretilt angle after the UV irradiation is tested:

|  | P24 | P25 | P26 |
|---|---|---|---|
| Before irradiation | 89.7 | 89.7 | 89.7 |
| After irradiation | 88.0 | 88.0 | 88.1 |

After polymerization, a stable pretilt angle is formed;

then the above liquid crystal testing cassete is irradiated with 6 mw/cm² (365 nm) UV light for 50 min to promote the polymerization of the residual general formula I. After irradiation, the participation content of general formula I is tested, and the test results are shown in the table below:

|  | General formula I | P24 | P25 | P26 |
|---|---|---|---|---|
| Residual amount | IB | 86 ppm | 84 ppm | 89 ppm |

After the polymerization is completed, there are few residual polymerizable monomers, and the liquid crystal display made of the composition has good residual image performance and improves the display effect of the liquid crystal display.

The testing cassetes of P24, P25 and P26 after polymerization are applied with a voltage of 10 V under the backlight irradiation with a light intensity of 4000 nit or more at 60° C. for 240 h, and then the pretilt angle is tested. The test values are as follows:

|  | P14 | P15 | P16 |
|---|---|---|---|
| Initial | 88.0 | 88.0 | 88.1 |
| After 240 h | 87.8 | 87.9 | 88.0 |
| Difference value | 0.2 | 0.1 | 0.1 |

The liquid crystal composition provided by the present invention has good pretilt angle stability after polymerization, which is very effective for improving the residual image of PSVA liquid crystal display.

Example 7

The nematic liquid crystal composition N12 is prepared as follows:

| Category | Compound code | Percentage by weight (%) | Performance parameter | Parameter value |
|---|---|---|---|---|
| II | 2CPWO2 | 3 | Cp | 75 |
| II | 3CPWO2 | 10 | Δn | 0.097 |
| III | 3CC2 | 18 | Δε | −3.2 |
| III | 3CC4 | 6 | $K_{11}$ | 14.0 |
| III | 3CC5 | 7 | $K_{33}$ | 14.6 |
| III | 3PPO1 | 6 | γ1 | 92 |
| III | 5PPO1 | 6 |  |  |
| III | 3CPO2 | 7 |  |  |
| IV | 3C1OWO2 | 12 |  |  |
| IV | 2CC1OWO2 | 7 |  |  |
| IV | 3CC1OWO2 | 15 |  |  |
| V | 3CPP2 | 3 |  |  |

On the basis of the nematic liquid crystal N12, 0.30% of a polymerizable compound of IB by mass percentage of the total amount of N12 is added, and mixed uniformly to obtain a liquid crystal composition P27 for PSVA;

P27 is filled into a standard VA testing cassete to test the pretilt angle, and then same is irradiated with UV light having an intensity of 5.5 mw/cm² (313 nm) for 50 s under the application of 10 V voltage to promote the polymerization of the polymerizable compound represented by general formula I, and the liquid crystal is aligned by using the film formed after polymerization, and finally the pretilt angle after the UV irradiation is tested:

|  | P27 |
|---|---|
| Before irradiation | 89.7 |
| After irradiation | 87.9 |

After polymerization, a stable pretilt angle is formed;

then the above liquid crystal testing cassete is irradiated with 6 mw/cm² (365 nm) UV light for 60 min to promote the polymerization of the residual general formula I. After irradiation, the participation content of general formula I is tested, and the test results are shown in the table below:

|  | General formula I | P27 |
|---|---|---|
| Residual amount | IB | 66 ppm |

After the polymerization is completed, there are few residual polymerizable monomers, and the liquid crystal display made of the composition has good residual image performance and improves the display effect of the liquid crystal display.

Example 8

The nematic liquid crystal composition N13 is prepared as follows:

| Category | Compound code | Percentage by weight (%) | Performance parameter | Parameter value |
|---|---|---|---|---|
| II | 2CPWO2 | 4 | Cp | 76 |
| II | 3CPWO2 | 10.5 | Δn | 0.100 |

-continued

| Category | Compound code | Percentage by weight (%) | Performance parameter | Parameter value |
|---|---|---|---|---|
| III | 5PP1 | 15 | $\Delta\varepsilon$ | −3.3 |
| III | 3CC2 | 18.5 | $K_{11}$ | 14.8 |
| III | 3CC4 | 6 | $K_{33}$ | 15.4 |
| III | 3CPO2 | 4 | $\gamma1$ | 99.0 |
| IV | 3C1OWO2 | 12 | | |
| IV | 2CC1OWO2 | 7 | | |
| IV | 3CC1OWO2 | 15 | | |
| V | 3CCP1 | 8 | | |

The nematic liquid crystal composition N14 is prepared as follows:

| Category | Compound code | Percentage by weight (%) | Performance parameter | Parameter value |
|---|---|---|---|---|
| II | 2CPWO2 | 4 | Cp | 76 |
| II | 3CPWO2 | 10.5 | $\Delta n$ | 0.100 |
| III | 5PP1 | 12 | $\Delta\varepsilon$ | −3.2 |
| III | 3CC2 | 18.5 | $K_{11}$ | 14.6 |
| III | 3CC4 | 8 | $K_{33}$ | 15.5 |
| III | 3CC5 | 6 | $\gamma1$ | 94 |
| III | 3CPO2 | 4 | | |
| IV | 3C1OWO2 | 11 | | |
| IV | 2CC1OWO2 | 7 | | |
| IV | 3CC1OWO2 | 15 | | |
| V | 3CCP1 | 4 | | |

The nematic liquid crystal composition N15 is prepared as follows:

| Category | Compound code | Percentage by weight (%) | Performance parameter | Parameter value |
|---|---|---|---|---|
| II | 2CPWO2 | 6 | Cp | 76 |
| II | 3CPWO2 | 10.5 | $\Delta n$ | 0.104 |
| III | 3PP1 | 15 | $\Delta\varepsilon$ | −3.3 |
| III | 3CPO2 | 4 | $K_{11}$ | 15.2 |
| III | 3CC2 | 18.5 | $K_{33}$ | 15.6 |
| III | 3CC4 | 6 | $\gamma1$ | 95 |
| IV | 3C1OWO2 | 11 | | |
| IV | 2CC1OWO2 | 6 | | |
| IV | 3CC1OWO2 | 15 | | |
| V | 3CCP1 | 8 | | |

The nematic liquid crystal composition N16 is prepared as follows:

| Category | Compound code | Percentage by weight (%) | Performance parameter | Parameter value |
|---|---|---|---|---|
| II | 3CPWO2 | 10.5 | Cp | 80 |
| III | 5PP1 | 13 | $\Delta n$ | 0.100 |
| III | 3PP1 | 3 | $\Delta\varepsilon$ | −2.8 |
| III | 3CC2 | 18.5 | $K_{11}$ | 14.8 |
| III | 3CC4 | 8 | $K_{33}$ | 16.0 |
| III | 3CPO2 | 4 | $\gamma1$ | 92 |
| IV | 3C1OWO2 | 10 | | |
| IV | 2CC1OWO2 | 7 | | |
| IV | 3CC1OWO2 | 15 | | |
| V | 3CCP1 | 8 | | |
| V | 3CPP1 | 3 | | |

The nematic liquid crystal composition N17 is prepared as follows:

| Category | Compound code | Percentage by weight (%) | Performance parameter | Parameter value |
|---|---|---|---|---|
| II | 3CPWO2 | 10.5 | Cp | 75 |
| III | 5PP1 | 13 | $\Delta n$ | 0.098 |
| III | 3PP1 | 5 | $\Delta\varepsilon$ | −2.8 |
| III | 3CC2 | 18.5 | $K_{11}$ | 14.4 |
| III | 3CC4 | 9 | $K_{33}$ | 15.6 |
| III | 3CPO2 | 4 | $\gamma1$ | 87 |
| IV | 3C1OWO2 | 10 | | |
| IV | 2CC1OWO2 | 7 | | |
| IV | 3CC1OWO2 | 15 | | |
| V | 3CCP1 | 8 | | |

The nematic liquid crystal composition N18 is prepared as follows:

| Category | Compound code | Percentage by weight (%) | Performance parameter | Parameter value |
|---|---|---|---|---|
| II | 2CPWO2 | 10 | Cp | 75 |
| II | 3CPWO2 | 10 | $\Delta n$ | 0.104 |
| III | 5PP1 | 15 | $\Delta\varepsilon$ | −3.3 |
| III | 3CC2 | 19 | $K_{11}$ | 14.9 |
| III | 3CC4 | 6 | $K_{33}$ | 15.2 |
| III | 3CPO2 | 4 | $\gamma1$ | 104 |
| IV | 3C1OWO2 | 12 | | |
| IV | 2CC1OWO2 | 4 | | |
| IV | 3CC1OWO2 | 15 | | |
| V | 3CCP1 | 5 | | |

The nematic liquid crystal composition N19 is prepared as follows:

| Category | Compound code | Percentage by weight (%) | Performance parameter | Parameter value |
|---|---|---|---|---|
| II | 2CPWO2 | 10 | Cp | 77 |
| II | 3CPWO2 | 10 | $\Delta n$ | 0.101 |
| III | 5PP1 | 15 | $\Delta\varepsilon$ | −2.8 |
| III | 3CC2 | 19 | $K_{11}$ | 14.9 |
| III | 3CC4 | 6 | $K_{33}$ | 15.4 |
| III | 3CPO2 | 4 | $\gamma1$ | 96 |
| III | 3CC5 | 5 | | |
| IV | 3C1OWO2 | 9 | | |
| IV | 2CC1OWO2 | 4 | | |
| IV | 3CC1OWO2 | 13 | | |
| V | 3CCP1 | 5 | | |

On the basis of the nematic liquid crystal N13, 0.18% of a polymerizable compound of IA, 0.12% of a polymerizable compound of IB and 0.017% of a stabilizer of VIIA2, by mass percentage of the total amount of N13 are added, and mixed uniformly to obtain a liquid crystal composition P28 for PSVA;

on the basis of the nematic liquid crystal N14, 0.15% of a polymerizable compound of IA, 0.15% of a polymerizable compound of IB and 0.017% of a stabilizer of VIIA2, by mass percentage of the total amount of N14 are added, and mixed uniformly to obtain a liquid crystal composition P29 for PSVA;

on the basis of the nematic liquid crystal N15, 0.18% of a polymerizable compound of IA, 0.12% of a polymerizable compound of IB and 0.017% of a stabilizer of VIIA2, by mass percentage of the total amount of N15 are added, and mixed uniformly to obtain a liquid crystal composition P30 for PSVA;

on the basis of the nematic liquid crystal N16, 0.18% of a polymerizable compound of IA, 0.12% of a polymerizable compound of IB and 0.020% of a stabilizer of VIIA2, by mass percentage of the total amount of N16 are added, and mixed uniformly to obtain a liquid crystal composition P31 for PSVA;

on the basis of the nematic liquid crystal N17, 0.20% of a polymerizable compound of IA, 0.10% of a polymerizable compound of IB and 0.020% of a stabilizer of VIIA2, by mass percentage of the total amount of N17 are added, and mixed uniformly to obtain a liquid crystal composition P32 for PSVA;

on the basis of the nematic liquid crystal N18, 0.18% of a polymerizable compound of IA, 0.12% of a polymerizable compound of IB and 0.015% of a stabilizer of VIIA2, by mass percentage of the total amount of N18 are added, and mixed uniformly to obtain a liquid crystal composition P33 for PSVA;

on the basis of the nematic liquid crystal N19, 0.18% of a polymerizable compound of IA, 0.12% of a polymerizable compound of IB and 0.015% of a stabilizer of VIIC7, by mass percentage of the total amount of N19 are added, and mixed uniformly to obtain a liquid crystal composition P34 for PSVA;

P28, P29, P30, P31, P32, P33 and P34 are filled into a standard VA testing cassete to test the pretilt angle, and then same is irradiated with UV light having an intensity of 5.5 mw/cm$^2$ (313 nm) for 90 s under the application of 10 V voltage to promote the polymerization of the polymerizable compound represented by general formula I, and the liquid crystal is aligned by using the film formed after polymerization, and finally the pretilt angle after the UV irradiation is tested:

|  | P28 | P29 | P30 | P31 | P32 | P33 | P34 |
|---|---|---|---|---|---|---|---|
| Before irradiation | 89.7 | 89.7 | 89.6 | 89.7 | 89.6 | 89.6 | 89.7 |
| After irradiation | 88.4 | 88.5 | 88.5 | 88.6 | 88.5 | 88.4 | 88.6 |

After polymerization, a stable pretilt angle is formed;

then the above liquid crystal testing cassete is irradiated with 6 mw/cm$^2$ (365 nm) UV light for 100 min to promote the polymerization of the residual general formula I. After irradiation, the participation content of general formula I is tested, and the test results are shown in the table below:

|  | General formula I | P28 | P29 | P30 | P31 | P32 | P33 | P34 |
|---|---|---|---|---|---|---|---|---|
| Residual amount | IA | 30 ppm | 28 ppm | 24 ppm | 33 ppm | 34 ppm | 31 ppm | 28 ppm |
|  | IB | 12 ppm | 13 ppm | 12 ppm | 15 ppm | 16 ppm | 18 ppm | 16 ppm |

After the polymerization is completed, there are few residual polymerizable monomers, and the liquid crystal display made of the composition has good residual image performance and improves the display effect of the liquid crystal display.

Example 9

On the basis of the nematic liquid crystal N1, 0.30% of a polymerizable compound of IA and 0.017% of a stabilizer of VIIA2, by mass percentage of the total amount of N1 are added, and mixed uniformly to obtain a liquid crystal composition P35 for PSVA;

on the basis of the nematic liquid crystal N1, 0.28% of a polymerizable compound of IA, 0.02% of a polymerizable compound of D3 and 0.017% of a stabilizer of VIIA2, by mass percentage of the total amount of N1 are added, and mixed uniformly to obtain a liquid crystal composition P36 for PSVA;

on the basis of the nematic liquid crystal N1, 0.25% of a polymerizable compound of IA, 0.05% of a polymerizable compound of D3 and 0.017% of a stabilizer of VIIA2, by mass percentage of the total amount of N1 are added, and mixed uniformly to obtain a liquid crystal composition P37 for PSVA;

on the basis of the nematic liquid crystal N1, 0.20% of a polymerizable compound of IA, 0.10% of a polymerizable compound of D3 and 0.017% of a stabilizer of VIIA2, by mass percentage of the total amount of N1 are added, and mixed uniformly to obtain a liquid crystal composition P38 for PSVA;

on the basis of the nematic liquid crystal N1, 0.15% of a polymerizable compound of IA, 0.15% of a polymerizable compound of D3 and 0.017% of a stabilizer of VIIA2, by mass percentage of the total amount of N1 are added, and mixed uniformly to obtain a liquid crystal composition P39 for PSVA;

on the basis of the nematic liquid crystal N1, 0.10% of a polymerizable compound of IA, 0.20% of a polymerizable compound of IB and 0.017% of a stabilizer of VIIA2, by mass percentage of the total amount of N1 are added, and mixed uniformly to obtain a liquid crystal composition P40 for PSVA;

on the basis of the nematic liquid crystal N1, 0.05% of a polymerizable compound of IA, 0.25% of a polymerizable compound of D3 and 0.017% of a stabilizer of VIIA2, by mass percentage of the total amount of N1 are added, and mixed uniformly to obtain a liquid crystal composition P41 for PSVA;

on the basis of the nematic liquid crystal N1 0.30% of a polymerizable compound of IB and 0.017% of a stabilizer of VIIA2, by mass percentage of the total amount of N1 are added, and mixed uniformly to obtain a liquid crystal composition P42 for PSVA;

P35, P36, P37, P38, P39, P40, P41 and P42 are filled into a standard VA testing cassete to test the pretilt angle, and then same is irradiated with UV light having an intensity of 5.5 mw/cm$^2$ (313 nm) under the application of 10 V voltage to promote the polymerization of the polymerizable compound represented by general formula I, and the liquid crystal is aligned by using the film formed after polymerization, and finally the pretilt angle after the UV irradiation is tested. The pretilt angle formed by controlling the irradiation time is around 88.5, and the required time is as follows:

|  | P35 | P36 | P37 | P38 | P39 | P40 | P41 | P42 |
|---|---|---|---|---|---|---|---|---|
| Irradiation time | 150 s | 130 s | 110 s | 90s | 85 s | 78 s | 70s | 60s |

By controlling the content of polymerizable compounds IA and IB, different UV irradiation time requirements can be achieved and the requirements of different process conditions can be met.

Then the above liquid crystal testing cassete is irradiated with 6 mw/cm$^2$ (365 nm) UV light to promote the polymerization of the residual general formula I, the compound content of the residual general formula I is controlled to be less than 100 ppm by controlling the irradiation time. The required time is shown in the table below:

|  | P35 | P36 | P37 | P38 | P39 | P40 | P41 | P42 |
|---|---|---|---|---|---|---|---|---|
| Irradiation time | 130 min | 110 min | 100 min | 95 min | 85 min | 75 min | 70 min | 60 min |

By controlling the content of polymerizable compounds IA and IB, different UV irradiation time requirements can be achieved and the requirements of different process conditions can be met.

Example 10

On the basis of the nematic liquid crystal N1, 0.30% of a polymerizable compound of IA by mass percentage of the total amount of N1 is added, and mixed uniformly to obtain a liquid crystal composition P43 for PSVA;
on the basis of the nematic liquid crystal N1, 0.28% of a polymerizable compound of IA, and 0.02% of a polymerizable compound of IB by mass percentage of the total amount of N1 are added, and mixed uniformly to obtain a liquid crystal composition P44 for PSVA;
on the basis of the nematic liquid crystal N1, 0.25% of a polymerizable compound of IA, and 0.05% of a polymerizable compound of IB by mass percentage of the total amount of N1 are added, and mixed uniformly to obtain a liquid crystal composition P45 for PSVA;
on the basis of the nematic liquid crystal N1, 0.20% of a polymerizable compound of IA, and 0.10% of a polymerizable compound of IB by mass percentage of the total amount of N1 are added, and mixed uniformly to obtain a liquid crystal composition P46 for PSVA;
on the basis of the nematic liquid crystal N1, 0.15% of a polymerizable compound of IA, and 0.15% of a polymerizable compound of IB by mass percentage of the total amount of N1 are added, and mixed uniformly to obtain a liquid crystal composition P47 for PSVA;
on the basis of the nematic liquid crystal N1, 0.10% of a polymerizable compound of IA, and 0.20% of a polymerizable compound of IB by mass percentage of the total amount of N1 are added, and mixed uniformly to obtain a liquid crystal composition P48 for PSVA;
on the basis of the nematic liquid crystal N1, 0.05% of a polymerizable compound of IA, and 0.25% of a polymerizable compound of IB by mass percentage of the total amount of N1 are added, and mixed uniformly to obtain a liquid crystal composition P49 for PSVA;
on the basis of the nematic liquid crystal N1, 0.30% of a polymerizable compound of IB by mass percentage of the total amount of N1 is added, and mixed uniformly to obtain a liquid crystal composition P50 for PSVA;
P43, P44, P45, P46, P47, P48, P49 and P50 are filled into a standard VA testing cassete to test the pretilt angle, and then same is irradiated with UV light having an intensity of 5.5 mw/cm² (313 nm) under the application of 10 V voltage to promote the polymerization of the polymerizable compound represented by general formula I, and the liquid crystal is aligned by using the film formed after polymerization, and finally the pretilt angle after the UV irradiation is tested. The pretilt angle formed by controlling the irradiation time is around 88.5, and the required time is as follows:

|  | P43 | P44 | P45 | P46 | P47 | P48 | P49 | P50 |
|---|---|---|---|---|---|---|---|---|
| Irradiation time | 140 s | 123 s | 103 s | 84 s | 78 s | 73 s | 65 s | 55 s |

By controlling the content of polymerizable compounds IA and IB, different UV irradiation time requirements can be achieved and the requirements of different process conditions can be met.

Then the above liquid crystal testing cassete is irradiated with 6 mw/cm² (365 nm) UV light to promote the polymerization of the residual general formula I, the compound content of the residual general formula I is controlled to be less than 100 ppm by controlling the irradiation time. The required time is shown in the table below:

|  | P43 | P44 | P45 | P46 | P47 | P48 | P49 | P50 |
|---|---|---|---|---|---|---|---|---|
| Irradiation time | 130 min | 110 min | 100 min | 90 min | 85 min | 75 min | 70 min | 60 min |

By controlling the content of polymerizable compounds IA and IB, different UV irradiation time requirements can be achieved and the requirements of different process conditions can be met.

Example 11

On the basis of the nematic liquid crystal N1, 0.40% of a polymerizable compound of IA and 0.010% of a stabilizer of VIIA2, by mass percentage of the total amount of N1 are added, and mixed uniformly to obtain a liquid crystal composition P51 for PSVA;
on the basis of the nematic liquid crystal N1, 0.20% of a polymerizable compound of IB and 0.015% of a stabilizer of VIIA2, by mass percentage of the total amount of N1 are added, and mixed uniformly to obtain a liquid crystal composition P52 for PSVA;
P51 and P52 are filled into a standard VA testing cassete to test the pretilt angle, and then same is irradiated with UV light having an intensity of 5.5 mw/cm² (313 nm) for 90s under the application of 10 V voltage to promote the polymerization of the polymerizable compound represented by general formula I, and the liquid crystal is aligned by using the film formed after polymerization, and finally the pretilt angle after the UV irradiation is tested:

|  | P51 | P52 |
|---|---|---|
| Before irradiation | 89.7 | 89.7 |
| After irradiation | 88.5 | 88.5 |

After polymerization, a stable pretilt angle is formed;

Example 12

On the basis of the nematic liquid crystal N1, 0.30% of a polymerizable compound of IA, 0.30% of a compound of VIC2 and 0.015% of a compound of formula VIIA2, by mass percentage of the total amount of N1 are added, and mixed uniformly to obtain a liquid crystal composition P53 for PSVA;
on the basis of the nematic liquid crystal N1, 0.25% of a polymerizable compound of IA, 0.05% of a polymerizable compound of IB, 0.30% of a compound of VIC2 and 0.015% of a compound of formula VIIA2, by mass percentage of the total amount of N1 are added, and mixed uniformly to obtain a liquid crystal composition P54 for PSVA;

on the basis of the nematic liquid crystal N1, 0.20% of a polymerizable compound of IA, 0.10% of a polymerizable compound of IB, 0.30% of a compound of VIC2 and 0.015% of a compound of formula VIIA2, by mass percentage of the total amount of N1 are added, and mixed uniformly to obtain a liquid crystal composition P55 for PSVA;

on the basis of the nematic liquid crystal N1, 0.15% of a polymerizable compound of IA, 0.15% of a polymerizable compound of IB, 0.30% of a compound of VIC2 and 0.015% of a compound of formula VIIA2, by mass percentage of the total amount of N1 are added, and mixed uniformly to obtain a liquid crystal composition P56 for PSVA;

on the basis of the nematic liquid crystal N1, 0.10% of a polymerizable compound of IA, 0.20% of a polymerizable compound of IB, 0.30% of a compound of VIC2 and 0.015% of a compound of formula VIIA2, by mass percentage of the total amount of N1 are added, and mixed uniformly to obtain a liquid crystal composition P57 for PSVA;

on the basis of the nematic liquid crystal N1, 0.05% of a polymerizable compound of IA, 0.25% of a polymerizable compound of IB, 0.30% of a compound of VIC2 and 0.015% of a compound of formula VIIA2, by mass percentage of the total amount of N1 are added, and mixed uniformly to obtain a liquid crystal composition P58 for PSVA;

on the basis of the nematic liquid crystal N1, 0.25% of a polymerizable compound of IB, 0.30% of a compound of VIC2 and 0.015% of a compound of formula VIIA2, by mass percentage of the total amount of N1 are added, and mixed uniformly to obtain a liquid crystal composition P59 for PSVA;

P53, P54, P55, P56, P57, P58 and P59 are filled into a standard VA testing cassete to test the pretilt angle, and then same is irradiated with UV light having an intensity of 5.5 mw/cm² (313 nm) under the application of 10 V voltage to promote the polymerization of the polymerizable compound represented by general formula I, and the liquid crystal is aligned by using the film formed after polymerization, and finally the pretilt angle after the UV irradiation is tested. The pretilt angle formed by controlling the irradiation time is around 88.5, and the required time is as follows:

|  | P53 | P54 | P55 | P56 | P57 | P58 | P59 |
|---|---|---|---|---|---|---|---|
| Irradiation time | 90s | 82 s | 73 s | 64 s | 56 s | 50 s | 45 s |

By controlling the content of polymerizable compounds IA and IB, different UV irradiation time requirements can be achieved and the requirements of different process conditions can be met.

Then the above liquid crystal testing cassete is irradiated with 6 mw/cm² (365 nm) UV light to promote the polymerization of the residual general formula I, the compound content of the residual general formula I is controlled to be less than 100 ppm by controlling the irradiation time. The required time is shown in the table below:

|  | P53 | P54 | P55 | P56 | P57 | P58 | P59 |
|---|---|---|---|---|---|---|---|
| Irradiation time | 90 min | 83 min | 79 min | 73 min | 65 min | 58 min | 50 min |

By controlling the content of polymerizable compounds IA and IB, different UV irradiation time requirements can be achieved and the requirements of different process conditions can be met.

Example 13

On the basis of the nematic liquid crystal N4, 0.30% of a polymerizable compound of IA and 0.017% of a stabilizer of VIIA2, by mass percentage of the total amount of N4 are added, and mixed uniformly to obtain a liquid crystal composition P60 for PSVA;

on the basis of the nematic liquid crystal N4, 0.20% of a polymerizable compound of IA, 0.10% of a polymerizable compound of D3 and 0.017% of a stabilizer of VIIA2, by mass percentage of the total amount of N4 are added, and mixed uniformly to obtain a liquid crystal composition P61 for PSVA;

on the basis of the nematic liquid crystal N4, 0.10% of a polymerizable compound of IA, 0.20% of a polymerizable compound of D3 and 0.017% of a stabilizer of VIIA2, by mass percentage of the total amount of N4 are added, and mixed uniformly to obtain a liquid crystal composition P62 for PSVA;

on the basis of the nematic liquid crystal N4, 0.30% of a polymerizable compound of IB and 0.017% of a stabilizer of VIIA2, by mass percentage of the total amount of N4 are added, and mixed uniformly to obtain a liquid crystal composition P63 for PSVA;

P60, P61, P62, and P63 are filled into a standard VA testing cassete to test the pretilt angle, and then same is irradiated with UV light having an intensity of 5.5 mw/cm² (313 nm) under the application of 10 V voltage to promote the polymerization of the polymerizable compound represented by general formula I, and the liquid crystal is aligned by using the film formed after polymerization, and finally the pretilt angle after the UV irradiation is tested. The pretilt angle formed by controlling the irradiation time is around 88.5, and the required time is as follows:

|  | P60 | P61 | P62 | P63 |
|---|---|---|---|---|
| Irradiation time | 68 s | 48 s | 40 s | 30 s |

By controlling the content of polymerizable compounds IA and IB, different UV irradiation time requirements can be achieved and the requirements of different process conditions can be met.

Then the above liquid crystal testing cassete is irradiated with 6 mw/cm² (365 nm) UV light to promote the polymerization of the residual general formula I, the compound content of the residual general formula I is controlled to be less than 100 ppm by controlling the irradiation time. The required time is shown in the table below:

|  | P60 | P61 | P62 | P63 |
|---|---|---|---|---|
| Irradiation time | 80 min | 65 min | 55 min | 45 min |

By controlling the content of polymerizable compounds IA and IB, different UV irradiation time requirements can be achieved and the requirements of different process conditions can be met.

Example 14

On the basis of the nematic liquid crystal N1, 0.20% of a polymerizable compound of IA, and 0.10% of a polymerizable compound of D3 by mass percentage of the total amount of N1 are added, and mixed uniformly to obtain a liquid crystal composition P46 for PSVA;

on the basis of the nematic liquid crystal N1, 0.20% of a polymerizable compound of IA, 0.10% of a polymerizable compound of IB and 0.010% of a stabilizer of VIIA2, by mass percentage of the total amount of N1 are added, and mixed uniformly to obtain a liquid crystal composition P64 for PSVA;

on the basis of the nematic liquid crystal N1, 0.20% of a polymerizable compound of IA, 0.10% of a polymerizable compound of D3 and 0.015% of a stabilizer of VIIA2, by mass percentage of the total amount of N1 are added, and mixed uniformly to obtain a liquid crystal composition P65 for PSVA;

on the basis of the nematic liquid crystal N1, 0.20% of a polymerizable compound of IA, 0.10% of a polymerizable compound of D3 and 0.020% of a stabilizer of VIIA2, by mass percentage of the total amount of N1 are added, and mixed uniformly to obtain a liquid crystal composition P66 for PSVA;

on the basis of the nematic liquid crystal N1, 0.20% of a polymerizable compound of IA, 0.10% of a polymerizable compound of D3 and 0.030% of a stabilizer of VIIA2, by mass percentage of the total amount of N1 are added, and mixed uniformly to obtain a liquid crystal composition P67 for PSVA;

on the basis of the nematic liquid crystal N1, 0.20% of a polymerizable compound of IA, 0.10% of a polymerizable compound of D3 and 0.040% of a stabilizer of VIIA2, by mass percentage of the total amount of N1 are added, and mixed uniformly to obtain a liquid crystal composition P68 for PSVA;

P46, P64, P65, P66, P67, and P68 are filled into a standard VA testing cassete to test the pretilt angle, and then same is irradiated with UV light having an intensity of 5.5 mw/cm² (313 nm) under the application of 10 V voltage to promote the polymerization of the polymerizable compound represented by general formula I, and the liquid crystal is aligned by using the film formed after polymerization, and finally the pretilt angle after the UV irradiation is tested. The pretilt angle formed by controlling the irradiation time is around 88.5, and the required time is as follows:

| | P46 | P64 | P65 | P66 | P67 | P68 |
|---|---|---|---|---|---|---|
| Irradiation time | 84 s | 87 s | 89 s | 92 s | 95 s | 98 s |

The reaction rate can be finely adjusted by controlling the content of the polymerizable compound VII.

Example 15

On the basis of the nematic liquid crystal N1, 0.25% of a polymerizable compound of IA, and 0.50% of a compound of VIC2 by mass percentage of the total amount of N1 are added, and mixed uniformly to obtain a liquid crystal composition P69 for PSVA;

on the basis of the nematic liquid crystal N1, 0.28% of a polymerizable compound of IA, 0.40% of a compound of VIC2 and 0.005% of a compound of VIIA2, by mass percentage of the total amount of N1 were added, and mixed evenly to obtain the liquid crystal composition P70 for PSVA;

on the basis of the nematic liquid crystal N2, 0.30% of a polymerizable compound of IA, 0.50% of a compound of VIC2 and 0.020% of a compound of VIIA2, by mass percentage of the total amount of N2 were added, and mixed evenly to obtain the liquid crystal composition P71 for PSVA;

on the basis of the nematic liquid crystal composition N3, 0.32% of a polymerizable compound of IA, 0.35% of a compound of VIC2 and 0.015% of a compound of VIIA2, by mass percentage of the total amount of N3 are added, and mixed evenly to obtain the liquid crystal composition P72 for PSVA;

on the basis of the nematic liquid crystal composition N9, 0.30% of a polymerizable compound of IA, 0.35% of a compound of VIC2 and 0.015% of a compound of VIIA2, by mass percentage of the total amount of N9 are added, and mixed evenly to obtain the liquid crystal composition P73 for PSVA;

on the basis of the nematic liquid crystal composition N10, 0.35% of a polymerizable compound of IA, 0.30% of a compound of VIC2 and 0.015% of a compound of VIIA2, by mass percentage of the total amount of N10 are added, and mixed evenly to obtain the liquid crystal composition P74 for PSVA;

on the basis of the nematic liquid crystal composition N11, 0.40% of a polymerizable compound of IA, 0.20% of a compound of VIC2 and 0.015% of a compound of VIIA2, by mass percentage of the total amount of N11 are added, and mixed evenly to obtain the liquid crystal composition P75 for PSVA;

on the basis of the nematic liquid crystal composition N12, 0.25% of a polymerizable compound of IA, and 0.35% of a compound of VIC2 by mass percentage of the total amount of N12 are added, and mixed uniformly to obtain a liquid crystal composition P76 for PSVA;

on the basis of the nematic liquid crystal composition N13, 0.28% of a polymerizable compound of IA, 0.40% of a compound of VIC2 and 0.020% of a compound of VIIA2, by mass percentage of the total amount of N13 are added, and mixed evenly to obtain the liquid crystal composition P77 for PSVA;

P70, P71, P72, P73, P74, P75, P76 and P77 are filled into a standard VA testing cassete to test the pretilt angle, and then same is irradiated with UV light having an intensity of 5.5 mw/cm² (313 nm) for 90s under the application of 10 V voltage to promote the polymerization of the polymerizable compound represented by general formula I, and the liquid crystal is aligned by using the film formed after polymerization, and finally the pretilt angle after the UV irradiation is tested:

| | P70 | P71 | P72 | P73 | P74 | P75 | P76 | P77 |
|---|---|---|---|---|---|---|---|---|
| Before irradiation | 89.7 | 89.7 | 89.7 | 89.7 | 89.7 | 89.7 | 89.7 | 89.7 |
| After irradiation | 88.4 | 88.3 | 88.5 | 88.6 | 88.3 | 88.2 | 88.3 | 88.1 |

After polymerization, a stable pretilt angle is formed;

then the above liquid crystal testing cassete is irradiated with 6 mw/cm² (365 nm) UV light for 100 min to promote the polymerization of the residual general formula I. After irradiation, the participation content of general formula I is tested, and the test results are shown in the table below:

| General formula I | | P70 | P71 | P72 | P73 | P74 | P75 | P76 | P77 |
|---|---|---|---|---|---|---|---|---|---|
| Residual amount | IA | 33 ppm | 28 ppm | 26 ppm | 23 ppm | 34 ppm | 41 ppm | 37 ppm | 38 ppm |

After the polymerization is completed, there are few residual polymerizable monomers, and the liquid crystal display made of the composition has good residual image performance and improves the display effect of the liquid crystal display.

The testing cassetes of P70, P71, P72, P73, P74, P75, P76 and P77 after polymerization are applied with a voltage of 10 V under the backlight irradiation with a light intensity of 4000 nit or more at 60° C. for 10 days, and then the pretilt angle is tested. The test values are as follows:

| | P70 | P71 | P72 | P73 | P74 | P75 | P76 | P77 |
|---|---|---|---|---|---|---|---|---|
| Initial | 88.4 | 88.3 | 88.5 | 88.6 | 88.3 | 88.2 | 88.3 | 88.1 |
| After 10 days | 88.3 | 88.2 | 88.4 | 88.4 | 88.3 | 88.1 | 88.2 | 88.0 |
| Difference value | 0.1 | 0.1 | 0.1 | 0.2 | 0.0 | 0.1 | 0.1 | 0.1 |

The liquid crystal composition provided by the present invention has good pretilt angle stability after polymerization, which is very effective for improving the residual image of PSVA liquid crystal display.

Example 16

On the basis of the nematic liquid crystal N1, 0.25% of a polymerizable compound of IB, and 0.40% of a compound of VIC2 by mass percentage of the total amount of N1 are added, and mixed uniformly to obtain a liquid crystal composition P78 for PSVA;

on the basis of the nematic liquid crystal N1, 0.28% of a polymerizable compound of IB, 0.35% of a compound of VIC2 and 0.005% of a compound of VIIB2, by mass percentage of the total amount of N1 were added, and mixed evenly to obtain the liquid crystal composition P79 for PSVA;

on the basis of the nematic liquid crystal N2, 0.30% of a polymerizable compound of IB, 0.25% of a compound of VIC2 and 0.020% of a compound of VIIB2, by mass percentage of the total amount of N2 were added, and mixed evenly to obtain the liquid crystal composition P80 for PSVA;

on the basis of the nematic liquid crystal composition N3, 0.32% of a polymerizable compound of IB, 0.15% of a compound of VIC2 and 0.015% of a compound of VIIB2, by mass percentage of the total amount of N3 are added, and mixed evenly to obtain the liquid crystal composition P81 for PSVA;

on the basis of the nematic liquid crystal composition N9, 0.30% of a polymerizable compound of IB, 0.22% of a compound of VIC2 and 0.015% of a compound of VIIB2, by mass percentage of the total amount of N9 are added, and mixed evenly to obtain the liquid crystal composition P82 for PSVA;

on the basis of the nematic liquid crystal composition N10, 0.35% of a polymerizable compound of IB, 0.10% of a compound of VIC2 and 0.015% of a compound of VIIB2, by mass percentage of the total amount of N10 are added, and mixed evenly to obtain the liquid crystal composition P83 for PSVA;

on the basis of the nematic liquid crystal composition N11, 0.40% of a polymerizable compound of IB, 0.10% of a compound of VIC2 and 0.015% of a compound of VIIB2, by mass percentage of the total amount of N11 are added, and mixed evenly to obtain the liquid crystal composition P84 for PSVA;

on the basis of the nematic liquid crystal composition N12, 0.25% of a polymerizable compound of IB, and 0.35% of a compound of VIC2 by mass percentage of the total amount of N12 are added, and mixed uniformly to obtain a liquid crystal composition P85 for PSVA;

on the basis of the nematic liquid crystal composition N13, 0.28% of a polymerizable compound of IB, 0.20% of a compound of VIC2 and 0.020% of a compound of VIIB2, by mass percentage of the total amount of N13 are added, and mixed evenly to obtain the liquid crystal composition P85 for PSVA;

P78, P79, P80, P81, P82, P83, P84 and P85 are filled into a standard VA testing cassete to test the pretilt angle, and then same is irradiated with UV light having an intensity of 5.5 mw/cm$^2$ (313 nm) for 50 s under the application of 10 V voltage to promote the polymerization of the polymerizable compound represented by general formula I, and the liquid crystal is aligned by using the film formed after polymerization, and finally the pretilt angle after the UV irradiation is tested:

| | P78 | P79 | P80 | P81 | P82 | P83 | P84 | P85 |
|---|---|---|---|---|---|---|---|---|
| Before irradiation | 89.7 | 89.7 | 89.7 | 89.7 | 89.7 | 89.7 | 89.7 | 89.7 |
| After irradiation | 88.0 | 88.1 | 88.0 | 87.8 | 87.9 | 88.2 | 87.9 | 88.1 |

After polymerization, a stable pretilt angle is formed;

then the above liquid crystal testing cassete is irradiated with 6 mw/cm$^2$ (365 nm) UV light for 60 min to promote the polymerization of the residual general formula I. After irradiation, the participation content of general formula I is tested, and the test results are shown in the table below:

| General formula I | | P78 | P79 | P80 | P81 | P82 | P83 | P84 | P85 |
|---|---|---|---|---|---|---|---|---|---|
| Residual amount | IB | 53 ppm | 48 ppm | 56 ppm | 63 ppm | 54 ppm | 51 ppm | 47 ppm | 48 ppm |

After the polymerization is completed, there are few residual polymerizable monomers, and the liquid crystal display made of the composition has good residual image performance and improves the display effect of the liquid crystal display.

The testing cassetes of P78, P79, P80, P81, P82, P83, P84 and P85 after polymerization are applied with a voltage of 10 V under the backlight irradiation with a light intensity of 4000 nit or more at 60° C. for 10 days, and then the pretilt angle is tested. The test values are as follows:

|  | P78 | P79 | P80 | P81 | P82 | P83 | P84 | P85 |
|---|---|---|---|---|---|---|---|---|
| Initial | 88.0 | 88.1 | 88.0 | 87.8 | 87.9 | 88.2 | 87.9 | 88.1 |
| After 10 days | 87.8 | 88.0 | 87.8 | 87.6 | 87.7 | 88.0 | 87.8 | 87.9 |
| Difference value | 0.2 | 0.1 | 0.2 | 0.2 | 0.2 | 0.2 | 0.1 | 0.2 |

The liquid crystal composition provided by the present invention has good pretilt angle stability after polymerization, which is very effective for improving the residual image of PSVA liquid crystal display.

Comparative Example 1

The nematic liquid crystal composition DN1

| Compound code | Percentage by weight (%) | Performance parameter | Parameter value |
|---|---|---|---|
| 2CPWO2 | 11 | Cp | 75 |
| 3CPWO2 | 11.5 | Δn | 0.103 |
| 3CWO2 | 14 | Δε | −2.8 |
| 5CWO2 | 9 | $K_{11}$ | 13.2 |
| 3CCWO2 | 9.5 | $K_{33}$ | 13.6 |
| 3CPP1 | 6 | γ1 | 88 |
| 3CPO1 | 5 |  |  |
| 3CPP2 | 4 |  |  |
| 3CC2 | 18 |  |  |
| 3CC4 | 9 |  |  |
| 5PP1 | 3 |  |  |

On the basis of the nematic liquid crystal DN1, 0.30% of a polymerizable compound with the following structure and 0.017% of a stabilizer of VIIA2, by mass percentage of the total amount of DN1 are added, and mixed uniformly to obtain a liquid crystal composition DP1 for PSVA;

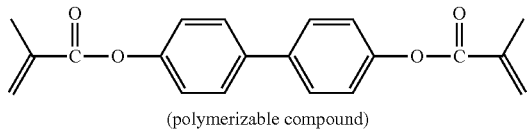 [SMILES: C=C(C)C(=O)Oc1ccc(-c2ccc(OC(=O)C(=C)C)cc2)cc1]

(polymerizable compound)

DP1 is filled into a standard VA testing cassete to test the pretilt angle, and then same is irradiated with UV light having an intensity of 5.5 mw/cm² (313 nm) for 90 s under the application of 10 V voltage to promote the polymerization of the polymerizable compound, and the liquid crystal is aligned by using the film formed after polymerization, and finally the pretilt angle after the UV irradiation is tested. The test results are as follows:

|  | DP1 |
|---|---|
| Before irradiation | 89.7 |
| After irradiation | 88.6 |

Then the above liquid crystal testing cassete is irradiated with 6 mw/cm² (365 nm) UV light for 100 min to promote the polymerization of the residual general formula I. After irradiation, the participation content of general formula I is tested, and the test results are shown in the table below:

|  | DP1 |
|---|---|
| Residual amount | 88 ppm |

The testing cassete of D1 after polymerization is applied with a voltage of 10 V under the backlight irradiation with a light intensity of 4000 nit or more at 60° C. for 10 days, and then the pretilt angle is tested. The test values are as follows:

|  | DP1 |
|---|---|
| Initial | 88.6 |
| After 10 days | 88.2 |
| Difference value | 0.4 |

Compared with the DP1 provided by Comparative Example 1, P1, P2, P3, P4, P5, P6, P7 and P8 provided by Example 1 of the present invention have more stable pretilt angles. After a long period of reliability, the pretilt angle change is lower than that of the Comparative Example.

Figure 2:
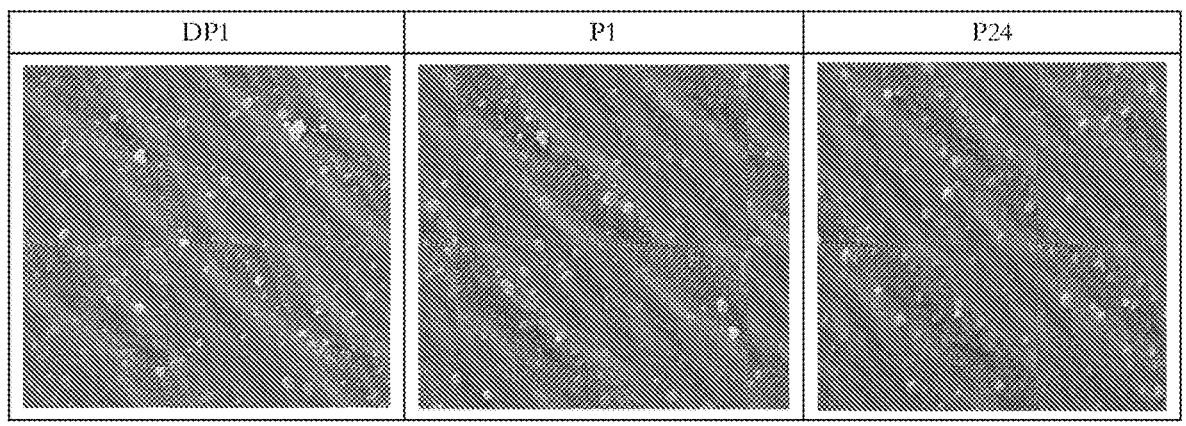
FIG. 2 is an SEM image (scanning electron microscope) of the polymer film formed by polymerizing DP1, P1, and P24.

It can be seen from FIGS. 1 and 2 that the polymer film formed after the polymerization of the PSVA liquid crystal composition provided by the present invention is more uniform, which is more effective for improving the uneven display of the PSVA liquid crystal display.

As can be seen from the above examples, a polymer film formed after the polymerization of the liquid crystal composition containing the polymerizable compound provided by the present invention has a very good uniformity, such that the problem of poor display of the liquid crystal display can be improved; in addition, an alignment film formed after the polymerization of the polymerizable liquid crystal composition provided by the present invention has an excellent alignment force, which can improve the residual image problem caused by insufficient alignment force in a PSVA liquid crystal display; the liquid crystal composition containing the polymerizable compound(s) provided by the present invention can realize an adjustable response speed, and can in turn meet the requirements of different technical process conditions.

INDUSTRIAL APPLICABILITY

The present invention relates to a polymer-stabilized liquid crystal composition and use thereof. The composition comprises one or two polymerizable compounds represented by general formula I:

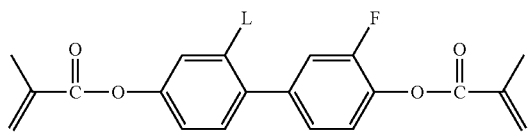

and further comprises a negative dielectric anisotropy liquid crystal composition, wherein the negative dielectric anisotropy liquid crystal composition has a dielectric anisotropy of $\Delta\varepsilon \leq -1.5$; and
    the added amount of the polymerizable compound(s) represented by general formula I is 0.1-0.5% of the total mass of the negative dielectric anisotropy liquid crystal composition. A polymer film formed after the polymerization of the liquid crystal composition containing the polymerizable compound provided by the present invention has a very good uniformity, such that the problem of poor display of the liquid crystal display can be improved; in addition, an alignment film formed after the polymerization of the polymerizable liquid crystal composition provided by the present invention has an excellent alignment force, which can improve the residual image problem caused by insufficient alignment force in a PSVA liquid crystal display; the liquid crystal composition containing the polymerizable compound(s) provided by the present invention can realize an adjustable response speed, and can in turn meet the requirements of different technical process conditions, and has good economic value and application prospects.

What is claimed is:

1. A polymer-stabilized liquid crystal composition, wherein the composition comprises follow components by weight percentage:
 a negative dielectric anisotropy liquid crystal composition, wherein the negative dielectric anisotropy liquid crystal composition has a dielectric anisotropy of $\Delta\varepsilon \leq -1.5$;
 the negative dielectric anisotropy liquid crystal composition comprises:
 0.05-0.25% of a polymerizable compound of general formula IA;
 8-28% of a compound represented by general formula II;
 35-55% of a compound represented by general formula III;
 20-36% of a compound represented by general formula IV;
 2-15% of a compound represented by general formula V; and
 one or more compounds represented by general formula VII;
 wherein the polymerizable compound represented by general formula IA is:

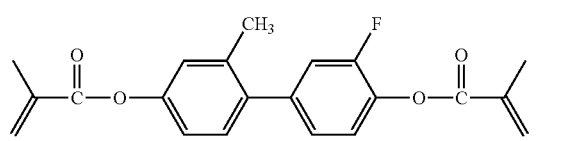

IA the compound represented by general formula II is:

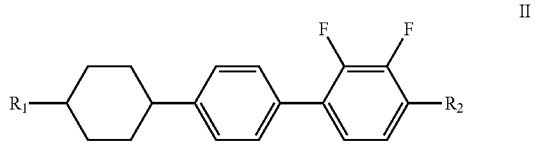

II wherein $R_1$ and $R_2$ each independently represents a $C_1$-$C_{12}$ linear alkyl or linear alkoxy;

the compound represented by general formula III is:

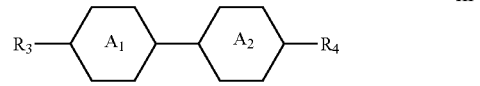

III wherein $R_3$ and $R_4$ each independently represents a $C_1$-$C_{12}$ linear alkyl or linear alkoxy; $A_1$ and $A_2$ each independently represents a trans-1,4-cyclohexyl or 1,4-phenylene;

the compound represented by general formula IV is:

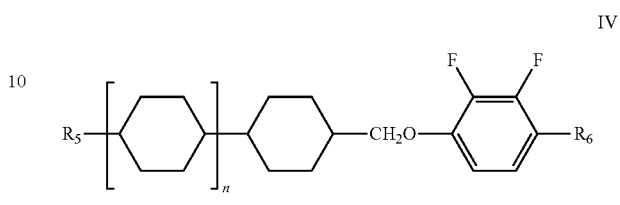

IV wherein $R_5$ and $R_6$ each independently represents a $C_1$-$C_{12}$ linear alkyl or linear alkoxy; n represents 0 or 1;

the compound represented by general formula V:

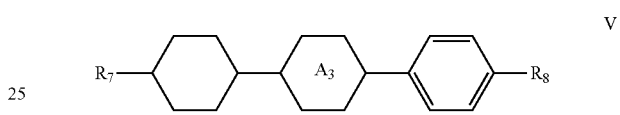

V wherein $R_7$ and $R_8$ each independently represents a $C_1$-$C_{12}$ linear alkyl, and $A_3$ each independently represents a trans-1,4-cyclohexyl or 1,4-phenylene; and the compound represented by general formula VII is:

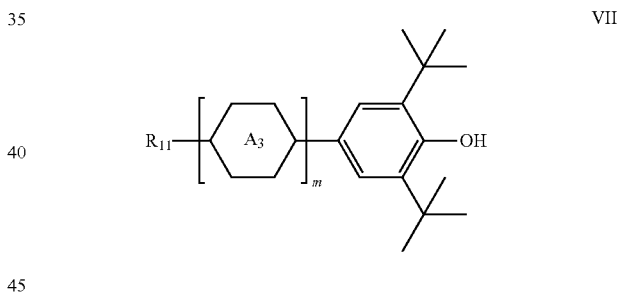

VII wherein $R_{11}$ each independently represents a $C_1$-$C_{12}$ linear alkyl, $A_3$ each independently represents a 1,4-phenylene, trans-1,4-cyclohexyl, or 1,3-dioxane-2,5-diyl, and m represents 0, or 1.

2. The liquid crystal composition according to claim 1, wherein the compound represented by general formula II is selected from one or more of formulas IIA1-IIA24:

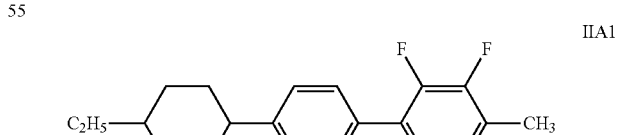

IIA1

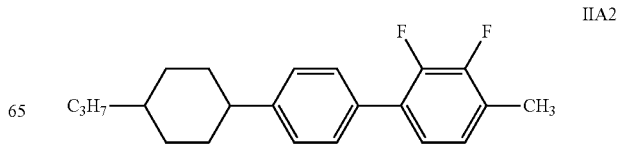

IIA2

IIA3
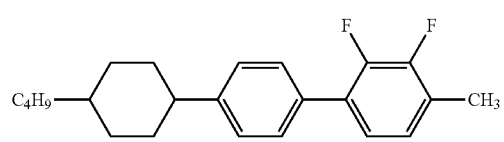
IIA4
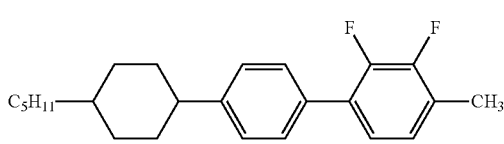
IIA5
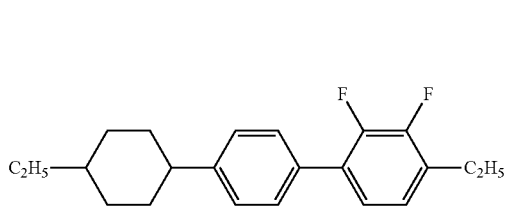
IIA6
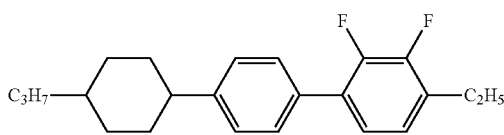
IIA7
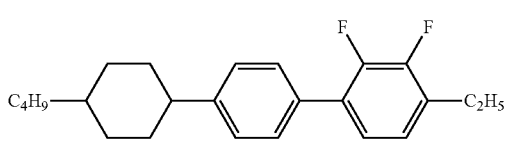
IIA8
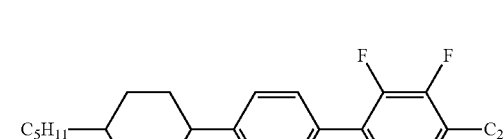
IIA9
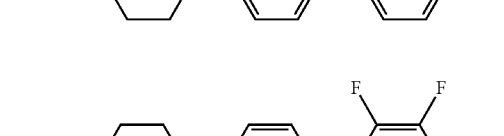
IIA10
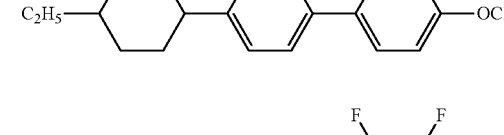
IIA11
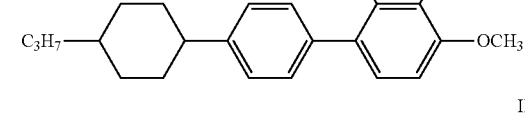
IIA12
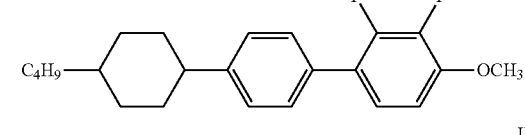
IIA13
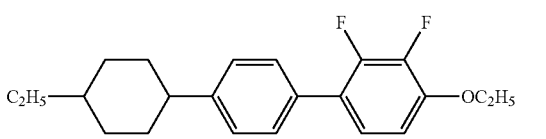
IIA14
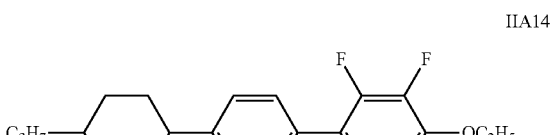
IIA15
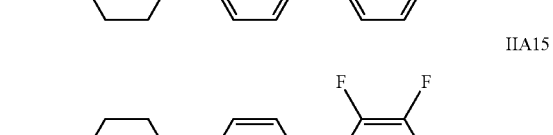
IIA16
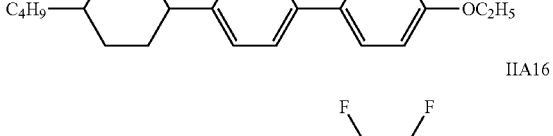
IIA17
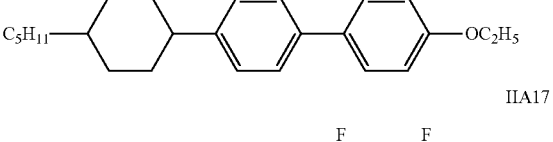
IIA18
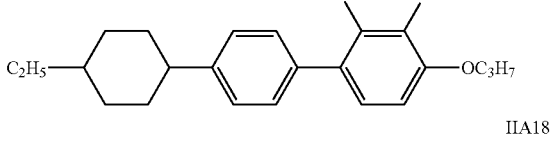
IIA19
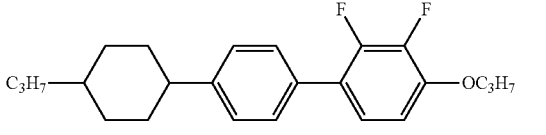
IIA20
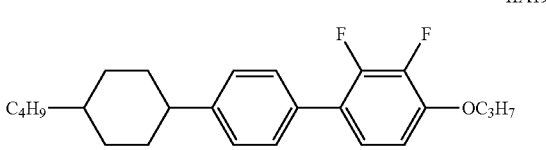
IIA21
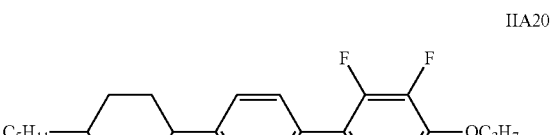
IIA22
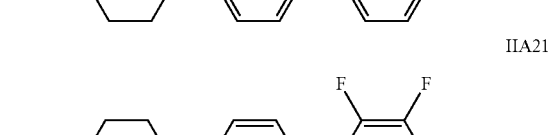

-continued

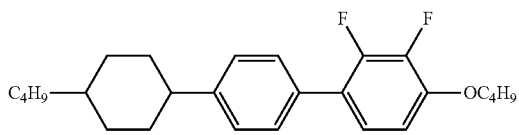
IIA23

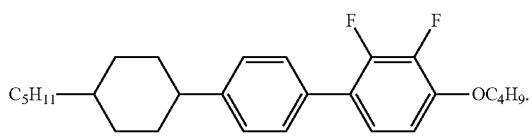
IIA24

3. The liquid crystal composition according to claim 1, wherein the liquid crystal composition also comprises a compound of general formula VI, which is:

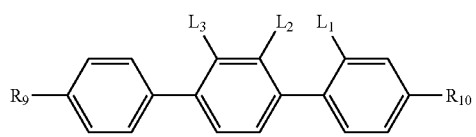
VI wherein $R_9$ each independently represents a $C_1$-$C_{12}$ linear alkyl, and $R_{10}$ each independently represents F, or a $C_1$-$C_{12}$ linear alkyl; $L_1$, $L_2$, and $L_3$ each independently represent H or F.

4. The liquid crystal composition according to claim 3, wherein the liquid crystal composition includes the following components by weight percentage:
the nematic liquid crystal composition provided by the present invention includes the following components by weight percentage:
the negative dielectric anisotropy liquid crystal composition:
(1) 10-26% of the compound represented by general formula II;
(2) 41-50% of the compound represented by general formula III;
(3) 25-34% of the compound represented by general formula IV;
(4) 3-13% of the compound represented by general formula V;
(5) 0-5% of the compound represented by general formula VI; and
0.2-0.25% of the polymerizable compound represented by general formula IA.

5. A method of preparing a PSVA mode display using a liquid crystal composition according to claim 1.

6. The liquid crystal composition according to claim 1, the compound represented by general formula III is selected from one or more of formulas IIIA1-IIIC30:

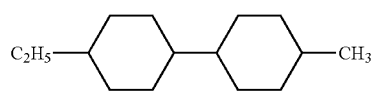
IIIA1

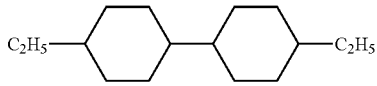
IIIA2

-continued

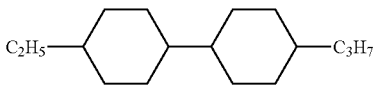
IIIA3

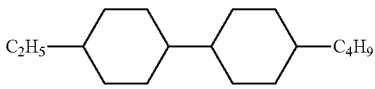
IIIA4

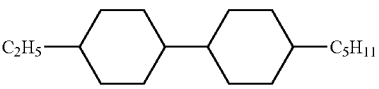
IIIA5

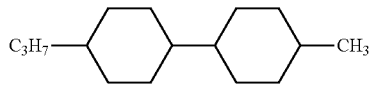
IIIA6

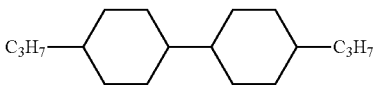
IIIA7

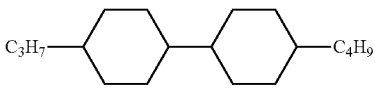
IIIA8

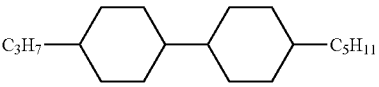
IIIA9

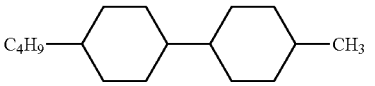
IIIA10

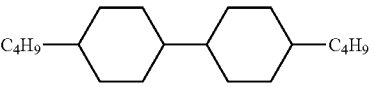
IIIA11

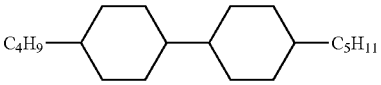
IIIA12

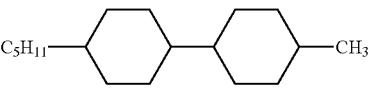
IIIA13

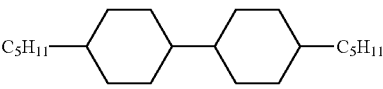
IIIA14

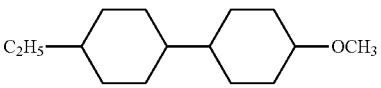
IIIA15

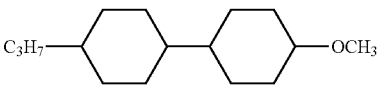
IIIA16

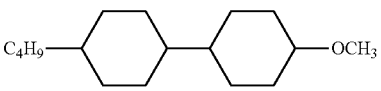
IIIA17

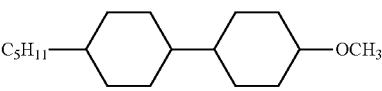
IIIA18

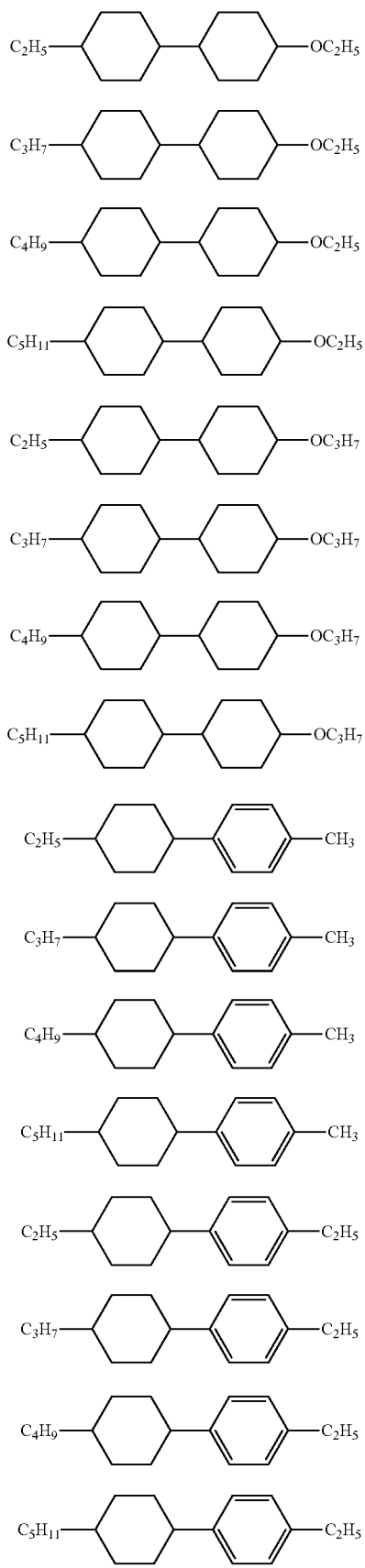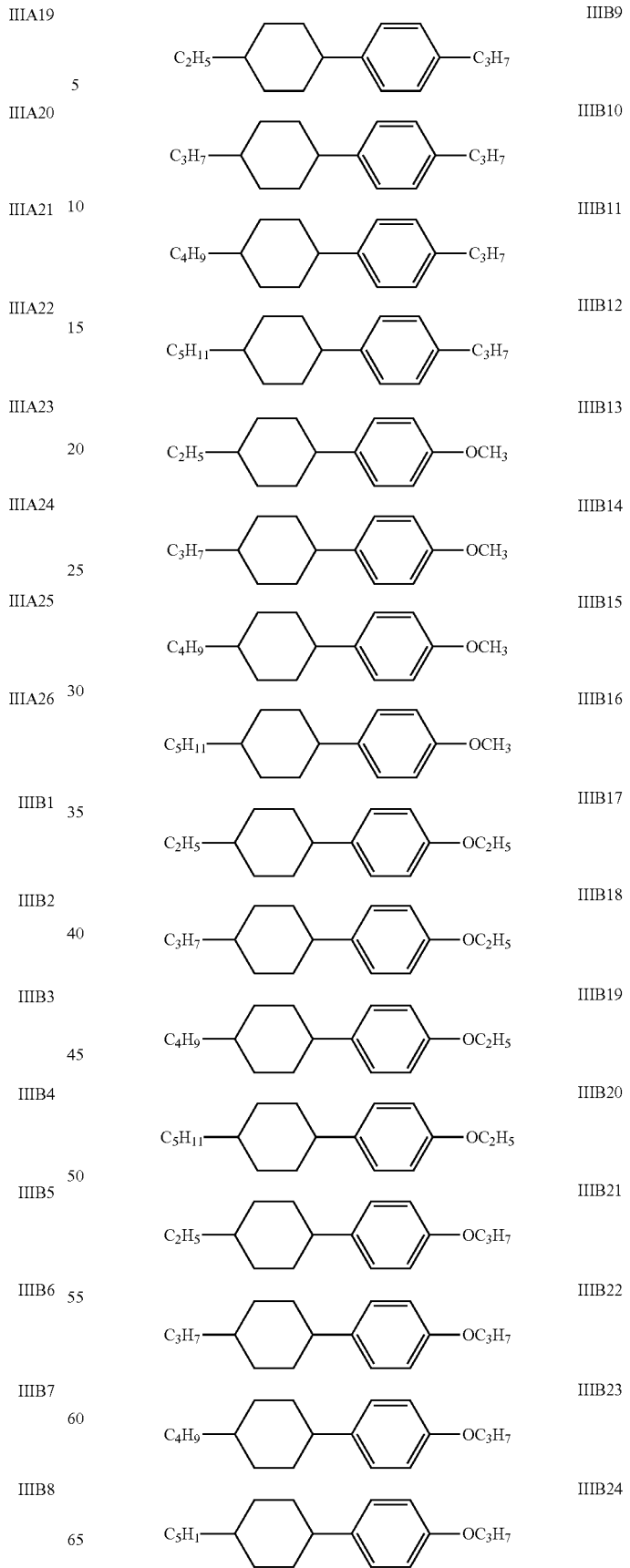

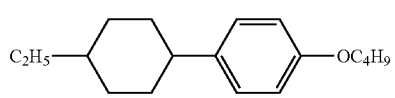 IIIB25
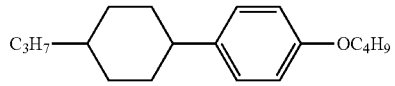 IIIB26
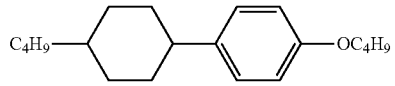 IIIB27
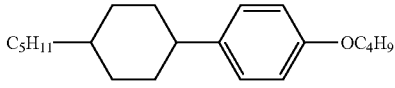 IIIB28
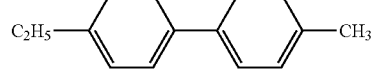 IIIC1
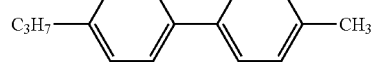 IIIC2
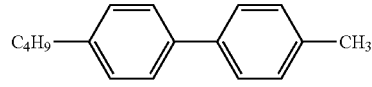 IIIC3
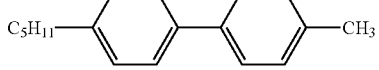 IIIC4
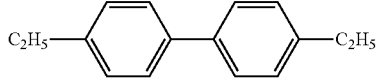 IIIC5
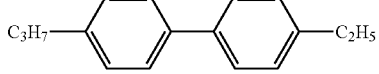 IIIC6
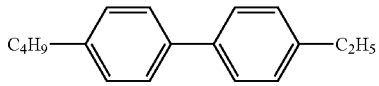 IIIC7
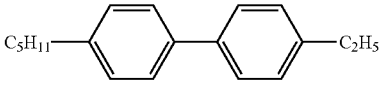 IIIC8
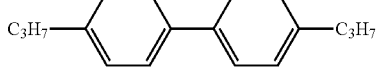 IIIC9
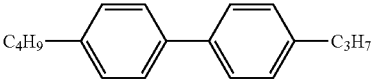 IIIC10
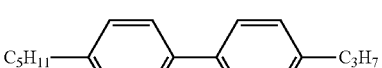 IIIC11
 IIIC12
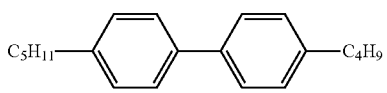 IIIC13
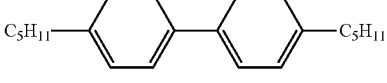 IIIC14
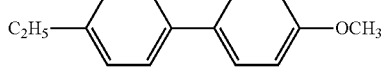 IIIC15
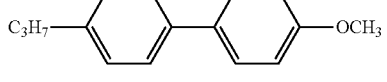 IIIC16
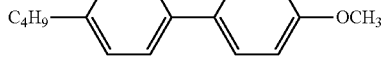 IIIC17
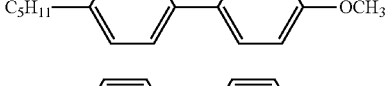 IIIC18
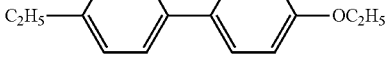 IIIC19
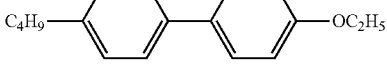 IIIC20
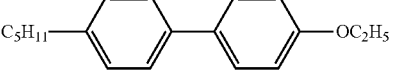 IIIC21
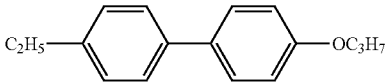 IIIC22
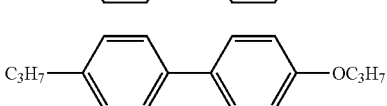 IIIC23
 IIIC24
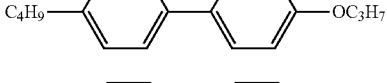 IIIC25
 IIIC26
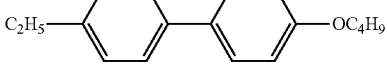 IIIC27
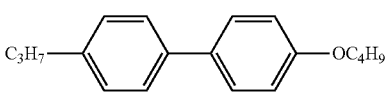 IIIC28

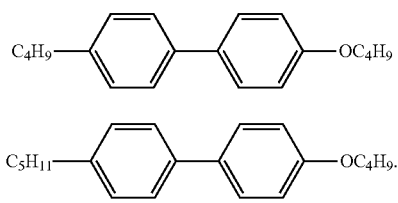
IIIC29
IIIC30
7. The liquid crystal composition according to claim 1, the compound represented by general formula IV is selected from one or more of IVA1-IVB16:
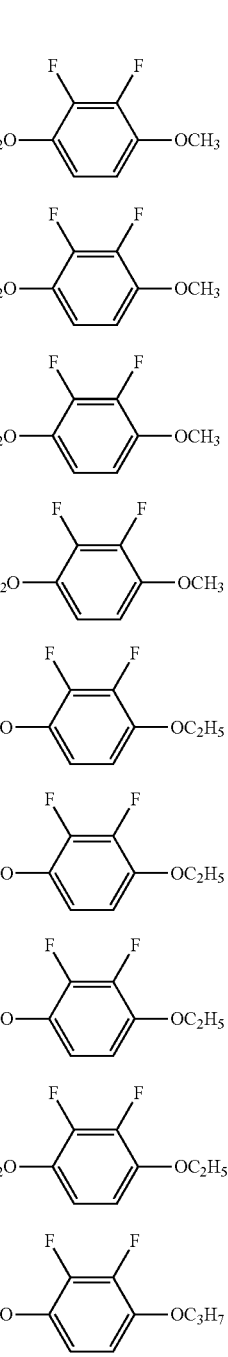
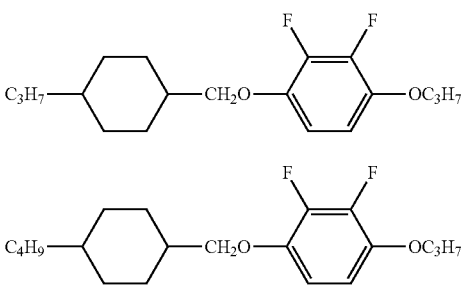
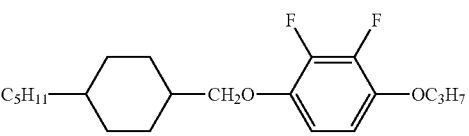
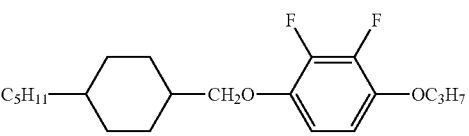
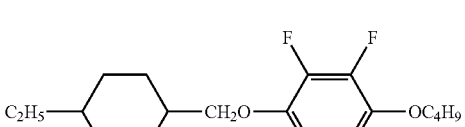
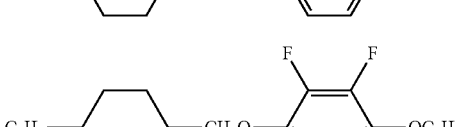
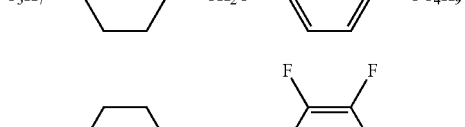
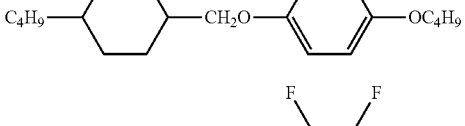
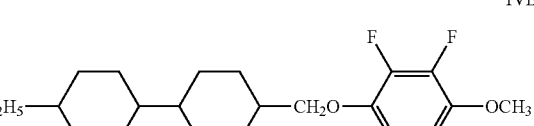
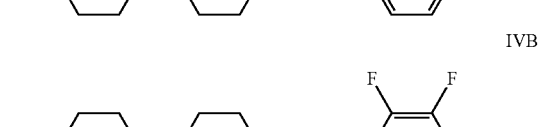
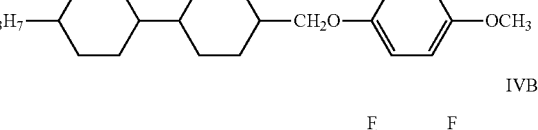
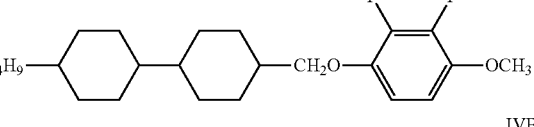
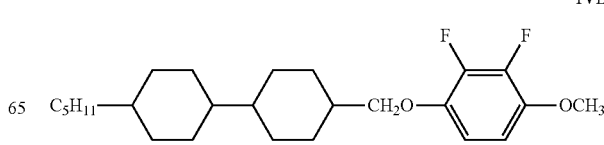

8. The liquid crystal composition according to claim 1, the compound represented by general formula V is selected from one or more of VA1-VB16:

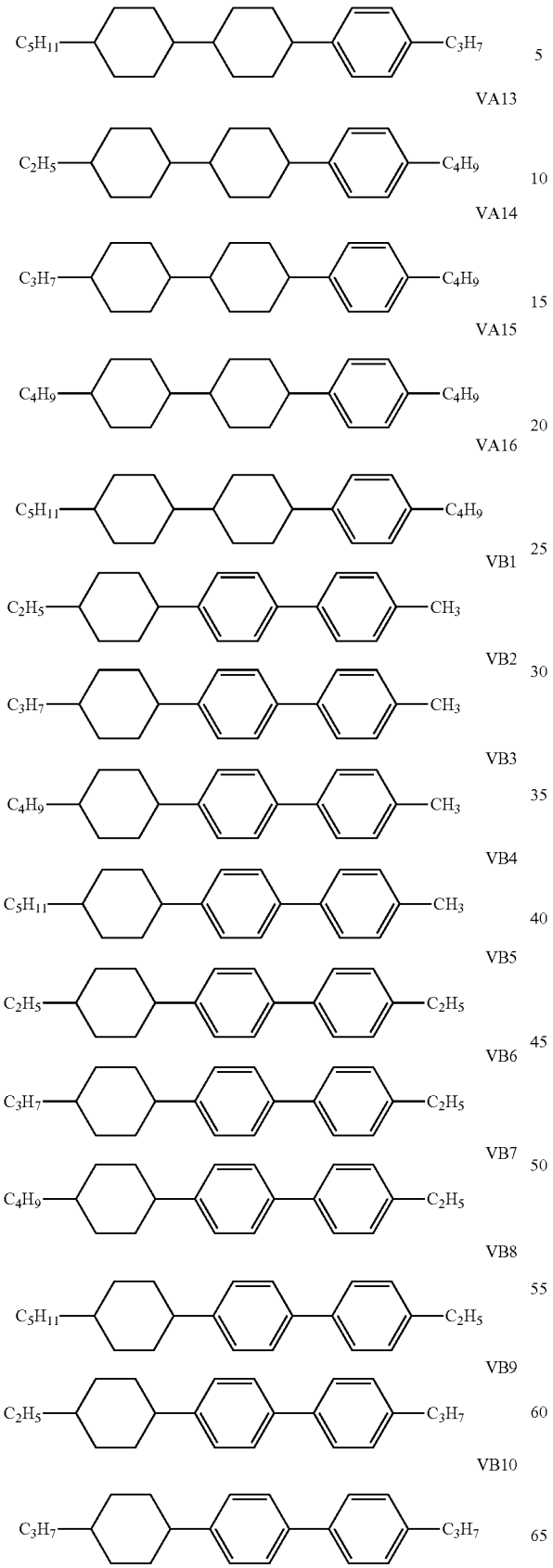

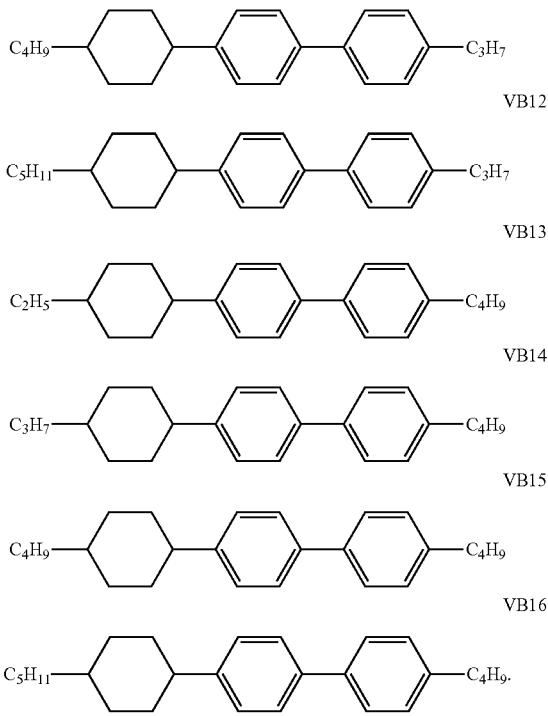

9. The liquid crystal composition according to claim 3, wherein the compound represented by general formula VI is selected from one or more of formulas VIA-VIC:

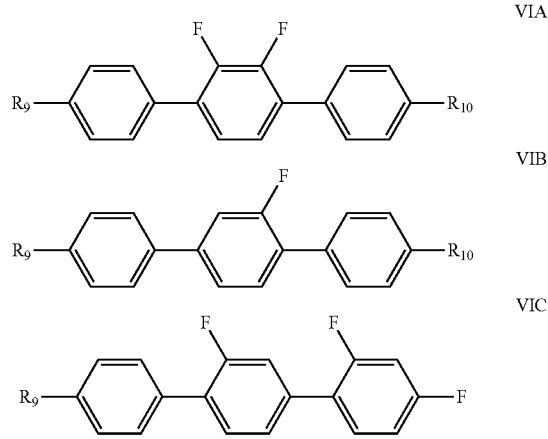

wherein $R_9$ and $R_{10}$ each independently represents a $C_1$-$C_7$ linear alkyl.

10. The liquid crystal composition according to claim 9, wherein the compound represented by general formula VI is selected from one or more of formulas VIA1-VIC4:

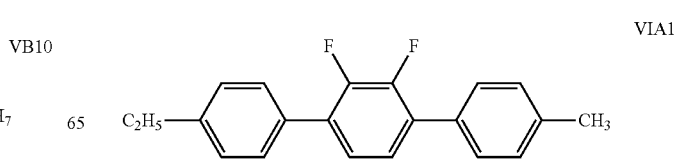

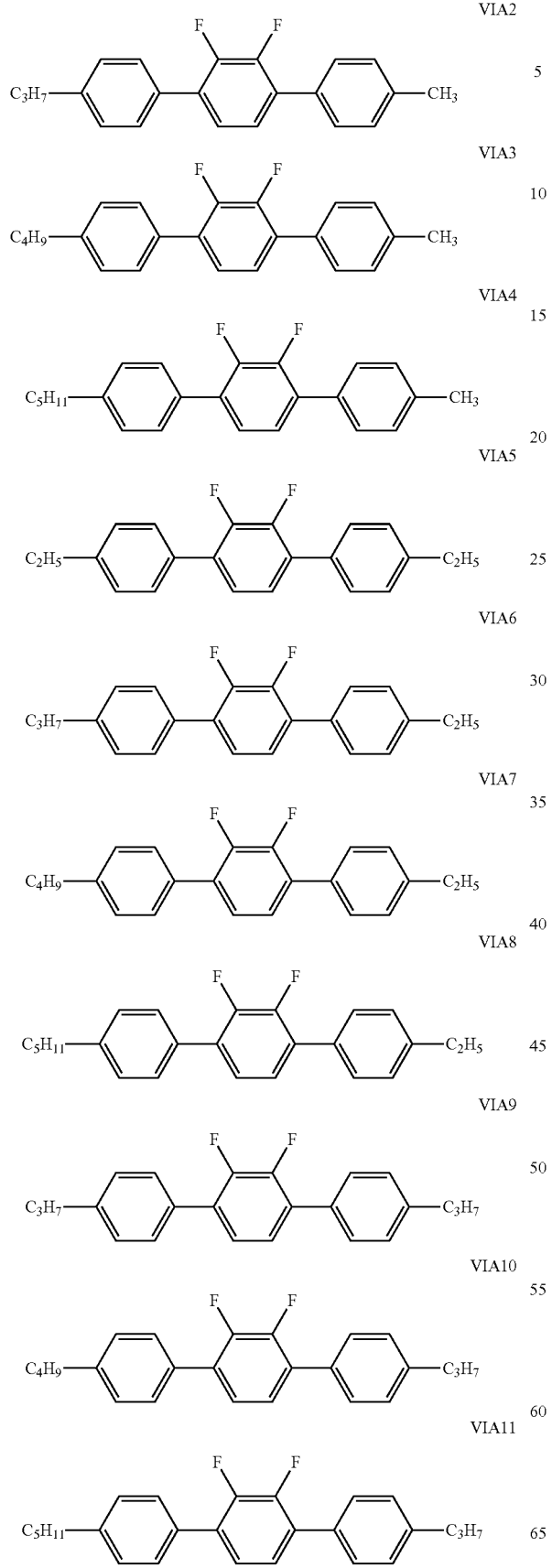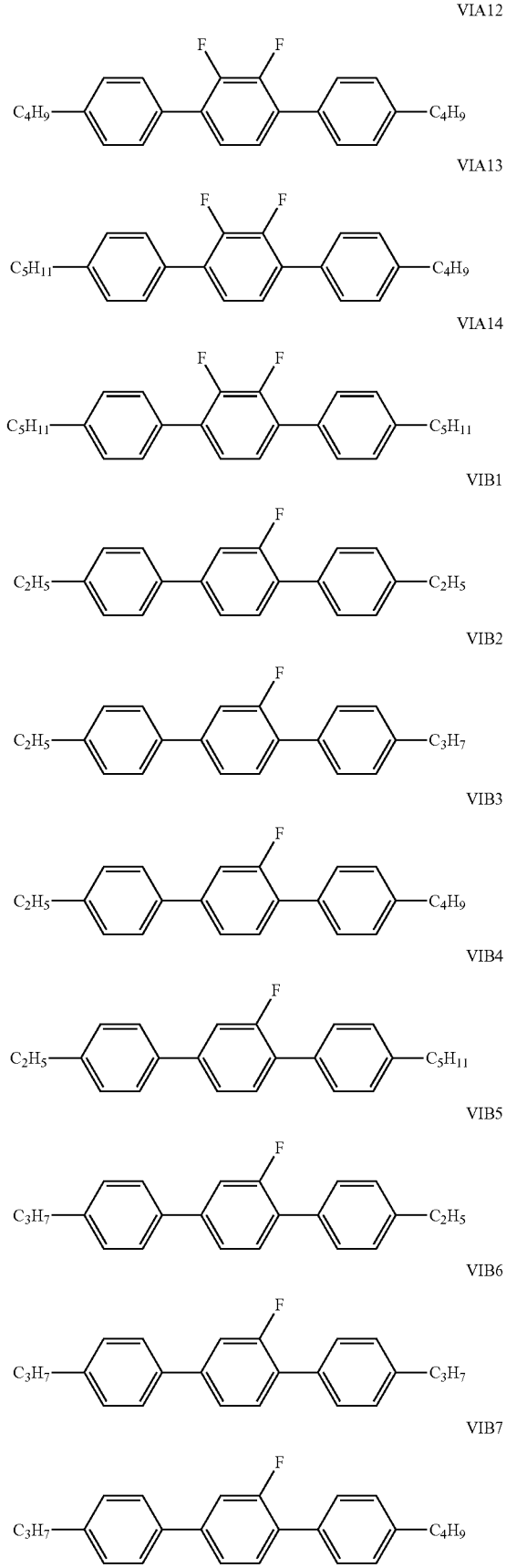

VIB8
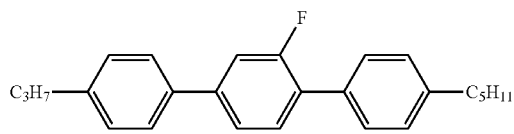

VIB9
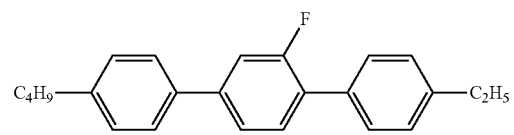

VIB10
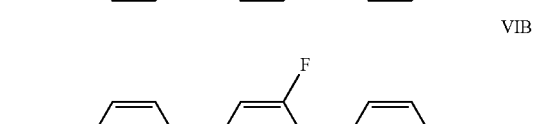

VIB11
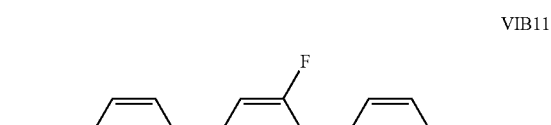

VIB12
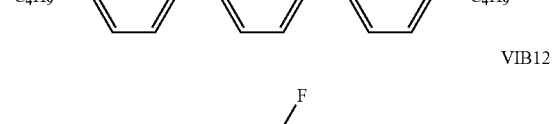

VIB13
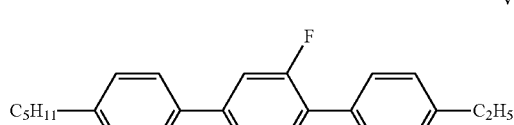

VIB14
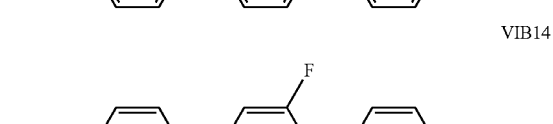

VIB15
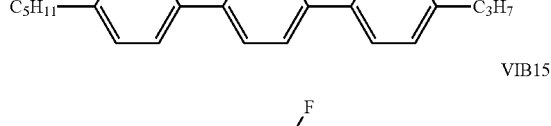

VIB16
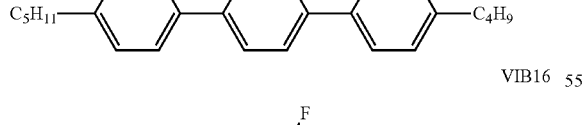

VIC1
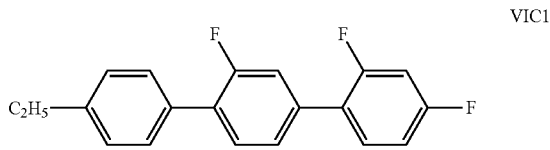

VIC2
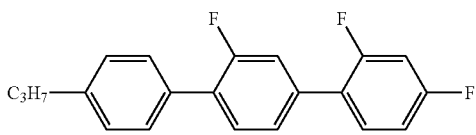

VIC3
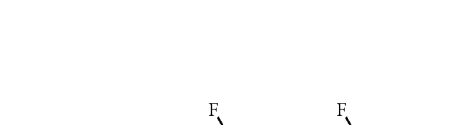

VIC4
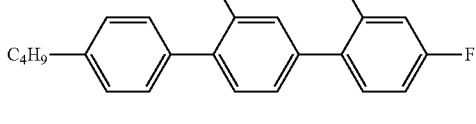

11. The liquid crystal composition according to claim 1, wherein the compound represented by general formula VII contained in the liquid crystal composition is selected from one or more of the following structures:

VIIA
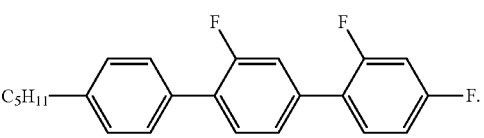

VIIB
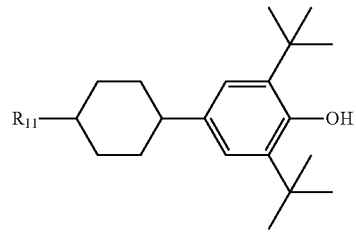

VIIC
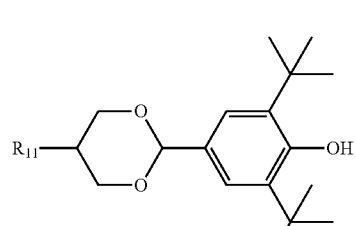

$R_{11}$ each independently represents a $C_1$-$C_7$ linear alkyl.

12. The liquid crystal composition according to claim 11, wherein the compound represented by general formula VII is selected from one or more of VIIA1-VIIC7:

VIIA1
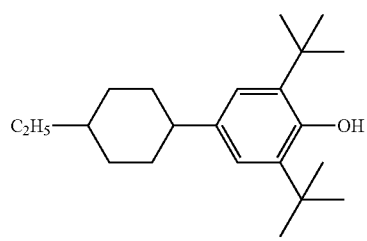
VIIA2
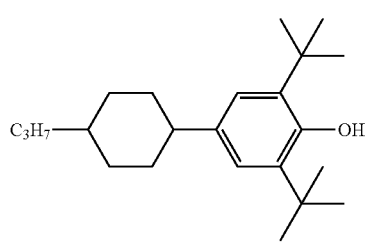
VIIA3
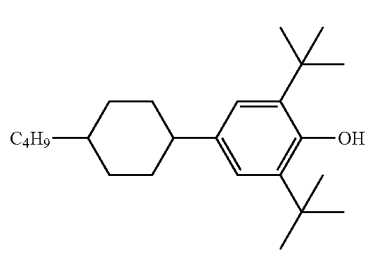
VIIA4
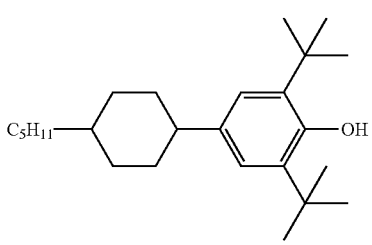
VIIB1
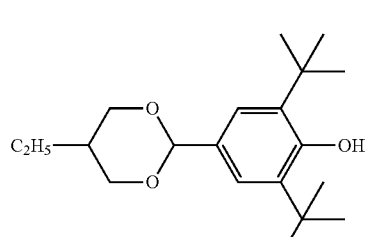
VIIB2
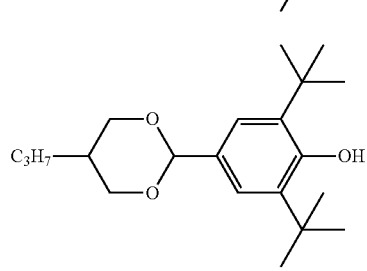
-continued
VIIB3
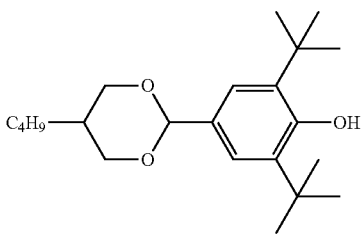
VIIB4
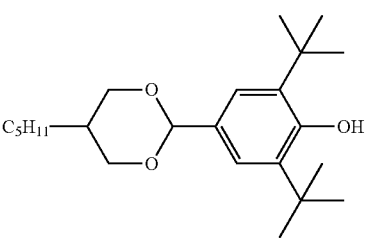
VIIC1
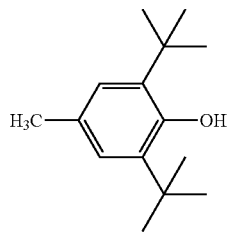
VIIC2
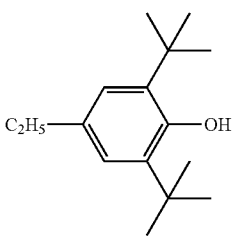
VIIC3
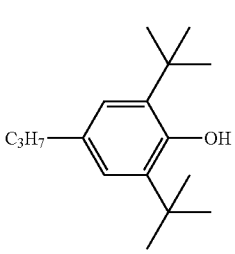
VIIC4
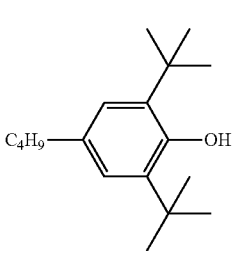

-continued

VIIC5
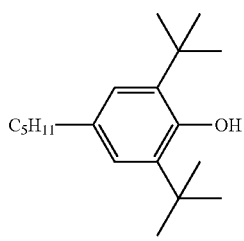

VIIC6
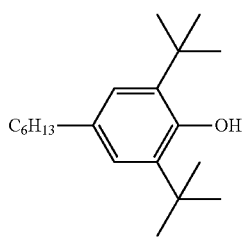

VIIC7
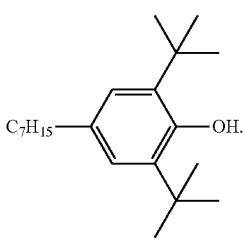

13. The liquid crystal composition according to claim 1, wherein the negative dielectric anisotropy liquid crystal composition further comprises 0.05-0.25% of a polymerizable compound represented by formula IB:

IB
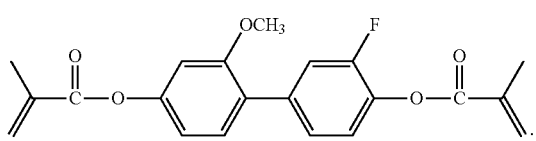

14. The liquid crystal composition according to claim 2, wherein the compound represented by general formula III is selected from one or more of formulas IIIA-IIIC:

IIIA
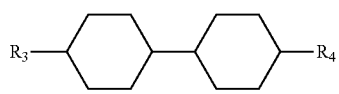

-continued

IIIB
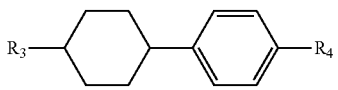

IIIC
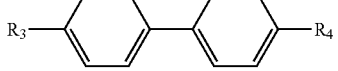

wherein $R_3$ each independently represents a $C_1$-$C_7$ linear alkyl, and $R_4$ each independently represents a $C_1$-$C_7$ linear alkyl or linear alkoxy.

15. The liquid crystal composition according to claim 1, wherein the compound represented by general formula IV is selected from one or more of compounds represented by IVA-IVB:

IVA
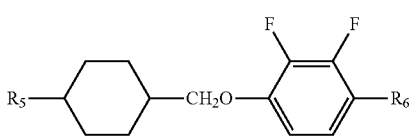

IVB
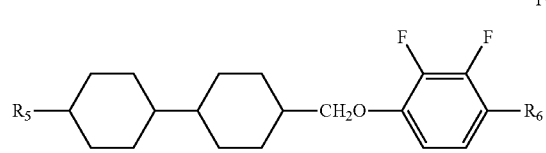

wherein $R_5$ and $R_6$ each independently represents a $C_1$-$C_7$ linear alkyl or linear alkoxy.

16. The liquid crystal composition according to claim 1, wherein the compound represented by general formula V is selected from one or more of formulas VA-VB:

VA
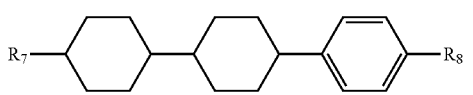

VB

wherein $R_7$ and $R_8$ each independently represents a $C_1$-$C_7$ linear alkyl.

* * * * *